United States Patent
Gaensler

(10) Patent No.: US 12,453,763 B2
(45) Date of Patent: Oct. 28, 2025

(54) HUMAN VACCINE COMPOSITIONS AND METHODS FOR TREATING LEUKEMIA

(71) Applicant: The Regents of the University of California, Oakland, CA (US)

(72) Inventor: Karin Gaensler, Oakland, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 901 days.

(21) Appl. No.: 17/600,588

(22) PCT Filed: Apr. 3, 2020

(86) PCT No.: PCT/US2020/026615
§ 371 (c)(1),
(2) Date: Sep. 30, 2021

(87) PCT Pub. No.: WO2020/206282
PCT Pub. Date: Oct. 8, 2020

(65) Prior Publication Data
US 2022/0160852 A1    May 26, 2022

Related U.S. Application Data

(60) Provisional application No. 62/829,874, filed on Apr. 5, 2019.

(51) Int. Cl.
| | |
|---|---|
| *A61K 39/00* | (2006.01) |
| *A61K 35/13* | (2015.01) |
| *A61K 35/15* | (2025.01) |
| *A61K 38/20* | (2006.01) |
| *A61K 40/00* | (2025.01) |
| *A61K 40/10* | (2025.01) |
| *A61K 40/19* | (2025.01) |
| *A61K 40/24* | (2025.01) |
| *A61K 40/42* | (2025.01) |
| *A61P 35/00* | (2006.01) |
| *A61P 35/02* | (2006.01) |
| *C07K 14/005* | (2006.01) |
| *C07K 14/54* | (2006.01) |
| *C07K 14/705* | (2006.01) |
| *C07K 14/715* | (2006.01) |
| *C12N 5/09* | (2010.01) |
| *C12N 5/10* | (2006.01) |

(52) U.S. Cl.
CPC ... *A61K 39/001111* (2018.08); *A61K 39/0011* (2013.01); *A61K 39/001119* (2018.08); *A61K 39/00114* (2018.08); *A61K 40/10* (2025.01); *A61K 40/19* (2025.01); *A61K 40/24* (2025.01); *A61K 40/42* (2025.01); *A61P 35/00* (2018.01); *A61P 35/02* (2018.01); *C07K 14/005* (2013.01); *C07K 14/5443* (2013.01); *C07K 14/70532* (2013.01); *C07K 14/7155* (2013.01); *A61K 2039/5152* (2013.01); *A61K 2239/48* (2023.05)

(58) Field of Classification Search
None
See application file for complete search history.

(56) References Cited

U.S. PATENT DOCUMENTS

2010/0261660 A1   10/2010  Punnonen et al.
2017/0020963 A1*   1/2017  Qu ..................... A61K 38/2086

FOREIGN PATENT DOCUMENTS

WO   WO-2018/026872 A1   2/2018
WO   WO-2018/058067 A1   3/2018

OTHER PUBLICATIONS

Shi et al. IL-15/IL-15Ra/CD80-expressing AML cell vaccines eradicate minimal residual disease in leukemic mice. Blood Advances, Nov. 27, 2018, vol. 2, No. 22, pp. 3177-3192.*
Chan et al. IL-2/B7.1 (CD80) Fusagene Transduction of AML Blasts by a Self-Inactivating Lentiviral Vector Stimulates T Cell Responses in Vitro: a Strategy to Generate Whole Cell Vaccines for AML. Mol. Ther., 2005, vol. 11(1), 120-131.*
Klebanoff et al. IL-15 enhances the in vivo antitumor activity of tumor-reactive CD8+ T Cells. PNAS, 2004, vol. 101(7), 1969-1974.*
Morris et al. Vaccination with tumor cells expressing IL-15 and IL-15Ra inhibits murine breast and prostate cancer. Gene Therapy, 2014, vol. 21, 393-401.*
Acute Myeloid Leukemia (AML) Therapeutics Market—Global Industry Size, Market Share, Trends, Analysis and Forecasts 2012-2018. Located at <https://web.archive.org/web/20121023112943/https:/www.transparencymarketresearch.com/acute-myeloid-leukemia-therapeutics-market.html, last accessed Apr. 24, 2025, 3 pages.
Alves, N.L. et al. (Oct. 1, 2003). "IL-15 induces antigen-independent expansion and differentiation of human naive CD8+ T cells in vitro," *Blood* 102(7):2541-2546.

(Continued)

*Primary Examiner* — Nianxiang Zou
(74) *Attorney, Agent, or Firm* — Mintz Levin Cohn Ferris Glovsky and Popeo, P.C.

(57) ABSTRACT

Provided herein, inter alia, nucleic acids including coding sequences for human CD80, IL-15, IL-15Rα polypeptides, wherein the coding sequence for hCD80 is operably positioned upstream to the coding sequences for hIL-15 and hIL-15Rα. The disclosure also provides recombinant cells, cell cultures, pharmaceutical compositions, and whole-cell vaccines containing the recombinant cells disclosed herein. Also disclosed are methods useful for treating myeloma and leukemias, such as acute myelogenous leukemia (AML).

20 Claims, 17 Drawing Sheets
Specification includes a Sequence Listing.

(56) References Cited

OTHER PUBLICATIONS

Ames, E. et al. (Jun. 5, 2015). "Enhanced targeting of stem-like solid tumor cells with radiation and natural killer cells," *Oncoimmunology* 4(9):e1036212.
Ames, E. et al. (Oct. 15, 2015, e-published Sep. 11, 2015). "NK Cells Preferentially Target Tumor Cells with a Cancer Stem Cell Phenotype," *J Immunol* 195(8):4010-4019.
Berard, M. et al. (May 15, 2003). "IL-15 promotes the survival of naive and memory phenotype CD8+ T cells," *J Immunol* 170(10):5018-5026.
Bergamaschi, C. et al. (Feb. 15, 2008, e-published Nov. 30, 2007). "Intracellular interaction of interleukin-15 with its receptor alpha during production leads to mutual stabilization and increased bioactivity," *J Biol Chem* 283(7):4189-4199.
Bergamaschi, C. et al. (Sep. 1, 2009). "Secretion and biological activity of short signal peptide IL-15 is chaperoned by IL-15 receptor alpha in vivo," *J Immunol* 183(5):3064-3072.
Bergamaschi, C. et al. (Jul. 5, 2012). "Circulating IL-15 exists as heterodimeric complex with soluble IL-15Rα in human and mouse serum," *Blood* 120(1):e1-8.
Borrello, I.M. et al. (Aug. 27, 2009, e-published Jun. 25, 2009). "Granulocyte-macrophage colony-stimulating factor (GM-CSF)-secreting cellular immunotherapy in combination with autologous stem cell transplantation (ASCT) as postremission therapy for acute myeloid leukemia (AML)," *Blood* 114:1736-1745.
Boyiadzis, M. et al. (Oct. 2017, e-published Aug. 30, 2017). "Phase 1 clinical trial of adoptive immunotherapy using "off-the-shelf" activated natural killer cells in patients with refractory and relapsed acute myeloid leukemia," *Cytotherapy* 19(10):1225-1232.
Brentjens, R.J. et al. (Mar. 2003). "Eradication of systemic B-cell tumors by genetically targeted human T lymphocytes co-stimulated by CD80 and interleukin-15," *Nat Med* 9(3):279-286.
Buccisano, F. et al. (Apr. 2018, e-published Mar. 7, 2018). "Minimal residual disease as a biomarker for outcome prediction and therapy optimization in acute myeloid leukemia," *Expert Review Hematol* 11(4):307-313.
Buggins, A.G. et al. (Nov. 15, 1999). "Effect of costimulation and the microenvironment on antigen presentation by leukemic cells," *Blood* 94(10):3479-3490.
Cartier, N. et al. (Nov. 6, 2009). "Hematopoietic stem cell gene therapy with a lentiviral vector in X-linked adrenoleukodystrophy," *Science* 326(5954):818-823.
Chan, L. et al. (Jan. 2005). "IL-2/B7.1 (CD80) fusagene transduction of AML blasts by a self-inactivating lentiviral vector stimulates T cell responses in vitro: a strategy to generate whole cell vaccines for AML," *Mol Ther* 11(1):120-131.
Chertova, E. et al. (Jun. 21, 2013, e-published May 6, 2013). "Characterization and favorable in vivo properties of heterodimeric soluble IL-15.IL-15Rα cytokine compared to IL-15 monomer, *J Biol Chem* 288(25):18093-18103."
Ciernik, I.F. et al. (Oct. 1, 1999). "Ionizing radiation enhances immunogenicity of cells expressing a tumor-specific T-cell epitope," *Int J Radiat Oncol Biol Phys* 45(3):735-741.
Clarke, M.F. et al. (Oct. 1, 2006). "Cancer stem cells—perspectives on current status and future directions: AACR Workshop on cancer stem cells," *Cancer Res* 66(19):9339-9344.
Conlon, K.C. et al. (Jan. 1, 2015). "Redistribution, hyperproliferation, activation of natural killer cells and CD8 T cells, and cytokine production during first-in-human clinical trial of recombinant human interleukin-15 in patients with cancer," *J Clin Oncol* 33(1):74-82.
Daud A.I. et al. (Sep. 2016). "Tumor immune profiling predicts response to anti-PD-1 therapy in human melanoma," *J Clin Invest* 126(9):3447-3452.
Di Stasi, A. et al. (Feb. 4, 2015). "Review of the Results of WT1 Peptide Vaccination Strategies for Myelodysplastic Syndromes and Acute Myeloid Leukemia from Nine Different Studies," *Front Immunol* 6:36.
Dohner, H. et al. (Jan. 21, 2010). "Diagnosis and management of acute myeloid leukemia in adults: recommendations from an international expert panel, on behalf of the European LeukemiaNet," *Blood* 115(3):453-474.
Dohner, H. et al. (Sep. 17, 2015). "Acute Myeloid Leukemia," *N Engl J Med* 373(12):1136-1152.
Dombret, H. et al. (Jan. 7, 2016, e-published Dec. 10, 2015). "An update of current treatments for adult acute myeloid leukemia," *Blood* 127(1):53-61.
Dranoff, G. et al. (Apr. 15, 1993). "Vaccination with irradiated tumor cells engineered to secrete murine granulocyte-macrophage colony-stimulating factor stimulates potent, specific, and long-lasting anti-tumor immunity," *PNAS USA* 90(8):3539-3543.
Dubois, S. et al. (Feb. 15, 2008). "Preassociation of IL-15 with IL-15R alpha-IgG1-Fc enhances its activity on proliferation of NK and CD8+/CD44high T cells and its antitumor action," *J Immunol* 180(4):2099-2106.
Goyama, S. et al. (Apr. 23, 2015). "Xenograft models for normal and malignant stem cells," *Blood* 125(17):2630-2640.
Griessinger, E. et al. (Apr. 15, 2016). "Frequency and Dynamics of Leukemia-Initiating Cells during Short-term Ex Vivo Culture Informs Outcomes in Acute Myeloid Leukemia Patients," *Cancer Res* 76(8):2082-2086.
Hardwick, N. et al. (Mar. 2010, e-published Aug. 27, 2009). "Lytic activity against primary AML cells is stimulated in vitro by an autologous whole cell vaccine expressing IL-2 and CD80," *Cancer Immunol Immunother* 59(3):379-388.
Hinrichs, C.S. et al. (Jun. 1, 2008). "IL-2 and IL-21 confer opposing differentiation programs to CD8+ T cells for adoptive immunotherapy," *Blood* 111(11):5326-5333.
Hirst, W.J. et al. (Jul. 1997). "Enhanced immune costimulatory activity of primary acute myeloid leukaemia blasts after retrovirus-mediated gene transfer of B7.1," *Gene Ther* 4(7):691-699.
Ho, V.T. et al. (Nov. 14, 2017). "Vaccination with autologous myeloblasts admixed with GM-K562 cells in patients with advanced MDS or AML after allogeneic HSCT," *Blood Adv* 1(24):2269-2279.
Hong, E. et al. (Apr. 22, 2016). "Configuration-dependent Presentation of Multivalent IL-15:IL-15Rα Enhances the Antigen-specific T Cell Response and Anti-tumor Immunity," *J Biol Chem* 291(17):8931-8950.
Hsu, J.L. et al. (Jan. 25, 2018). "A blood dendritic cell vaccine for acute myeloid leukemia expands anti-tumor T cell responses at remission," *Oncoimmunology* 7(4):e1419114.
Huarte, E. et al. (Nov. 18, 2009). "Ex vivo expansion of tumor specific lymphocytes with IL-15 and IL-21 for adoptive immunotherapy in melanoma," *Cancer Lett* 285(1):80-88.
Ingram, W. et al. (Jun. 2009, e-published Apr. 20, 2009). "Human CD80/IL2 lentivirus-transduced acute myeloid leukaemia (AML) cells promote natural killer (NK) cell activation and cytolytic activity: implications for a phase I clinical study," *Br J Haematol* 145:749-760.
Ingram, W. et al. (Oct. 2009, e-published Mar. 13, 2009). "Human CD80/IL2 lentivirus transduced acute myeloid leukaemia cells enhance cytolytic activity in vitro in spite of an increase in regulatory CD4+ T cells in a subset of cultures,". *Cancer Immunol Immunother* 58(10):1679-1690.
International Search Report mailed on Jun. 23, 2020, for PCT Application No. PCT/US2020/026615, filed Apr. 3, 2020, 4 pages.
Jalah, R. et al. (Dec. 2007). "Efficient systemic expression of bioactive IL-15 in mice upon delivery of optimized DNA expression plasmids," *DNA Cell Biol* 26(12):827-840.
Kanegane, H. et al. (Jul. 1, 1996). "Activation of naive and memory T cells by interleukin-15," *Blood* 88(1):230-235.
Khoury, H.J. et al. (Aug. 15, 2017). "Immune responses and long-term disease recurrence status after telomerase-based dendritic cell immunotherapy in patients with acute myeloid leukemia," *Cancer* 123(16):3061-3072.
Koya, R.C. et al. (Sep. 2002). "Transduction of acute myeloid leukemia cells with third generation self-inactivating lentiviral vectors expressing CD80 and GM-CSF: effects on proliferation, differentiation, and stimulation of allogeneic and autologous anti-leukemia immune responses," *Leukemia* 16(9):1645-1654.
Lichtenegger, F.S. et al. (Jul. 25, 2017). "Recent developments in immunotherapy of acute myeloid leukemia," *J Hematol Oncol* 10(1):142.

(56) References Cited

OTHER PUBLICATIONS

Lipof, J.J. et al. (Jun. 4, 2018). "Allogeneic Hematopoietic Cell Transplantation for Older Adults with Acute Myeloid Leukemia," *Cancers* 10(6):179.

Markley, J.C. et al. (Apr. 29, 2010). "IL-7 and IL-21 are superior to IL-2 and IL-15 in promoting human T cell-mediated rejection of systemic lymphoma in immunodeficient mice," *Blood* 115(17):3508-3519.

Metcalf, D. et al. (Oct. 1969). "Colony formation in vitro by myelomonocytic leukemic cells," *J Natl Cancer Inst* 43(4):983-1001.

Moore, M.A. et al. (Mar. 1973). "In vitro colony formation by normal and leukemic human hematopoietic cells: characterization of the colony-forming cells," *J Natl Cancer Inst* 50(3):603-623.

Mutis, T. et al. (Sep. 1, 1998). "CD80-Transfected acute myeloid leukemia cells induce primary allogeneic T-cell responses directed at patient specific minor histocompatibility antigens and leukemia-associated antigens," *Blood* 92(5):1677-1684.

Ng, S.S.M. et al. (Jun. 1, 2017). "Heterodimeric IL15 Treatment Enhances Tumor Infiltration, Persistence, and Effector Functions of Adoptively Transferred Tumor-specific T Cells in the Absence of Lymphodepletion," *Clin Cancer Res* 23(11):2817-2830.

Norkin, M et al. (Nov. 27, 2017). "Minimal residual disease by either flow cytometry or cytogenetics prior to an allogeneic hematopoietic stem cell transplant is associated with poor outcome in acute myeloid leukemia," *Blood Cancer J* 7(12):634.

Ossenkoppele, G.J. et al. (Jan. 2016). "Risk factors for relapse after allogeneic transplantation in acute myeloid leukemia," *Haematologica* 101(1):20-25.

Rashidi, A. et al. (Apr. 2016). "Outcomes of Allogeneic Stem Cell Transplantation in Elderly Patients with Acute Myeloid Leukemia: A Systematic Review and Meta-analysis," *Biol Blood Marrow Transplant* 22(4):651-657.

Reya, T. et al. (Nov. 1, 2001). "Stem cells, cancer, and cancer stem cells," *Nature* 414:105-111.

Romee, R. et al. (Jun. 7, 2018). "First-in-human phase 1 clinical study of the IL-15 superagonist complex ALT-803 to treat relapse after transplantation," *Blood* 131(23):2515-2527.

Rosenblatt, J. et al. (Jul. 1, 2013, e-published May 17, 2013). "Vaccination with dendritic cell/tumor fusions following autologous stem cell transplant induces immunologic and clinical responses in multiple myeloma patients," *Clin Cancer Res* 19(13):3640-3648.

Rosenblatt, J. et al. (Dec. 7, 2016). "Individualized vaccination of AML patients in remission is associated with induction of antileukemia immunity and prolonged remissions," *Science Transl Med* 8(368):368ra171.

Sandau, M.M. et al. (Jan. 1, 2010). "IL-15 regulates both quantitative and qualitative features of the memory CD8 T cell pool," *J Immunol* 184(1):35-44.

Sanjabi, S. et al. (Jul. 17, 2009). "Opposing effects of TGF-beta and IL-15 cytokines control the number of short-lived effector CD8+ T cells," *Immunity* 31(1):131-144.

Smith, C.C. et al. (Jul. 6, 2017, e-published May 10, 2017). "Heterogeneous resistance to quizartinib in acute myeloid leukemia revealed by single-cell analysis," *Blood* 130(1):48-58.

Steel, J.C. et al. (Jan. 2012). "Interleukin-15 biology and its therapeutic implications in cancer," *Trends Pharmacol Sci* 33(1):35-41.

Thomas, D. et al. (Mar. 23, 2017). "Biology and relevance of human acute myeloid leukemia stem cells," *Blood* 129(12):1577-1585.

Waldmann T. et al. (1998). "Interleukin-2, interleukin-15, and their receptors," *Int Rev Immunol* 16(3-4):205-226.

Waldmann, T.A. (Aug. 2006). "The biology of interleukin-2 and interleukin-15: implications for cancer therapy and vaccine design," *Nat Rev Immunol* 6(8):595-601.

Wiekmeijer, A.-S. et al. (Jun. 1, 2014). "Sustained Engraftment of Cryopreserved Human Bone Marrow CD34(+) Cells in Young Adult NSG Mice," *BioRes Open Access* 3(3):110-116.

Written Opinion mailed on Jun. 23, 2020, for PCT Application No. PCT/US2020/026615, filed Apr. 3, 2020, 5 pages.

Zeijlemaker, W. et al. (Feb. 2016). "A simple one-tube assay for immunophenotypical quantification of leukemic stem cells in acute myeloid leukemia," *Leukemia* 30(2):439-446.

\* cited by examiner

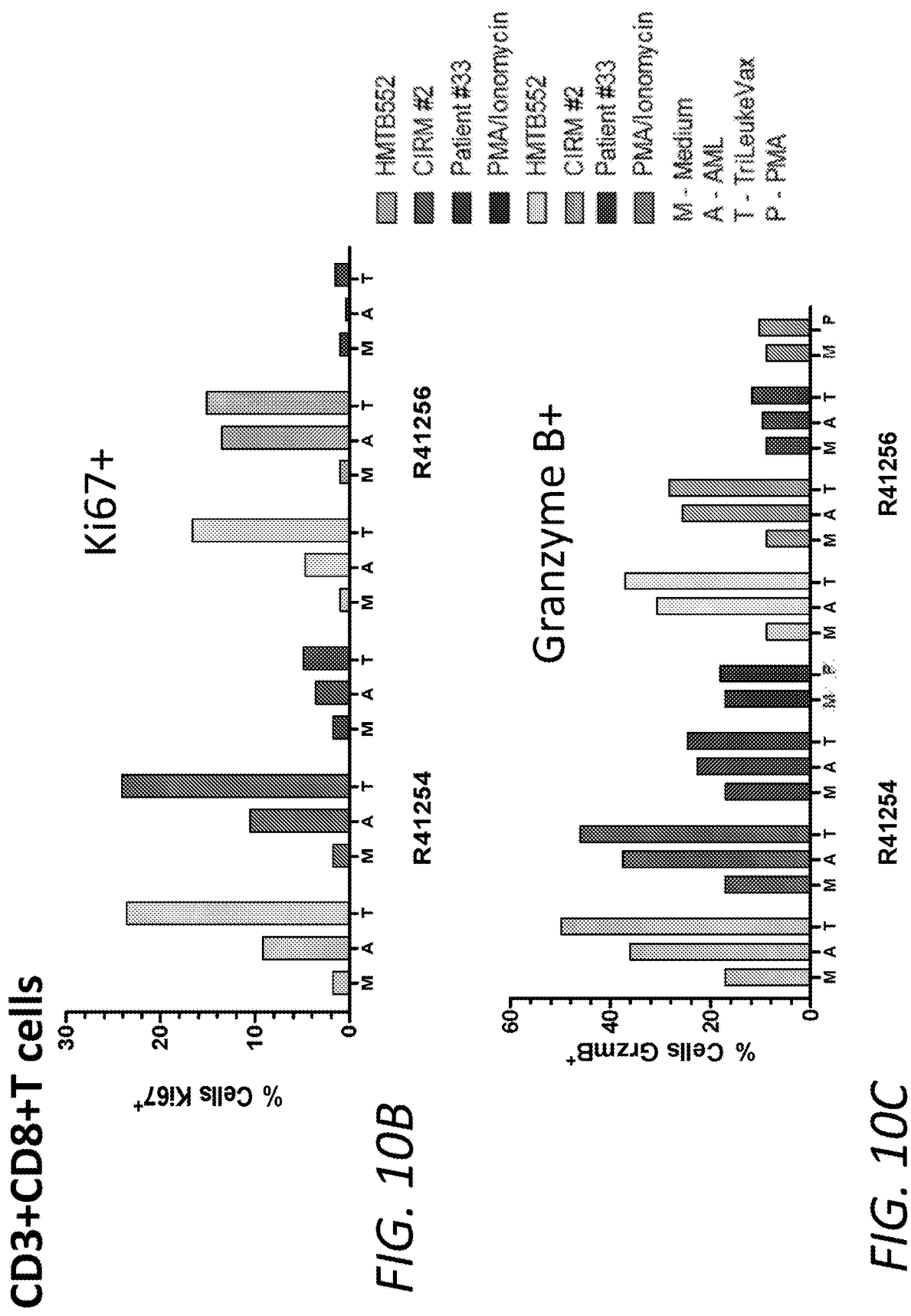

SEQUENCE LISTING

<160> NUMBER OF SEQ ID NOS: 3

<210> SEQ ID NO 1
<211> LENGTH: 288
<212> TYPE: PRT
<213> ORGANISM: Homo sapiens
<220> FEATURE:
<221> NAME/KEY: misc_feature
<223> OTHER INFORMATION: human CD80

-continued

<400> SEQUENCE: 1

Met Gly His Thr Arg Arg Gln Gly Thr Ser Pro Ser Lys Cys Pro Tyr
1               5                   10                  15

Leu Asn Phe Phe Gln Leu Leu Val Leu Ala Gly Leu Ser His Phe Cys
            20                  25                  30

Ser Gly Val Ile His Val Thr Lys Glu Val Lys Glu Val Ala Thr Leu
        35                  40                  45

Ser Cys Gly His Asn Val Ser Val Glu Glu Leu Ala Gln Thr Arg Ile
    50                  55                  60

Tyr Trp Gln Lys Glu Lys Lys Met Val Leu Thr Met Met Ser Gly Asp
65                  70                  75                  80

Met Asn Ile Trp Pro Glu Tyr Lys Asn Arg Thr Ile Phe Asp Ile Thr
                85                  90                  95

Asn Asn Leu Ser Ile Val Ile Leu Ala Leu Arg Pro Ser Asp Glu Gly
            100                 105                 110

Thr Tyr Glu Cys Val Val Leu Lys Tyr Glu Lys Asp Ala Phe Lys Arg
        115                 120                 125

Glu His Leu Ala Glu Val Thr Leu Ser Val Lys Ala Asp Phe Pro Thr
    130                 135                 140

Pro Ser Ile Ser Asp Phe Glu Ile Pro Thr Ser Asn Ile Arg Arg Ile
145                 150                 155                 160

Ile Cys Ser Thr Ser Gly Gly Phe Pro Glu Pro His Leu Ser Trp Leu
                165                 170                 175

Glu Asn Gly Glu Glu Leu Asn Ala Ile Asn Thr Thr Val Ser Gln Asp
            180                 185                 190

Pro Glu Thr Glu Leu Tyr Ala Val Ser Ser Lys Leu Asp Phe Asn Met
        195                 200                 205

Thr Thr Asn His Ser Phe Met Cys Leu Ile Lys Tyr Gly His Leu Arg
    210                 215                 220

Val Asn Gln Thr Phe Asn Trp Asn Thr Thr Lys Gln Glu His Phe Pro
225                 230                 235                 240

Asp Asn Leu Leu Pro Ser Trp Ala Ile Thr Leu Ile Ser Val Asn Gly
                245                 250                 255

Ile Phe Val Ile Cys Cys Leu Thr Tyr Cys Phe Ala Pro Arg Cys Arg
            260                 265                 270

Glu Arg Arg Arg Asn Glu Arg Leu Arg Arg Glu Ser Val Arg Pro Val
        275                 280                 285

<210> SEQ ID NO 2
<211> LENGTH: 162
<212> TYPE: PRT
<213> ORGANISM: Homo sapiens
<220> FEATURE:
<221> NAME/KEY: misc_feature
<223> OTHER INFORMATION: human interleukin 15

<400> SEQUENCE: 2

Met Arg Ile Ser Lys Pro His Leu Arg Ser Ile Ser Ile Gln Cys Tyr
1               5                   10                  15

Leu Cys Leu Leu Leu Asn Ser His Phe Leu Thr Glu Ala Gly Ile His
            20                  25                  30

Val Phe Ile Leu Gly Cys Phe Ser Ala Gly Leu Pro Lys Thr Glu Ala
        35                  40                  45

Asn Trp Val Asn Val Ile Ser Asp Leu Lys Lys Ile Glu Asp Leu Ile
    50                  55                  60

-continued

Gln Ser Met His Ile Asp Ala Thr Leu Tyr Thr Glu Ser Asp Val His
 65                  70                  75                  80

Pro Ser Cys Lys Val Thr Ala Met Lys Cys Phe Leu Leu Glu Leu Gln
                 85                  90                  95

Val Ile Ser Leu Glu Ser Gly Asp Ala Ser Ile His Asp Thr Val Glu
            100                 105                 110

Asn Leu Ile Ile Leu Ala Asn Asn Ser Leu Ser Ser Asn Gly Asn Val
        115                 120                 125

Thr Glu Ser Gly Cys Lys Glu Cys Glu Glu Leu Glu Glu Lys Asn Ile
130                 135                 140

Lys Glu Phe Leu Gln Ser Phe Val His Ile Val Gln Met Phe Ile Asn
145                 150                 155                 160

Thr Ser

<210> SEQ ID NO 3
<211> LENGTH: 267
<212> TYPE: PRT
<213> ORGANISM: Homo sapiens
<220> FEATURE:
<221> NAME/KEY: misc_feature
<223> OTHER INFORMATION: human interleukin 15 receptor subunit alpha

<400> SEQUENCE: 3

Met Ala Pro Arg Arg Ala Arg Gly Cys Arg Thr Leu Gly Leu Pro Ala
 1               5                  10                  15

Leu Leu Leu Leu Leu Leu Arg Pro Pro Ala Thr Arg Gly Ile Thr
             20                  25                  30

Cys Pro Pro Pro Met Ser Val Glu His Ala Asp Ile Trp Val Lys Ser
                 35                  40                  45

Tyr Ser Leu Tyr Ser Arg Glu Arg Tyr Ile Cys Asn Ser Gly Phe Lys
 50                  55                  60

Arg Lys Ala Gly Thr Ser Ser Leu Thr Glu Cys Val Leu Asn Lys Ala
 65                  70                  75                  80

Thr Asn Val Ala His Trp Thr Thr Pro Ser Leu Lys Cys Ile Arg Asp
                 85                  90                  95

Pro Ala Leu Val His Gln Arg Pro Ala Pro Pro Ser Thr Val Thr Thr
            100                 105                 110

Ala Gly Val Thr Pro Gln Pro Glu Ser Leu Ser Pro Ser Gly Lys Glu
        115                 120                 125

Pro Ala Ala Ser Ser Pro Ser Ser Asn Asn Thr Ala Ala Thr Thr Ala
130                 135                 140

Ala Ile Val Pro Gly Ser Gln Leu Met Pro Ser Lys Ser Pro Ser Thr
145                 150                 155                 160

Gly Thr Thr Glu Ile Ser Ser His Glu Ser Ser His Gly Thr Pro Ser
                165                 170                 175

Gln Thr Thr Ala Lys Asn Trp Glu Leu Thr Ala Ser Ala Ser His Gln
            180                 185                 190

Pro Pro Gly Val Tyr Pro Gln Gly His Ser Asp Thr Thr Val Ala Ile
        195                 200                 205

Ser Thr Ser Thr Val Leu Leu Cys Gly Leu Ser Ala Val Ser Leu Leu
210                 215                 220

Ala Cys Tyr Leu Lys Ser Arg Gln Thr Pro Pro Leu Ala Ser Val Glu
225                 230                 235                 240

Met Glu Ala Met Glu Ala Leu Pro Val Thr Trp Gly Thr Ser Ser Arg
                245                 250                 255

-continued

```
Asp Glu Asp Leu Glu Asn Cys Ser His His Leu
            260                 265
```

HUMAN VACCINE COMPOSITIONS AND METHODS FOR TREATING LEUKEMIA

CROSS-REFERENCE TO RELATED APPLICATIONS

The present application is a U.S. National Phase Application of PCT International Application No. PCT/US2020/026615, filed on Apr. 3, 2020, designating the United States of America, which is an International Application of and claims the benefit of priority to U.S. Provisional Patent Application Ser. No. 62/829,874, filed on Apr. 5, 2019, which is herein expressly incorporated by reference in its entirety, including any drawings.

STATEMENT REGARDING FEDERALLY SPONSORED R&D

This invention was made with government support under grant no. R21 CA177284 awarded by the National Institutes of Health. The government has certain rights in the invention.

INCORPORATION OF THE SEQUENCE LISTING

The material in the accompanying Sequence Listing is hereby incorporated by reference into this application. The accompanying Sequence Listing text file, named "048536-633N01US Sequence Listing ST25.txt." was created on Sep. 20, 2021 and is 8 KB.

FIELD

The present disclosure relates generally to nucleic acids including coding sequences for human CD80, IL-15, IL-15Rα polypeptides, recombinant cells containing such nucleic acids, cell cultures, pharmaceutical compositions, e.g., whole-cell vaccines. Also disclosed are methods useful for treating myeloma and leukemias, such as acute myelogenous leukemia (AML).

BACKGROUND

Leukemia is a hematological malignant progressive disease characterized by the proliferation and accumulation of immature hematopoietic cells in the bone marrow and peripheral blood. These leukemic blasts replace the bone marrow, and inhibit the growth and maturation of normal erythroid, myeloid, and megakaryocytic precursors. As a result, the bone marrow and other blood-forming organs produce increased numbers of immature or abnormal leukocytes. These suppress the production of normal blood cells, leading to anemia and other symptoms. It is the most common type of cancer in children, with three quarters of leukemia cases in children being the acute lymphoblastic type. However, about 90% of all leukemias are diagnosed in adults, with acute myelogenous leukemia (AML) and chronic lymphocytic leukemia (CLL) being most common in adults.

Immunotherapies for leukemias such as AML have been extensively explored in recent years with some success. In one approach, genetically engineered AML cells present multiple leukemia-associated and patient-specific antigens and as such hold promise as effective immunotherapeutic vaccines. In this case, there is a need in the field for compositions and methods that allow optimal expression for all antigens, which is critical for vaccine production and for stimulating effective and long-lasting anti-leukemic immunity.

SUMMARY

Provided herein, inter alia, are compositions and methods for the stimulation of an immune response and in particular the treatment of acute myelogenous leukemia (AML) in humans. In particular, the present disclosure provides novel nucleic acids carrying coding sequences for three human-derived polypeptides hCD80, hIL-15, hIL-15Rα, wherein the coding sequence for hCD80 is positioned upstream to the coding sequences for IL-15 and IL-15Rα. Also provided are recombinant cells containing a nucleic acid as disclosed herein, cell cultures, pharmaceutical compositions, containing the same, as well as methods for treating an individual having or suspected of having a condition associated with leukemia, and for stimulating an immune response in an individual in need thereof.

In one aspect, some embodiments of the disclosure relate to a nucleic acid molecule including: (i) a first coding sequence for a human co-stimulatory molecule CD80 (hCD80) or a functional derivative thereof; (ii) a second coding sequence for a human interleukin-15 (hIL-15) or a functional derivative thereof; and (iii) a third coding sequence for a human IL-15 receptor alpha (hIL-15Rα) or a functional derivative thereof; wherein the first coding sequence for hCD80 is operably positioned upstream to the second and the third coding sequences.

In one aspect, some embodiments of the disclosure relate to nucleic acid molecule including, in the 5' to 3' direction: (i) a first coding sequence for a human co-stimulatory molecule CD80 (hCD80) or a functional derivative thereof; (ii) a second coding sequence for a human interleukin-15 (hIL-15) or a functional derivative thereof; and (iii) a third coding sequence for a human IL-15 receptor alpha (hIL-15Rα) or a functional derivative thereof.

Non-limiting exemplary embodiments of the nucleic acid molecule according to the present disclosure can include one or more of the following features. In some embodiments, the first, second, and third nucleic acid sequences are operably linked to one another within a single expression cassette (e.g., polycistronic). In some embodiments, the vector is a tri-cistronic vector. In some embodiments, the first, second, and third nucleic acid sequences are operably linked within multiple expression cassettes. In some embodiments, the synthetic nucleic acid is incorporated into a vector. In some embodiments, the vector is a lentiviral vector, an adeno virus vector, an adeno-associated virus vector, or a retroviral vector. In some embodiments, the vector is a lentiviral vector.

In some embodiments, the nucleic acid molecule further including a coding sequence for an autoproteolytic peptide. In some embodiments, the autoproteolytic peptide includes one or more autoproteolytic cleavage sites derived from calcium-dependent serine endoprotease (furin), a porcine teschovirus-1 2A (P2A), a foot-and-mouth disease virus (FMDV) 2A (F2A), an Equine Rhinitis A Virus (ERAV) 2A (E2A), a Thosea asigna virus 2A (T2A), a cytoplasmic polyhedrosis virus 2A (BmCPV2A), a Flacherie Virus 2A (BmIFV2A), or a combination thereof. In some embodiments, the coding sequence for an autoproteolytic peptide is operably linked downstream to the first coding sequence for the hCD80 or a functional derivative thereof. In some embodiments, the coding sequence for an autoproteolytic peptide is operably linked upstream to the second coding sequence for the hIL-15 or a functional derivative thereof. In some embodiments, the coding sequence for an autoproteolytic peptide is operably linked upstream to the third coding sequence for the hIL-15Rα or a functional derivative thereof.

In one aspect, some embodiments of the disclosure relate to a recombinant cell including a nucleic acid molecule as described herein. In some embodiments, the recombinant cell expresses hIL-15, hIL-15Rα, and hCD80. In some embodiments, the first coding sequence for hCD80 is expressed at a level of at least two-fold higher than the expression of the same coding sequence for hCD80 operably linked downstream to the second and/or the third coding sequence. In some embodiments, the recombinant cell is obtained from an individual having or suspected of having cancer. In some embodiments, the individual is in remission for a cancer. In some embodiments, the recombinant cell is a cancer cell. In some embodiments, the cancer is a leukemia. In some embodiments, the leukemia is AML. In some embodiments, the recombinant cell is a leukemia stem cell (LSC), a human 293T cell, a human K562 cell, a human HT29 cell, a human U937 lymphoma cell, a MM1.S myeloma cell, or an ANBL-6 myeloma cell.

In another aspect, some embodiments of the disclosure relate to methods for making a recombinant cell, including: (a) providing a cell capable of protein expression; (b) transducing the provided cell with a nucleic acid molecule of the disclosure. In some embodiments, the cell capable of protein expression is obtained by leukapheresis of a sample obtained from an individual. In some embodiments, the nucleic acid molecule is encapsulated in a viral capsid or a lipid nanoparticle.

In a related aspect, some embodiments of the disclosure relate to a cell culture including (i) at least one recombinant cell as disclosed herein, and (ii) a culture medium. In some embodiments, the cell culture is irradiated.

In one aspect, some embodiments of the disclosure relate to a pharmaceutical composition including at least one recombinant cell and/or cell culture as disclosed herein, and a pharmaceutically acceptable carrier. In some embodiments, the pharmaceutical composition is formulated into a whole-cell vaccine. In some embodiments, the pharmaceutical composition is sterilely formulated for administration into an individual. In some embodiments, the individual is a human.

In one aspect, some embodiments of the disclosure relate to a method for treating an individual having or suspected of having a condition associated with AML, the method including administering an amount of a whole-cell vaccine including (i) at least one recombinant cell as disclosed herein, and/or (ii) a pharmaceutical composition as disclosed herein.

In one aspect, some embodiments of the disclosure relate to a method for stimulating an immune response in an individual with AML in remission with persistent minimal residual disease (MRD), including administering an amount of therapeutic agent including (i) at least one recombinant cell according as disclosed herein, and/or (ii) a pharmaceutical composition as disclosed herein.

In one aspect, some embodiments of the disclosure relate to a method for increasing the population of one or more cell types selected from the group consisting of $CD3^+CD8^+$ T cells, $CD3^+CD4^+$ T cells, memory $CD8^+$ T cells, NK cells, and NKT cells in an individual in need thereof including administering an amount of therapeutic agent including (i) at least one recombinant cell as disclosed herein, and/or (ii) a pharmaceutical composition as disclosed herein.

Non-limiting exemplary embodiments of the methods according to the present disclosure can include one or more of the following features. In some embodiments, the recombinant cell are allogeneic cells or syngeneic cells. In some embodiments, the recombinant cells are autologous cells obtained from the same individual. In some embodiments, the cells are irradiated. In some embodiments, the method stimulates the proliferation of $CD3^+CD8^+$ T cells and/or $CD3^+CD4^+$ T cells up to two-fold relative to the proliferation of one or more of these cells in individuals who have not been administered with the vaccine. In some embodiments, the method stimulates increased production of interferon gamma (IFNγ) relative to the production of IFNγ in individuals who have not been administered the vaccine. In some embodiments, the method results in increased progression free survival of the individual relative to the rate of progression free survival in individuals with AML who have not been administered the vaccine. In some embodiments, the individual is a human.

In some embodiments, the methods of the disclosure further include administering to the individual a second anti-cancer agent or therapy. In some embodiments, the second anti-cancer agent or therapy is selected from the group consisting of chemotherapy, radiotherapy, immunotherapy, hormonal therapy, toxin therapy, and surgery. In some embodiments, the first agent and the second anti-cancer agent or therapy are administered concomitantly. In some embodiments, the first agent and the second anti-cancer agent or therapy are administered sequentially. In some embodiments, the first agent is administered before the second anti-cancer agent or therapy. In some embodiments, the first agent or therapy is administered before and/or after the second anti-cancer agent or therapy. In some embodiments, the first agent and the second anti-cancer agent or therapy are administered in rotation. In some embodiments, the first agent is administered at the same time as the second anti-cancer agent or therapy. In some embodiments, the first agent and the second anti-cancer agent or therapy are administered together in a single formulation.

In another aspect, some embodiments of the disclosure relate to systems for treating an individual having or suspected of having a condition associated with AML, stimulating an immune response in an individual with AML in remission with persistent MRD, or for increasing the population of one or more cell types, wherein the systems include one or more of: a nucleic acid molecule of the disclosure, a recombinant cell of the disclosure, or a pharmaceutical composition of the disclosure.

Yet another aspect of the disclosure is the use of one or more of: a nucleic acid molecule of the disclosure, a recombinant cell of the disclosure, or a pharmaceutical composition of the disclosure; for treating an individual having or suspected of having a condition associated with AML, stimulating an immune response in an individual with AML in remission with persistent MRD, or for increasing the population of one or more cell types.

The foregoing summary is illustrative only and is not intended to be in any way limiting. In addition to the illustrative embodiments and features described herein, further aspects, embodiments, objects and features of the disclosure will become fully apparent from the drawings and the detailed description and the claims.

BRIEF DESCRIPTION OF THE DRAWINGS

FIG. 1A: Highest levels of intracellular IFN-γ expression are observed in CD3$^+$CD8$^+$ T cells from mice vaccinated with 32Dp210-IL-15/IL-15Rα/CD80 and then restimulated with non-transduced 32Dp210 cells ex vivo, whereas stimulation with BCR-ABL-loaded splenocytes produces IFN-γ levels comparable to background levels in unstimulated controls. The y-axis depicts the percent IFN-γ positive CD3$^+$CD8$^+$ T cells in splenocytes from vaccinated non-tumor-bearing mice. X-axis: splenocytes from naïve=unvaccinated mice; 32Dp210=splenocytes from mice vaccinated weekly, 4 times with unmodified irradiated 32Dp210 parent cells; -IL-15/IL-15Rα=splenocytes from mice vaccinated with 32Dp210-IL-15/IL-15Rα; -CD80=splenocytes from mice vaccinated with 32Dp210-CD80; -IL-15/IL-15Rα/CD80=splenocytes from mice vaccinated with 32Dp210 cells expressing all three gene cassettes, 32Dp210-IL-15/IL-15Rα/CD80. Splenocytes were stimulated for 20 hours with either media alone, with syngeneic C3H splenocytes loaded with an irrelevant control peptide, or BCR-ABL peptide, or with unmodified 32Dp210 cells as indicated. FIG. 1B: Splenocytes from non-tumor-bearing mice treated with the 32Dp210-derived vaccines show high levels of lytic activity to 32Dp210 targets as measured by the percent activated caspase positive 32Dp210 target cells. Only background lytic activity, comparable to that observed in naïve unvaccinated controls was observed when human BCR-ABL peptide loaded syngeneic C3H cells were used as targets. These results demonstrate the vaccine stimulates a polyclonal T cell response to the 32D leukemia cells and that there is no dominant response to human BCR-ABL.

FIG. 8A: NSG mice were injected i.v. (intravenous injection) with $10^7$ allogeneic human PBMC #1 cells and the frequency of CD45$^+$ human cells was serially monitored in blood on days 5-27. FIG. 8B: on Day 14 PDX engrafted with PBMC were vaccinated with irradiated #A7-unmodified AML or #A7-hTriLeukeVax, or did not receive further treatment (PBMC). The frequency of activated human IFNγ$^+$CD3$^+$CD8$^+$CD16$^-$ T cells was determined one week later. Percent IFNγ$^+$ cells is depicted on the Y axis and treatment (with only engrafted PBMC, unmodified irradiated AML or hTriLeukeVax are shown on the X axis. A significantly higher frequency of IFNγ' human CD3-CD8+ T cells was observed in mice vaccinated with TriLeukeVax compared with mice treated with unmodified AML.

FIGS. 10A-10C graphically summarize the results of experiments performed to illustrate the stimulation of allogeneic CD3+CD8+ T cells by hTriLeukeVax. In these experiments, percent interferon gamma (IFNγ) expression and Granzyme B staining as markers of T cell activation and Ki67 expression as a marker of induced T cell proliferation are depicted above each histogram plot and on the Y axis. The different co-culture conditions shown below the X axis are M=medium alone; A=co-culture with unmodified AML; T=co-culture with AML lentivirally transduced to express CD80/IL-15/IL-15Rα (TriLeukeVax). The data from stimulation of two PBMC samples, R1254 (left) and R1256 (right) are indicated below the histogram plots for each group of samples. For each set of co-cultures the AML samples used as stimulators are, from left to right, HMTB552, CIRM #2, and Patient #33, as indicated in the key to the right of the upper plot.

DETAILED DESCRIPTION OF THE DISCLOSURE

Figure 1:
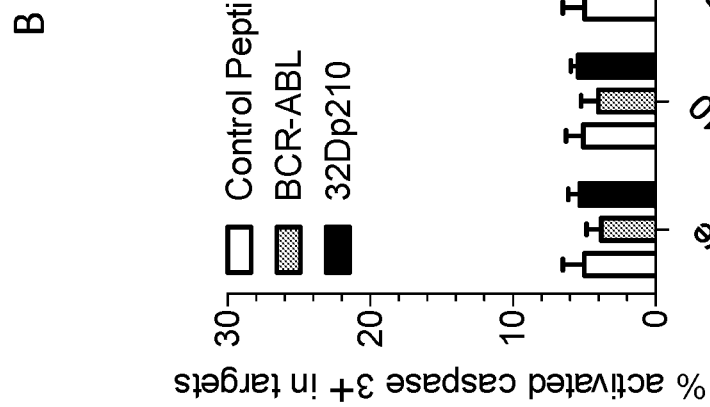
FIGS. 1A-1B show the results of experiments conducted to illustrate that serial vaccination with 32Dp210 murine leukemia-derived whole-cell vaccines in non-tumor-bearing mice stimulates robust antileukemic cytolytic activity (adopted from Shi Y et al., 2018). In the published studies, serial vaccination with murine 32Dp210 leukemia-derived vaccines expressing CD80/IL-15 and IL-15Rα eradicated leukemia in more than 80% of leukemia mice. Since 32Dp210 cells are transformed by transfection and expression of the human BCR-ABL oncogene, studies were also performed to assess whether the predominant T cell response was directed to the xenogeneic BCR-ABL protein.
Figure 1:
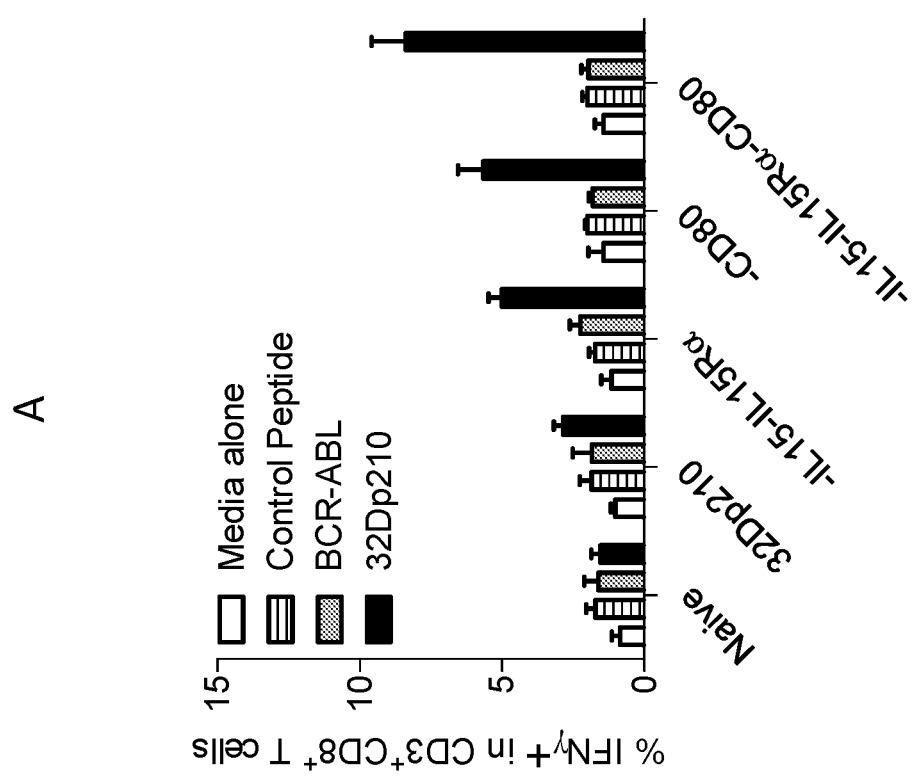

Provided herein, inter alia, are compositions and methods for the stimulation of an immune response and in particular the treatment of acute myelogenous leukemia (AML) in humans. Aspects and embodiments of the disclosure concern new approaches to optimize the expression of the costimulatory molecule CD80, immunostimulatory cytokine interleukin-15 (IL-15), and IL-15Rα, in order to stimulate effective and long-lasting antileukemic immunity, including stimulation of both natural killer and CD8⁺ memory T cells. As described in greater detail below, incorporation of autoproteolytic cleavage sequences in lentiviral polycistronic vectors can help with optimal expression of all three proteins which is critical for vaccine production and effective stimulation of antileukemic cytolytic activity.

Some embodiments of the present disclosure generally relate to synthetic nucleic acids coding for three human polypeptides hCD80, hIL-15, hIL-15Rα, wherein the coding sequence for hCD80 is positioned upstream to the coding sequences for IL-15 and IL-15Rα. Also provided are recombinant cells containing a nucleic acid as disclosed herein, cell cultures, pharmaceutical compositions, containing the same, as well as methods for treating an individual having or suspected of having a condition associated with leukemia, and for stimulating an immune response in an individual in need thereof.

Some embodiments of the disclosure relate to a novel human AML vaccine approach, termed "hTriLeukeVax," which involves a patient-specific, universally applicable, lentivirally engineered autologous AML vaccine. In order to overcome the anergy and exhaustion of AML patients' T cells, an immune stimulation strategy has been designed to combine the following: 1) the immune stimulatory effects of the cytokine IL-15 and its receptor IL-15Rα on both CD8⁺ cytotoxic effector and memory T cells, CD4⁺ T cells and NK cells, and 2) co-expression of the critical co-stimulatory protein CD80 required for effective cytotoxic T cell activation. In addition, autologous leukemia cell vaccines have significant advantages for stimulating broad anti-leukemic immunity because responses are directed to many leukemia-associated or leukemia-specific antigens, some of which are unique to the individual with leukemia. This can reduce the risk of escape mutants that occur with immunotherapies targeting single antigens. The AML vaccine approach disclosed herein is designed to recapitulate the efficacy of donor T cell-mediated Graft vs Leukemia effects (GVL) that enable eradication of leukemia after allogeneic transplantation by broadly and effectively stimulating the individual's own immune responses to target AML blasts and LSC, without the risks and toxicity of allo-transplant. IL-15/IL-15Rα mediated stimulation of NK cells by hTriLeukeVax also provides another mechanism for effectively targeting LSC, because NK cells can preferentially target cancer stem cells. As described above, primary human AML and leukemia stem cells (LSC) are both reliably transduced at readily achievable MOI. In addition, autologous patient-derived PBMC are activated by hTriLeukeVax of the disclosure. Furthermore, a PBMC engrafted PDX model has been developed and demonstrated that vaccination performed with hTriLeukeVax stimulates greater increases in IFN-γ cytotoxic T cells in vivo than does vaccination performed with irradiated unmodified patient AML.

General Experimental Procedures

The practice of the present disclosure will employ, unless otherwise indicated, conventional techniques of molecular biology, microbiology, cell biology, biochemistry, nucleic acid chemistry, and immunology, which are known to those skilled in the art. Such techniques are explained in the literature, such as, *Molecular Cloning: A Laboratory Manual*, fourth edition (Sambrook et al., 2012) and *Molecular Cloning: A Laboratory Manual*, third edition (Sambrook and Russel, 2001), (jointly referred to herein as "Sambrook"); *Current Protocols in Molecular Biology* (F. M. Ausubel et al., eds., 1987, including supplements through 2014); *PCR: The Polymerase Chain Reaction*, (Mullis et al., eds., 1994); Beaucage et al. eds., *Current Protocols in Nucleic Acid Chemistry*, John Wiley & Sons, Inc., New York, 2000, (including supplements through 2014), *Gene Transfer and Expression in Mammalian Cells* (Makrides, ed., Elsevier Sciences B. V., Amsterdam, 2003), and *Current Protocols in Immunology* (Horgan K and S. Shaw (1994) (including supplements through 2014). As appropriate, procedures involving the use of commercially available kits and reagents are generally carried out in accordance with manufacturer defined protocols and/or parameters unless otherwise noted.

Definitions

Unless otherwise defined, all terms of art, notations and other scientific terms or terminology used herein are intended to have the meanings commonly understood by those of skill in the art to which this disclosure pertains. In some cases, terms with commonly understood meanings are defined herein for clarity and/or for ready reference, and the inclusion of such definitions herein should not necessarily be construed to represent a substantial difference over what is generally understood in the art. Many of the techniques and procedures described or referenced herein are well understood and commonly employed using conventional methodology by those skilled in the art.

The singular form "a", "an", and "the" include plural references unless the context clearly dictates otherwise. For example, the term "a cell" includes one or more cells, comprising mixtures thereof. "A and/or B" is used herein to include all of the following alternatives: "A", "B", "A or B", and "A and B".

The term "cancer" refers to or describes the physiological condition in mammals that is typically characterized by unregulated cell growth and/or proliferation. Examples of cancer include but are not limited to, lymphoma, sarcoma, and leukemia (such as AML).

As used herein, an "individual" or a "subject" includes animals, such as human (e.g., human individuals) and non-human animals. In some embodiments, a "subject" or "individual" is a patient under the care of a physician. Thus, the subject can be a human patient or an individual who has, is at risk of having, or is suspected of having a disease of interest (e.g., cancer) and/or one or more symptoms of the disease. The subject can also be an individual who is diagnosed with a risk of the condition of interest at the time of diagnosis or later. The term "non-human animals" includes all vertebrates, e.g., mammals, e.g., rodents, e.g., mice, non-human primates, and other mammals, such as e.g., sheep, dogs, cows, chickens, and non-mammals, such as amphibians, reptiles, etc.

A "therapeutically effective amount" or a "suitable dosage level" refers to a dosage level that provides a therapeutically reasonable balance between pharmacological effectiveness and deleterious effects (e.g., sufficiently immunostimulatory activity imparted by an administered immunogen in the presence of a recombinant vaccine, or other vaccine derived from a recombinant cell-containing composition of the disclosure). For example, this dosage level can be related to the peak or average serum levels in an individual of, e.g., an anti-immunogen antibody produced following administration of an immunogenic composition at the particular dosage level. In other embodiments, a therapeutically effective amount is the minimum concentration required to effect a measurable improvement of a particular disorder. A therapeutically effective amount herein may vary according to factors such as the disease state, age, sex, and weight of the patient, and the ability of vaccine or therapy to elicit a desired response in the individual. A therapeutically effective amount may also be one in which any toxic or detrimental effects of the vaccine or therapy are outweighed by the therapeutically beneficial effects. In the case of cancer, the therapeutically effective amount may reduce the number of cancer cells; reduce the tumor size; inhibit (e.g., slow to some extent and, if desired, stop) cancer cell infiltration into peripheral organs; inhibit (e.g., slow to some extent and, if desired, stop) tumor metastasis: inhibit, to some extent, tumor growth; and/or relieve to some extent one or more of the symptoms associated with the cancer. To the extent the administered composition (such as any of the cell culture or whole-cell vaccine cultures described herein) may prevent growth and/or kill existing cancer cells, it may be cytostatic and/or cytotoxic.

As used herein, the term "lentivirus" refers to a group (or genus) of complex retroviruses that are also useful as a gene delivery vehicles or vector. Illustrative lentiviruses include, but are not limited to: HIV (human immunodeficiency virus; including HIV type 1, and HIV type 2); visna-maedi virus (VMV) virus; the caprine arthritis-encephalitis virus (CAEV); equine infectious anemia virus (EIAV); feline immunodeficiency virus (Hy); bovine immune deficiency virus (BIV); and simian immunodeficiency virus (SIV). For example, HIV based vector backbones (e.g., HIV cis-acting sequence elements) can be suitably used.

The term "operably linked", as used herein, denotes a physical or functional linkage between two or more elements, e.g., polypeptide sequences or polynucleotide sequences, which permits them to operate in their intended fashion. For example, an operably linkage between a polynucleotide of interest and a regulatory sequence (for example, a promoter) is functional link that allows for expression of the polynucleotide of interest. In this sense, the term "operably linked" refers to the positioning of a regulatory region and a coding sequence to be transcribed so that the regulatory region is effective for regulating transcription or translation of the coding sequence of interest. Thus, the term "operably linked" denotes a configuration in which a regulatory sequence is placed at an appropriate position relative to a sequence that encodes a polypeptide or functional RNA such that the control sequence directs or regulates the expression or cellular localization of the mRNA encoding the polypeptide, the polypeptide, and/or the functional RNA. Thus, a promoter is in operable linkage with a nucleic acid sequence if it can mediate transcription of the nucleic acid sequence. Operably linked elements is contiguous or non-contiguous.

The term "vector" is used herein to refer to a nucleic acid molecule or sequence capable transferring or transporting another nucleic acid molecule. The transferred nucleic acid is generally linked to, e.g., incorporated into, the vector nucleic acid molecule. A vector may include sequences that direct autonomous replication in a cell, or may include sequences sufficient to allow integration into host cell DNA. Useful vectors include, for example, plasmids (e.g., DNA plasmids or RNA plasmids), transposons, cosmids, bacterial artificial chromosomes, and viral vectors. Exemplary viral vectors suitable for use in the compositions and methods of the disclosure include, e.g., lentiviral vectors, adeno virus vectors, adeno-associated virus vectors, and retroviral vectors.

As will be appreciated by one of skill in the art, the term "viral vector" is widely used to refer either to a nucleic acid molecule (e.g., a transfer plasmid) that includes virus-derived nucleic acid elements that typically facilitate transfer of the nucleic acid molecule or integration into the genome of a cell or to a viral particle that mediates nucleic acid transfer. Viral particles will typically include various viral components and sometimes also host cell components in addition to nucleic acid(s). The term viral vector may refer either to a virus or viral particle capable of transferring a nucleic acid into a cell or to the transferred nucleic acid itself. Viral vectors and transfer plasmids contain structural and/or functional genetic elements that are primarily derived from a virus. The term "retroviral vector" refers to a viral vector or plasmid containing structural and functional genetic elements, or portions thereof, that are primarily derived from a retrovirus. The term "lentiviral vector" refers to a viral vector or plasmid containing structural and functional genetic elements, or portions thereof, including LTRs that are primarily derived from a lentivirus, which is a genus of retrovirus.

In some aspects, the terms "lentiviral vector," "lentiviral expression vector" may be used to refer to lentiviral transfer plasmids and/or infectious lentiviral particles. Where reference is made herein to elements such as cloning sites, promoters, regulatory elements, heterologous nucleic acids, etc., it is to be understood that the sequences of these elements are present in RNA form in the lentiviral particles of the disclosure and are present in DNA form in the DNA plasmids of the disclosure. In embodiments, lentiviral transfection is used to transfect cells for whole-cell vaccines.

The phrase "recombinantly engineered" refers to cells that have been modified to express or overexpress one or more nucleic acids encoding one or more proteins. Non-limiting examples of common recombinant engineering techniques include transfection, transduction, and electroporation.

Unless specifically stated or obvious from context, as used herein, the term "or" is understood to be inclusive. Unless specifically stated or obvious from context, as used herein, the terms "a", "an", and "the" are understood to be singular or plural. It is understood that aspects and embodiments of the disclosure described herein include "comprising," "consisting," and "consisting essentially of" aspects and embodiments.

It is intended that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein. Ranges provided herein are understood to be shorthand for all of the values within the range. For example, a range of 1 to 50 is understood to include any number, combination of numbers, or sub-range from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination. All combinations of the embodiments pertaining to the disclosure are specifically embraced by the present disclosure and are disclosed herein just as if each and every combination was individually and explicitly disclosed. In addition, all sub-combinations of the various embodiments and elements thereof are also specifically embraced by the present disclosure and are disclosed herein just as if each and every such sub-combination was individually and explicitly disclosed herein.

Compositions of the Disclosure

One aspect of the disclosure relates generally to novel nucleic acid molecules, which can be isolated, synthetic, or recombinant nucleic acids. The nucleic acid molecules of the disclosure include coding sequences for human hCD80, hIL-15, and hIL-15Rα proteins, wherein the coding sequence for hCD80 is operably positioned upstream to the coding sequences for IL-15 and IL-15Rα. As used herein, the term "upstream" in reference to a nucleic acid sequence refers to a location that is distal from a point of reference in a 5' direction of the nucleic acid sequence. Similarly, the term "downstream" refers to a location that is distal from a point of reference in a 3' direction of a nucleic acid sequence. Accordingly, in some embodiments, the coding sequence for hCD80 is positioned adjacently upstream to the coding sequences for IL-15 in which case, the nucleic acid molecules contain, in the 5' to 3' direction, 5'-hCD80/hIL-15/hIL-15Rα-3'. In some embodiments, the coding sequence for hCD80 is positioned adjacently upstream to the coding sequences for IL-15Rα in which case, the nucleic acid molecules contain, in the 5' to 3'direction, 5'-hCD80/hIL-15Rα/hIL-15-3'.

CD80 (cluster of differentiation 80, which is also known as B7-1) is a protein found on dendritic cells, activated B cells and monocytes that provides a costimulatory signal necessary for T cell activation and survival. It has been reported that CD80 is required for optimal T cell activation and leukemia-specific cytolytic effects, and can function as the ligand for two different proteins on the T cell surface: CD28 (for autoregulation and intercellular association) and CTLA-4 (for attenuation of regulation and cellular disassociation). It has also been reported that CD80 works in tandem with CD86 to prime T cells. CD80 is involved in the costimulatory signal essential for T-lymphocyte activation. T-cell proliferation and cytokine production is induced by the binding of CD28, binding to CTLA-4. Human CD80 can be identified by, or largely homologous to the amino acid sequence of UniProt P33681.

```
Human CD80 amino acid sequence (SEQ ID NO: 1):
MGHTRRQGTS PSKCPYLNFF QLLVLAGLSH FCSGVIHVTK

EVKEVATLSC GHNVSVEELA QTRIYWQKEK KMVLTMMSGD
```

```
MNIWPEYKNR TIFDITNNLS IVILALRPSD EGTYECVVLK

YEKDAFKREH LAEVTLSVKA DFPTPSISDF EIPTSNIRRI

ICSTSGGFPE PHLSWLENGE ELNAINTTVS QDPETELYAV

SSKLDFNMTT NHSFMCLIKY GHLRVNQTFN WNTTKQEHFP

DNLLPSWAIT LISVNGIFVI CCLTYCFAPR CRERRRNERL

RRESVRPV.
```

Interleukin-15 (IL-15) is a cytokine with structural similarity to Interleukin-2 (IL-2). Similarly to IL-2, IL-15 binds to and signals through a complex composed of IL-2/IL-15 receptor beta chain (CD122) and the common gamma chain (gamma-C, CD132). IL-15 is secreted by mononuclear phagocytes (and some other cells) following infection by virus. This cytokine induces cell proliferation of natural killer cells, cells of the innate immune system whose principal role is to kill virally infected cells. It has been reported that IL-15 is a γc-chain cytokine, with unique properties suited to stimulating antitumor immunity, including stimulation of both natural killer and CD8+ cytotoxic memory T cells. It has also been reported that IL-15 stimulates the proliferation of T-lymphocytes. Human IL-15 can be identified by, or largely homologous to the amino acid sequence of UniProt P40933.

```
Human IL-15 amino acid sequence (SEQ ID NO: 2):
MRISKPHLRSISIQCYLCLLLNSHFLTEAGIHVFILGCFSAGLPKTEA

NWVNVISDLKKIEDLIQSMHIDATLYTESDVHPSCKVTAMKCFLLELQ

VISLESGDASIHDTVENLIILANNSLSSNGNVTESGCKECEELEEKNI

KEFLQSFVHIVQMFINTS.
```

"IL-15Ra," or "IL-15Rα," or "interleukin 15 receptor subunit alpha," as used herein, refers to a high affinity receptor for IL-15. IL-15Rα can signal both in cis and trans where IL15Rα from one subset of cells presents IL15 to neighboring IL2Rγ-expressing cells. Expression of different isoforms may alter or interfere with signal transduction. Isoform 5, isoform 6, isoform 7 and isoform 8 do not bind IL15. Signal transduction involves SYK. Co-expression of IL-15 and IL-15Rα has been reported to markedly increase IL-15 stability, activity and secretion. Human IL-15Rα is identified by, or largely homologous to, UniProt Q13261.

```
Human IL-15Rα amino acid sequence (SEQ ID NO: 3):
MAPRRARGCR TLGLPALLLL LLLRPPATRG ITCPPPMSVE

HADIWVKSYS LYSRERYICN SGFKRKAGTS SLTECVLNKA

TNVAHWTTPS LKCIRDPALV HQRPAPPSTV TTAGVTPQPE

SLSPSGKEPA ASSPSSNNTA ATTAAIVPGS QLMPSKSPST

GTTEISSHES SHGTPSQTTA KNWELTASAS HQPPGVYPQG

HSDTTVAIST STVLLCGLSA VSLLACYLKS RQTPPLASVE

MEAMEALPVT WGTSSRDEDL ENCSHHL.
```

Some embodiments of the disclosure concern a nucleic acid molecule including three coding sequences operably linked to one another in a specific order: (i) a first coding sequence for a human co-stimulatory molecule CD80 (hCD80) or a functional derivative thereof; (ii) a second coding sequence for a human interleukin-15 (hIL-15) or a functional derivative thereof; and (iii) a third coding sequence for a human IL-15 receptor alpha (hIL-15Rα) or a functional derivative thereof; wherein the first coding sequence for hCD80 is operably positioned upstream to the second and the third coding sequences.

A person skilled in the art will appreciate that the terms "nucleic acid molecule" and "polynucleotide" can be used interchangeably, and refer to both RNA and DNA molecules, including nucleic acid molecules comprising cDNA, genomic DNA, synthetic DNA, and DNA or RNA molecules containing nucleic acid analogs. A nucleic acid molecule can be double-stranded or single-stranded (e.g., a sense strand or an antisense strand). A nucleic acid molecule may contain unconventional or modified nucleotides. The terms "polynucleotide sequence" and "nucleic acid sequence" as used herein interchangeably refer to the sequence of a polynucleotide molecule. The nomenclature for nucleotide bases as set forth in 37 CFR § 1.822 is used herein.

The term "recombinant" as used herein in reference to a nucleic acid molecule, refers to a molecule that has been altered through human intervention. For example, a cDNA is a recombinant DNA molecule, as is any nucleic acid molecule that has been generated by in vitro polymerase reaction(s), or to which linkers have been attached, or that has been integrated into a vector, such as a cloning vector or expression vector. As non-limiting examples, a synthetic nucleic acid molecule: 1) has been synthesized or modified in vitro, for example, using chemical or enzymatic techniques (for example, by use of chemical nucleic acid synthesis, or by use of enzymes for the replication, polymerization, exonucleolytic digestion, endonucleolytic digestion, ligation, reverse transcription, transcription, base modification (including, e.g., methylation), or recombination (including homologous and site-specific recombination)) of nucleic acid molecules; 2) includes conjoined nucleotide sequences that are not conjoined in nature, 3) has been engineered using molecular cloning techniques such that it lacks one or more nucleotides with respect to the naturally occurring nucleic acid molecule sequence, and/or 4) has been manipulated using molecular cloning techniques such that it has one or more sequence changes or rearrangements with respect to the naturally occurring nucleic acid sequence.

In some embodiments, the human polypeptides of the disclosure are derived from a human source, e.g., (i) isolated from a human, (ii) modified, designed and/or synthesized based on human polypeptides, and are functionally and structurally related to the original human proteins. As such, in some embodiments, the human polypeptides of the disclosure are the polypeptides originally isolated from human cells. In some embodiments, the human polypeptides of the disclosure are polypeptides obtained by modifying the polypeptides originally isolated from human cells. In some embodiments, the human polypeptides of the disclosure are polypeptides designed based on the polypeptides originally isolated from human cells. In some embodiments, the human polypeptides of the disclosure are polypeptides synthesized, in vitro or in vivo, based on the polypeptides originally isolated from human cells. It should be understood that human nucleotide sequences and proteins encoded thereby often include some degree of variation across the entire spectrum of allelic sequences within the global populations. Accordingly, in some embodiments, the human polypeptides of the disclosure have about 95%, 96%, 97%, 98%, 99%, 99.5%, or about 100% identical to a polynucleotide originally isolated from human cells.

In some embodiments, the nucleic acids of the disclosure includes coding sequences for functional derivatives of the polypeptides described above. The term "derivative" refers to polypeptides having amino acid sequences that are at least 80%, at least 85%, at least 90%, at least 95%, at least 96%, at least 97%, at least 98%, or at least 99% identical to the amino acid sequence of a human co-stimulatory molecule CD80, a human interleukin-15, or a human IL-15 receptor alpha. In some embodiments, a derivative refers to a polypeptide having amino acid sequences that are at least 80%, at least 85%, at least 90%, at least 95%, at least 96%, at least 97%, at least 98%, or at least 99% identical to the amino acid sequence of SEQ ID NO: 1, SEQ ID NO: 2, or SEQ ID NO: 3.

The term "functional derivative" refers to polypeptide derivatives that are fully functional in comparison to any one of (i) a human co-stimulatory molecule CD80, (ii) a human interleukin-15), or (iii) a human IL-15 receptor alpha; or which retain at least some, for example at least 50%, at least 60%, at least 70%, at least 80%, at least 90%, at least 95%, at least 96%, at least 97%, at least 98%, or at least 99% of the biological activity of any of (i) to (iii). In some embodiments, a functional derivative refers to polypeptide derivatives that are fully functional in comparison to any one of (i) the polypeptide of SEQ ID NO: 1, (ii) the polypeptide of SEQ ID NO: 2, or (iii) the polypeptide of SEQ ID NO: 3; or which retain at least some, for example at least 50%, at least 60%, at least 70%, at least 80%, at least 90%, at least 95%, at least 96%, at least 97%, at least 98%, or at least 99% of the biological activity of any of (i) to (iii). As such, the term functional derivative encompasses a functional fragment, variant (e.g., structurally and functionally similar to any of the proteins of (i) to (iii) and has at least one functionally equivalent domain). In some embodiments, functional derivative of (i), (ii) or (iii) is a fusion molecule or fusion protein thereof. It is understood that polypeptides, fusion proteins, fusion molecules and protein complexes coupled with the polypeptides or functional polypeptide derivatives are also encompassed by the term "functional derivative." In some embodiments, a functional derivative of the present disclosure is capable of modulating an immune response, e.g., capable of detectably decreasing or increasing an immune response, for example, B cell activation and/or T cell activation. In some embodiments, such increases or decreases may be at least about 2%, 5%, 10%, 15%, 20%, 25%, 30%, 40%, 50%, 60%, 70%, 75%, 80%, 85%, 90%, 95%, 98%, 100%, 150%, 200%, 250%, 300%, 400%, 500%, 1000% or more or within any range between any two of these values. Modulation of the immune response may be determined subjectively or objectively, e.g., by the subject's self-assessment, by a clinician's assessment or by conducting an appropriate assay or measurement, including, e.g., assessment of the extent and/or quality of immunostimulation (e.g., immune-stimulation) in an individual achieved by an administered immunogen. Modulation may be transient, prolonged or permanent or it may be variable at relevant times during or after a composition of the disclosure is administered to an individual or is used in an assay or other method described herein or a cited reference, e.g., within times described infra, or about 12 hours to 24 or 48 hours after the administration or use of a composition the disclosure to about 3, 4, 5, 6, 7, 8, 9, 10, 11, 12, 13, 14, 21, 28 days, or 1, 3, 6, 9 months or more after an individual(s) has received such an immunostimulatory (e.g., immune-stimulatory) composition and/or treatment. In some embodiments, modulation of the immune response is a stimulation of an immune response.

In some embodiments of the nucleic acid molecules disclosed herein, the first nucleic acid sequence, the second nucleic acid sequence, and the third nucleic acid sequence are operably linked to one another as cistronic components of a single expression cassette, e.g., polycistronic expression cassette, wherein the three nucleic acid sequences are separated from one another by a sequence encoding an internal ribosomal entry site (IRES) or an autoproteolytic peptide (e.g., a 2A sequence), which provides for expression of each nucleic acid sequence separately or for the immediate cleavage into separate polypeptides upon expression. In some embodiments, the expression cassette is a tri-cistronic expression cassette. Yet in other embodiments, the first nucleic acid sequence, the second nucleic acid sequence, and the third nucleic acid sequence are operably positioned within multiple expression cassettes carried by a nucleic acid molecule as disclosed herein.

In some embodiments, the nucleic acid molecules of the disclosure contain, in the 5' to 3' direction, (i) a first coding sequence for a hCD80 or a functional derivative thereof; (ii) a second coding sequence for a hIL-15 or a functional derivative thereof; and (iii) a third coding sequence for a hIL-15Rα) or a functional derivative thereof (e.g., 5'-hCD80/hIL-15/hIL-15Rα-3').

In some embodiments, the nucleic acid molecules of the disclosure contain, in 5'→3' direction, (i) a first coding sequence for a hCD80 or a functional derivative thereof; (ii) a second coding sequence for a hIL-15Rα or a functional derivative thereof; and (iii) a third coding sequence for a hIL-15 or a functional derivative thereof (e.g., 5'-hCD80/hIL-15Rα/hIL-15-3').

Also provided herein are vectors, plasmids or viruses containing one or more of the nucleic acid molecules disclosed herein. The nucleic acid molecules described above can be incorporated within a vector that is capable of directing their expression in, for example, a cell that has been transformed/transduced with the vector. Suitable vectors for use in eukaryotic and prokaryotic cells are known in the art and are commercially available or readily prepared by a skilled artisan. Additional vectors can also be found, for example, in Ausubel, F. M., et al., *Current Protocols in Molecular Biology*, (Current Protocol, 1994) and Sambrook et al., *"Molecular Cloning: A Laboratory Manual,"* 2nd ED. (1989). In some embodiments, the vector is a viral vector. Non-limiting examples of suitable viral vectors include lentiviral vectors, adeno virus vectors, adeno-associated virus vectors, and retroviral vectors. Retroviral vectors, including lentiviral vectors, can be suitably used for the compositions and methods disclosed herein. In certain embodiments, the vector is a lentiviral vector.

In some embodiments, the nucleic acid molecule further includes a coding sequence for an autoproteolytic peptide. Generally, any proteolytic cleavage site known in the art can be incorporated into the nucleic acid molecules of the disclosure and can be, for example, proteolytic cleavage sequences that are cleaved post-production by a protease. Further suitable proteolytic cleavage sites also include proteolytic cleavage sequences that can be cleaved following addition of an external protease. As used herein the term "autoproteolytic peptide" or "autoprotease" refers to a "self-cleaving" peptide that possesses autoproteolytic activity and is capable of cleaving itself from a larger polypeptide moiety. First identified in the foot-and-mouth disease virus (FMDV), a member of the picornavirus group, several auto-proteases have been subsequently identified such as, for example, "2A like" peptides from equine rhinitis A virus (E2A), porcine teschovirus-1 (P2A) and Thosea asigna virus (T2A), and their activities in proteolytic cleavage have been shown in various in vitro and in vivo eukaryotic systems. As such, the concept of auto-proteases is available to one of skill in the art with many naturally occurring auto-protease systems have been identified. Well studied auto-protease systems are e.g. viral proteases, developmental proteins (e.g. HetR, Hedgehog proteins), RumA autoprotease domain, UmuD, etc.).

Non-limiting examples of auto-protease peptides suitable for the compositions and methods of the present disclosure include the peptide sequences from porcine teschovirus-1 2A (P2A), a foot-and-mouth disease virus (FMDV) 2A (F2A), an Equine Rhinitis A Virus (ERAV) 2A (E2A), a Thosea asigna virus 2A (T2A), a cytoplasmic polyhedrosis virus 2a (BmCPV2A), a Flacherie Virus 2A (BmIFV2A), or a combination thereof. Accordingly, in some embodiments, the nucleic acid molecule of the disclosure includes a coding sequence for an autoproteolytic peptide which includes one or more autoproteolytic cleavage sequences derived from a calcium-dependent serine endoprotease (furin), a porcine teschovirus-1 2A (P2A), a foot-and-mouth disease virus (FMDV) 2A (F2A), an Equine Rhinitis A Virus (ERAV) 2A (E2A), a Thosea asigna virus 2A (T2A), a cytoplasmic polyhedrosis virus 2A (BmCPV2A), a Flacherie Virus 2A (BmIFV2A), or a combination thereof. In some embodiments, the nucleic acid molecule of the disclosure includes coding sequences for one, two, three, four, or more autoproteolytic cleavage sequences. In some embodiments, a furin autoproteolytic cleavage sequence is operably positioned downstream to the hCD80 polypeptide sequence and upstream to the hIL-15 polypeptide sequence. In some embodiments, a P2A autoproteolytic cleavage sequence is operably positioned downstream to the IL-15 sequence and upstream to the IL15Rα. In some embodiments, a furin and a F2A autoproteolytic cleavage sequence are operably linked in tandem and inserted between the hCD80 polypeptide sequence and the hIL-15 polypeptide sequence.

In some embodiments, the nucleic acid molecules of the disclosure further include a coding sequence for an autoproteolytic peptide is operably linked downstream to the first coding sequence for the hCD80 or a functional derivative thereof. In some embodiments, the coding sequence for an autoproteolytic peptide is operably linked upstream to the second coding sequence for the hIL-15 or a functional derivative thereof. In some embodiments, the coding sequence for an autoproteolytic peptide is operably linked upstream to the third coding sequence for the hIL-15Rα or a functional derivative thereof. In some embodiments, the coding sequence for an autoproteolytic peptide is operably linked downstream to the first coding sequence for the hCD80 or a functional derivative thereof, and upstream to the second coding sequence for the hIL-15 or a functional derivative thereof.

In some embodiments, the nucleic acid molecules of the disclosure include coding sequences for the following polypeptide components, in the 5' to 3' direction, 5'-hCD80-Furin-hIL15-P2A-hIL15Rα-3'. In some other embodiments, the nucleic acid molecules of the disclosure include, in the 5' to 3' direction: (i) a first coding sequence for a human co-stimulatory molecule CD80 (hCD80) or a functional derivative thereof; (ii) a furin autoproteolytic cleavage sequence; (iii) an F2A autoproteolytic cleavage sequence; (iv) a second coding sequence for a human interleukin-15 (hIL-15) or a functional derivative thereof; (v) an P2A autoproteolytic cleavage sequence; and (vi) a third coding sequence for a human IL-15 receptor alpha (hIL-15Rα) or a functional derivative thereof, as follows: 5'-hCD80-Furin-F2A-hIL15-P2A-hIL15Rα-3'.

In some embodiments of the disclosure, at least one of the first, second, and third coding sequence is sequence optimized. In some embodiments, at least one of the first, second, and third coding sequence is sequence optimized for expression in a target host cell. A sequence-optimized nucleotide sequence, e.g., a codon-optimized mRNA sequence encoding a polypeptide disclosed herein, typically is a sequence comprising at least one synonymous nucleobase substitution with respect to a reference sequence (e.g., a wild type nucleotide sequence encoding a site-specific endonuclease). A sequence-optimized nucleotide sequence can be partially or completely different in sequence from the reference sequence. Sequence optimization tools, algorithms and service companies are known in the art. Non-limiting examples include services from GeneArt (Thermo Fischer Scientific), ATUM (formerly DNA2.0; Menlo Park CA), and Integrated DNA Technologies, Inc. (IDT).

Recombinant Cells and Cell Cultures

The nucleic acid molecule of the present disclosure can be introduced into a host cell, such as a human cancer cell, to produce a recombinant cell containing the nucleic acid molecule. The terms "host cell" and "recombinant cell" are used interchangeably herein. It is understood that such terms refer not only to the particular subject cell but also to the progeny or potential progeny of such a cell. Because certain modifications may occur in succeeding generations due to either mutation or environmental influences, such progeny may not, in fact, be identical to the parent cell, but are still included within the scope of the term as used herein. In some embodiments, the nucleic acid molecule is introduced into a host cell by a transduction procedure, electroporation procedure or a biolistic procedure.

In the recombinant cell, the nucleic acid molecule can be stably integrated in the host genome, or can be episomally replicating, or present in the recombinant host cell as a mini-circle expression vector for a stable or transient expression. Accordingly, in some embodiments disclosed herein, the nucleic acid molecule is maintained and replicated in the recombinant host cell as an episomal unit. In some embodiments, the nucleic acid molecule is stably integrated into the genome of the recombinant cell. Stable integration can be completed using classical random genomic recombination techniques or with more precise genome editing techniques such as using zinc-finger proteins (ZNF), guide RNA directed CRISPR/Cas9, DNA-guided endonuclease genome editing NgAgo (*Natronobacterium gregoryi* Argonaute), or TALEN genome editing (transcription activator-like effector nucleases). In some embodiments, the nucleic acid molecule present in the recombinant host cell as a mini-circle expression vector for a stable or transient expression.

In some embodiments, host cells can be genetically engineered (e.g., transduced or transformed or transfected) with, for example, a vector construct of the present application that can be, for example, a viral vector or a vector for homologous recombination that includes nucleic acid sequences homologous to a portion of the genome of the host cell, or can be an expression vector for the expression of the polypeptides of interest. Host cells can be either untransformed cells or cells that have already been transfected with at least one nucleic acid sequence.

Techniques for transforming a wide variety of the above-mentioned host cells and species are known in the art and described in the technical and scientific literature. Accordingly, cell cultures including at least one recombinant cell as disclosed herein are also within the scope of this application. Methods and systems suitable for generating and maintaining cell cultures are known in the art.

In some embodiments, the recombinant cell of the disclosure includes a nucleic acid molecule including (1) a first coding sequence for a human co-stimulatory molecule CD80 (hCD80) or a functional derivative thereof; (2) a second coding sequence for a human interleukin-15 (hIL-15) or a functional derivative thereof; and (3) a third coding sequence for a human IL-15 receptor alpha (hIL-15Rα) or a functional derivative thereof, wherein the first coding sequence for hCD80 is operably positioned upstream to the second and the third coding sequences. In some embodiments, the recombinant cell of the disclosure includes a nucleic acid molecule including, in the 5' to 3' direction, (i) a first coding sequence for a hCD80 or a functional derivative thereof; (ii) a second coding sequence for a hIL-15 or a functional derivative thereof; and (iii) a third coding sequence for a hIL-15Rα) or a functional derivative thereof (e.g., 5'-hCD80/hIL-15/hIL-h15Rα-3'). In some other embodiments, the recombinant cell of the disclosure includes a nucleic acid molecule including, in the 5' to 3' direction, coding sequences for the following polypeptide components, in the 5' to 3' direction, 5'-hCD80-Furin-hIL15-P2A-hIL15Rα-3'. In yet some other embodiments, the recombinant cell of the disclosure includes a nucleic acid molecule including, i in the 5' to 3' direction, coding sequences for the following polypeptide components, in the 5' to 3' direction, 5'-hCD80-Furin-F2A-hIL15-P2A-hIL15Rα-3'. In some embodiments of the disclosure, the recombinant cell of the disclosure expresses all three polypeptides hCD80, hIL-15, and hIL-15Rα.

In some embodiments, the first coding sequence for hCD80 is expressed at a higher level, e.g., at least 20%, at least 50%, at least 70%, at least 80%, at least 90%, at least 100%, at least 150%, at least 200%, at least 250%, at least 300%, at least 3400%, at least 500%, at least 600%, at least 700% higher compared to the expression level of the same coding sequence for hCD80 operably linked downstream to the second and/or the third coding sequence. In some embodiments, the first coding sequence for hCD80 is expressed at a higher level, e.g., at least two-fold, at least three-fold, at least four-fold, at least five-fold, at least six-fold higher than the expression level of the same coding sequence for hCD80 operably linked downstream to the second and/or the third coding sequence In some embodiments, the recombinant cell is derived from an individual having or suspected of having cancer. In some embodiments, the recombinant cell is derived from an individual who is in remission for a cancer. In some embodiments, the recombinant cell is a precancerous cell or a cancer cell. As discussed above, the term "cancer" generally refers to or describes the physiological condition in mammals that is generally characterized by unregulated cell growth and/or proliferation. In some embodiments, indications of cancer include the presence of cells possessing characteristics typical of cancer-causing cells, such as uncontrolled proliferation, immortality, metastatic potential, rapid growth and proliferation rate, and certain characteristic morphological features. In some embodiments, indications of cancer include unregulated cell growth and/or proliferation. Cancer cells are often observed aggregated into a tumor, but such cells can exist alone within an animal subject, or can be a non-tumorigenic cancer cell, such as a leukemia cell. Thus, the terms cancer encompass reference to a solid tumor, a soft tissue tumor, or a metastatic lesion. Examples of cancer include but are not limited to, lymphoma, sarcoma, and leukemia (such as AML). In some embodiments, a cancer is a premalignant cancer. In some embodiments, a cancer is a malignant cancer. In some embodiments, the cancer is a solid tumor, a soft tissue tumor, or a metastatic lesion.

In some embodiments, the recombinant cell is a cancer cell. In some embodiments, the cancer is a leukemia. Generally, the recombinant cell can be of any leukemia cell. Suitable leukemia cells for use in the compositions and methods of the disclosure include, but are not limited to, acute lymphoblastic leukemia (ALL), acute lymphoblastic B-cell leukemia, acute lymphoblastic T-cell leukemia, acute myelogenous leukemia (e.g., acute myeloblastic leukemia, AML), acute promyelocytic leukemia (APL), acute monoblastic leukemia, acute erythroleukemic leukemia, acute megakaryoblastic leukemia, acute myelomonocytic leukemia, acute nonlymphocyctic leukemia, acute undifferentiated leukemia, chronic myelocytic leukemia (CML), chronic lymphocytic leukemia (CLL), and hairy cell leukemia. In some embodiments, the cancer is a myeloma. Accordingly, the recombinant cell in some embodiments can be of a myeloma cell line. In some embodiments, the myeloma cell line is a MM1.S myeloma cell line. In some embodiments, the myeloma cell line is an ANBL-6 myeloma cell line.

In some embodiments, the recombinant cell is an AML cell. In some embodiments, the recombinant cell is of a human immortalized myelogenous leukemia cell line. In some embodiments, the recombinant cell is of a human immortalized embryonic kidney cell line 293T. In some embodiments, the recombinant cell is a leukemia stem cell (LSC). In some embodiments, the recombinant cell is of a human K562 immortalized myelogenous leukemia cell line. In some embodiments, the recombinant cell is of a human HT29 colon cancer cell line. In some embodiments, the recombinant cell is of a human U937 lymphoma cell line.

In another aspect, some embodiments of the disclosure relate to methods for making a recombinant cell, including: (a) providing a cell capable of protein expression; (b) transducing the provided cell with a nucleic acid molecule of the disclosure. In some embodiments, the cell capable of protein expression is obtained by leukapheresis of a sample obtained from an individual. In some embodiments, the nucleic acid molecule is encapsulated in a viral capsid or a lipid nanoparticle. Accordingly, recombinant cells produced by the methods disclosed herein are also encompassed by the present disclosure.

In a related aspect, some embodiments of the disclosure relate to a cell culture including at least one recombinant cell as disclosed herein, and a culture medium. Generally, the culture medium can be any one of suitable culture media for leukemia cells. In some embodiments, the recombinant cell expresses hCD80, hIL-15, and hIL-15Rα. In some embodiments, the cell culture is irradiated. In some embodiments, the recombinant cell secretes hIL-15 pre- and/or post-radiation. In some embodiments, the cell culture is subjected to irradiation to produce irradiated cells. Exemplary irradiations suitable for the compositions and methods disclosed herein include, but are not limited to, ultraviolet irradiation, X-ray irradiation, and/or gamma irradiation. Accordingly, in some embodiments, the cell culture is subjected to ultraviolet irradiation. In some embodiments, the cell culture is subjected to X-ray irradiation. In some embodiments, the cell culture is subjected to gamma irradiation. In some embodiments, the cells are irradiated at a dose of from about 50 to about 200 rads/min or from about 120 to about 140 rads/min prior to administration to an individual in need thereof. In some embodiments, when using irradiation, the levels required are 2,500 rads, 5,000 rads, 10,000 rads, 15,000 rads or 20,000 rads. In some embodiments, the recombinant cell secretes hIL-15 pre- and/or post-irradiation. In some embodiments, the cells produce hIL-15 after irradiation, at a rate that is at least about 10%, at least about 20%, at least about 30%, at least about 40%, at least about 50%, at least about 60%, at least about 70%, at least about 80%, at least about 90%, or at least about 100% of the pre-irradiated level, when standardized for viable cell number. In some embodiments, the cells are rendered proliferation incompetent by irradiation prior to administration to the subject. In some embodiments, the at least one recombinant cell co-expresses hIL-15 and hIL-15Rα, and secretes hIL-15/hIL15Rα complex pre- and/or post-irradiation.

Pharmaceutical Compositions

The nucleic acids, recombinant cells, cell cultures of the disclosure can be incorporated into compositions, including pharmaceutical compositions. Such compositions typically include the recombinant polypeptides and a pharmaceutically acceptable carrier. Accordingly, in one aspect, some embodiments of the disclosure relate to pharmaceutical compositions, including whole-cell vaccine composition, for treating, preventing, ameliorating, reducing or delaying the onset of a leukemia, such as AML. In some embodiments, the pharmaceutical composition comprises at least one recombinant cell and/or cell culture as disclosed herein, in an admixture with a pharmaceutically acceptable carrier. In some embodiments, the pharmaceutical composition of the disclosure is formulated into a whole-cell vaccine. Typically, whole-cell vaccines of the disclosure are prepared from AML cancer cells that are cultured ex vivo and/or in vitro. In embodiments where the recombinant cells express all three polypeptides hCD80, hIL-15, hIL15-Ra, the pharmaceutical compositions of the disclosure contain multiple cell signaling molecules (e.g., hCD80, hIL-15, hIL15-Ra) expressed in the recombinant cells. Once expressed, these signaling molecules can be excreted into the cell culture media, or presented on the cell surface, or both. An advantage of the compositions and methods of the present disclosure is the potential to stimulate responses to multiple antigens. For example, the whole-cell vaccines of the present disclosure do not require definition of specific epitopes, or tailoring to individual HLA. In some embodiments, whole-cell vaccines of the present disclosure are also readily cultured and transduced with lentiviral vectors after cryopreservation.

Known autologous vaccines have been previously described in which a) an engineered cell line expressing a cytokine (e.g., GM-CSF) is co-injected with irradiated tumor cells (e.g. GVAX; Borrello I M et al. *Blood* 2009; 114:1736-45); b) Tumor cells are fused with patient derived and ex vivo expanded dendritic cells (Rosenblatt J et al., *Science Transl. Med.* 2016; 8:368ra 171); or c) vaccines incorporating a variety of adjuvant molecules and peptides derived from common tumor associated antigens. However, these prior vaccines lack the ease of production and administration of the pharmaceutical compositions of the present disclosure. In particular, a major advantage of the approaches of the present disclosure as compared with the cell fusion vaccine described above is that cells are directly transduced for TriLeukeVax production and then cryopreserved. This eliminates the step of placing a central intravenous line to collect dendritic cells in patients in remission, a procedure that is not without risk. The approaches disclosed herein also eliminate the need for large scale culture of patient dendritic cells with the attendant costs and risks of contamination of extended cell culture In certain embodiments, the pharmaceutical compositions in accordance with some embodiments disclosed herein include cell cultures that can be washed, treated, combined, supplemented, or otherwise altered prior to administration to an individual in need thereof. Furthermore, administration can be at varied doses, time intervals or in multiple administrations.

The pharmaceutical compositions provided herein can be in any form that allows for the composition to be administered to an individual. In some specific embodiments, the pharmaceutical compositions are suitable for human administration. As used herein, the term "pharmaceutically acceptable" means approved by a regulatory agency of the Federal or a state government or listed in the U.S. Pharmacopeia or other generally recognized pharmacopeiae for use in animals, and more particularly in humans. The term "carrier" refers to a diluent, adjuvant, excipient, or vehicle with which the pharmaceutical composition is administered. Saline solutions and aqueous dextrose and glycerol solutions can also be employed as liquid carriers, including injectable solutions. Suitable excipients include starch, glucose, lactose, sucrose, gelatin, malt, rice, flour, chalk, silica gel, sodium stearate, glycerol monostearate, talc, sodium chloride, dried skim milk, glycerol, propylene, glycol, water, ethanol and the like. Examples of suitable pharmaceutical carriers are described in "Remington's Pharmaceutical Sciences" by E. W. Martin. In some embodiments, the pharmaceutical composition is sterilely formulated for administration into an individual. In some embodiments, the individual is a human. One of ordinary skilled in the art will appreciate that the formulation should suit the mode of administration.

In some embodiments, the pharmaceutical compositions of the present disclosure are formulated to be suitable for the intended route of administration to an individual. For example, the pharmaceutical composition may be formulated to be suitable for parenteral, intrapleural, inhalation, intraperitoneal, oral, intradermal, colorectal, intraperitoneal, and intratumoral administration. In some embodiments, the pharmaceutical composition may be formulated for intravenous, oral, intraperitoneal, intranasal, intratracheal, subcutaneous, intramuscular, topical, pulmonary, or intratumoral administration.

Methods of Treatment

Administration of pharmaceutical compositions as described above, including whole-cell vaccines can be used in the stimulation of an immune response. In some embodiments, pharmaceutical compositions of the disclosure can be used in methods of treating individuals who have, who are suspected of having, or who may be at high risk for developing one or more health conditions associated with a leukemia. The methods include administering an amount of a whole-cell vaccine including (i) at least one recombinant cell as disclosed herein, and/or (ii) a pharmaceutical composition as disclosed herein. In some embodiments, the methods include administering a therapeutically effective amount of the whole-cell vaccine.

In some embodiments, the pharmaceutical compositions as described above can be used in methods of stimulating an immune response in an individual with AML in remission with persistent minimal residual disease (MRD), which refers to small numbers of cancer cells (such as leukemic cells) that remain in the individual during treatment, or after treatment when the patient is in remission (no symptoms or signs of disease). One of ordinary skill in the art will appreciate that MRD can be detected using conventional diagnostic techniques such as X ray, CT scan, or MRI, or techniques that detect tumors detectable by X ray, CT scan or MRI. In addition, MRD can also be detected using cell-based detection techniques (such as, for example, immunofluorescence, FACS analysis, or in situ hybridization) or biochemical/molecular biological techniques (such as RT-PCR). In some embodiments, the methods of the disclosure include administration of into an individual with AML in remission with persistent MRD an amount of a whole-cell vaccine including (i) at least one recombinant cell as disclosed herein, and/or (ii) a pharmaceutical composition as disclosed herein, thereby stimulate an immune response in the individual. In some embodiments, the methods include administering a therapeutically effective amount of the whole-cell vaccine. In some embodiments, the methods of the disclosure include administering an amount of a whole-cell vaccine including (i) at least one recombinant cell as disclosed herein, and/or (ii) a pharmaceutical composition as disclosed herein into an individual that has previously been treated for cancer but it is unknown or uncertain that they are in remission. In some embodiments, the methods include administering a therapeutically effective amount of the whole-cell vaccine.

In some embodiments, the individual can be a human. In some embodiments, the human can be a human patient who has, who is suspected of having, or who may be at high risk for developing one or more health conditions associated with a leukemia. In some embodiments, some individuals are patients under the care of a physician.

In some embodiments, the human individual can be a pediatric patient, e.g., human patient of 17 years old or younger. In some embodiments, the pediatric patient can be 16 years old or younger, 15 years old or younger, 14 years old or younger, 13 years old or younger, 12 years old or younger, 11 years old or younger, 10 years old or younger, 9 years old or younger, 8 years old or younger, 7 years old or younger, 6 years old or younger, 5 years old or younger, 4 years old or younger, 3 years old or younger, 2 years old or younger, or 1 year old or younger. In some embodiments, the pediatric patient can be 6 months old or younger, 4 months old or younger, 2 months old or younger, or 1 months old or younger. In some embodiments, the pediatric patient can be about 12 to about 17 years.

In some embodiments, the human individual can be an adult individual, such as, an adult older than 18 years old, or 19 years old, 20 years old, 21 years old, 22 years old, 23 years old, 24 years old, a 25 year old, 30 years old, 35 years old, 40 years old or 50 years old.

In some embodiments, the individual can be an elderly or geriatric individual (such as an individual at least about 60 years old, such as any of about 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 or more years old). In some embodiments, the individual can be a non-human animal, such as, mammals. In some embodiments, the mammal can be a non-human primate, dog, horse, or cat.

Figure 8:
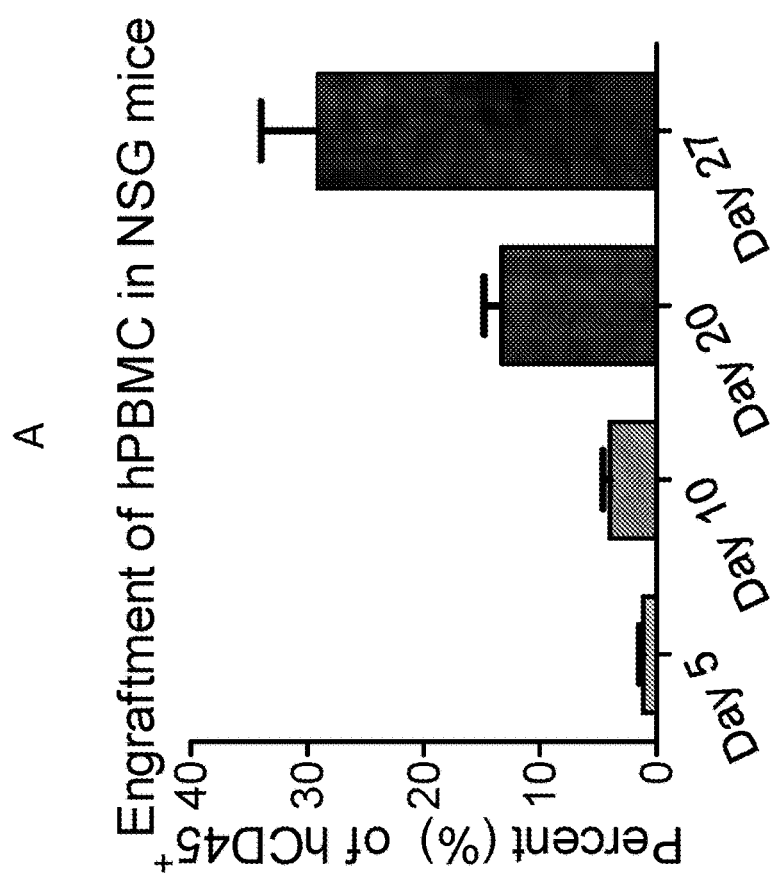
FIGS. 8A-8B illustrate engraftment and in vivo activation of PBMC by an exemplary whole-cell hCD80/hIL-15/hIL-15Rα vaccine of the disclosure in PDX model.
Figure 9:
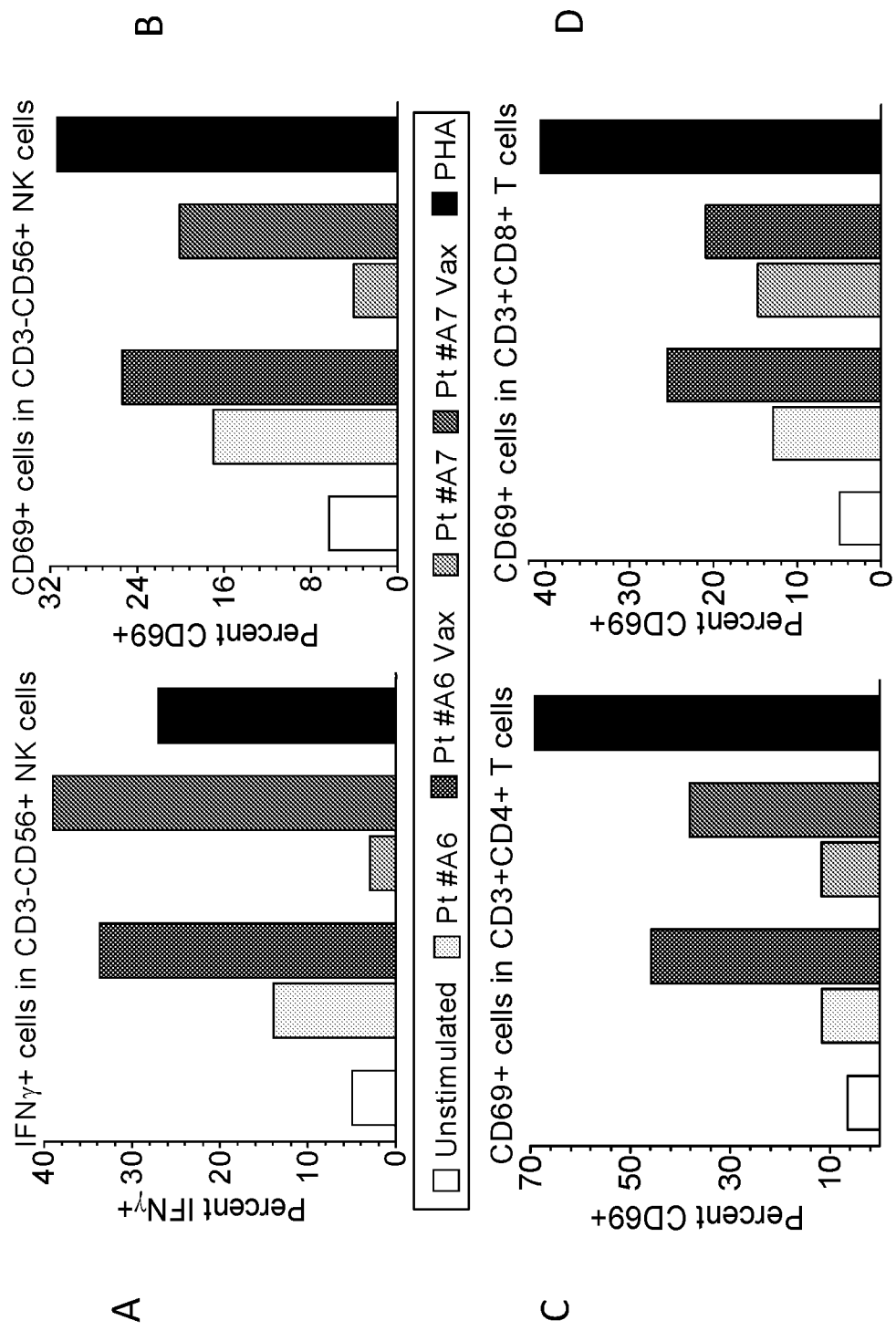
FIGS. 9A-9D graphically illustrate that an exemplary nucleic acid molecule in accordance with some embodiments of the present disclosure activates both innate and adaptive immunity. In these experiments, allogeneic-PBMC were co-cultured with a whole-cell vaccine of the disclosure (hTriLeukeVax) generated from AML blasts from two patients (#A6-vax and #A7-vax), or with irradiated unmodified leukemia designated #A6 and #A7. Percent NK and T cells expressing IFNγ or CD69 as markers of activation, are depicted on the Y axis. The levels of IFNγ and CD69 expression observed with co-culture of PBMCs with unmodified #A6 and A7 AML cells show the background allogeneic responses of PBMC to AML samples. Activated CD3⁻CD56⁺NK cells were stimulated by hTriLeukeVax at higher frequencies than the corresponding frequencies activated by unmodified AML as detected by IFNγ (FIG. 9A) and expression of the activation marker CD69 (FIG. 9B). Similarly, activated CD3$^{30}$ CD4⁺T cells and CD3+CD8+T cells were stimulated by hTriLeuke Vax at higher frequencies than the corresponding frequencies activated by unmodified AML as detected by CD69 expression (FIG. 9C and 9D).
Figure 10A:
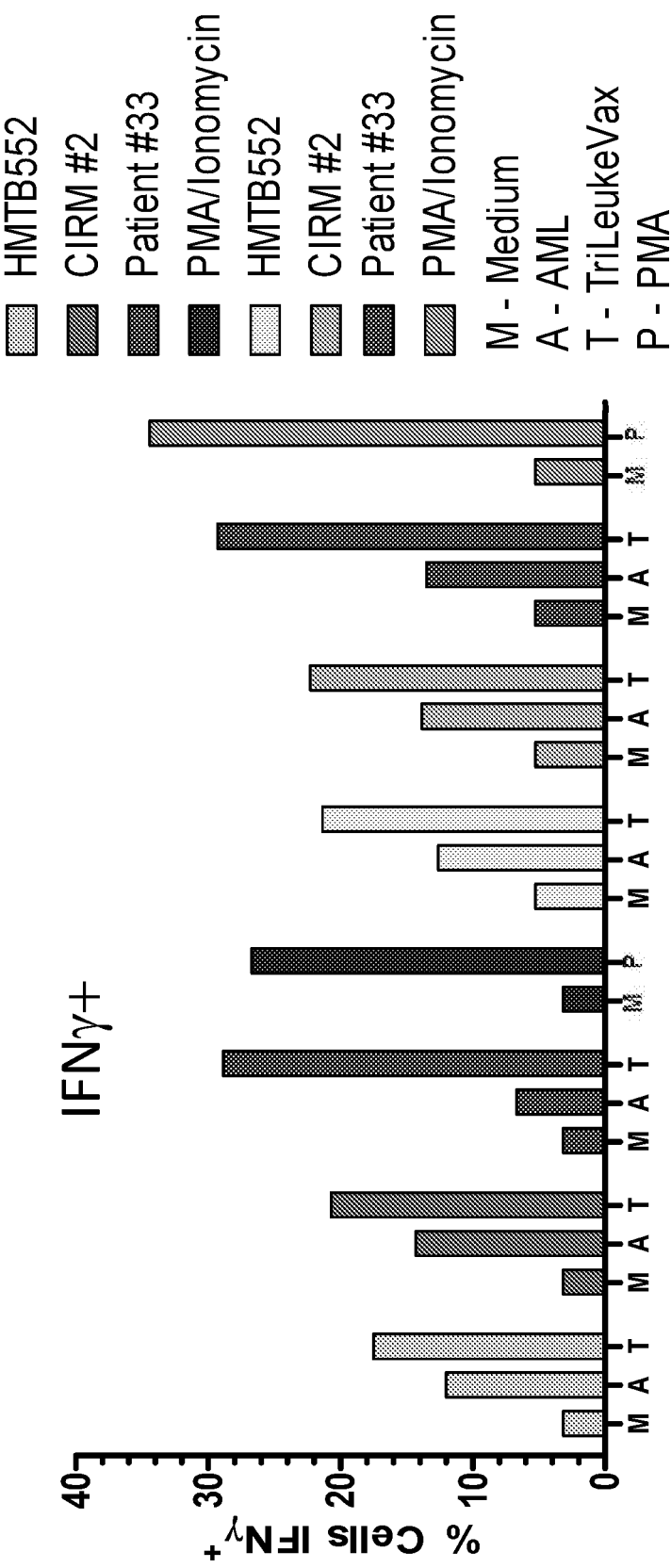
Figure 11A:
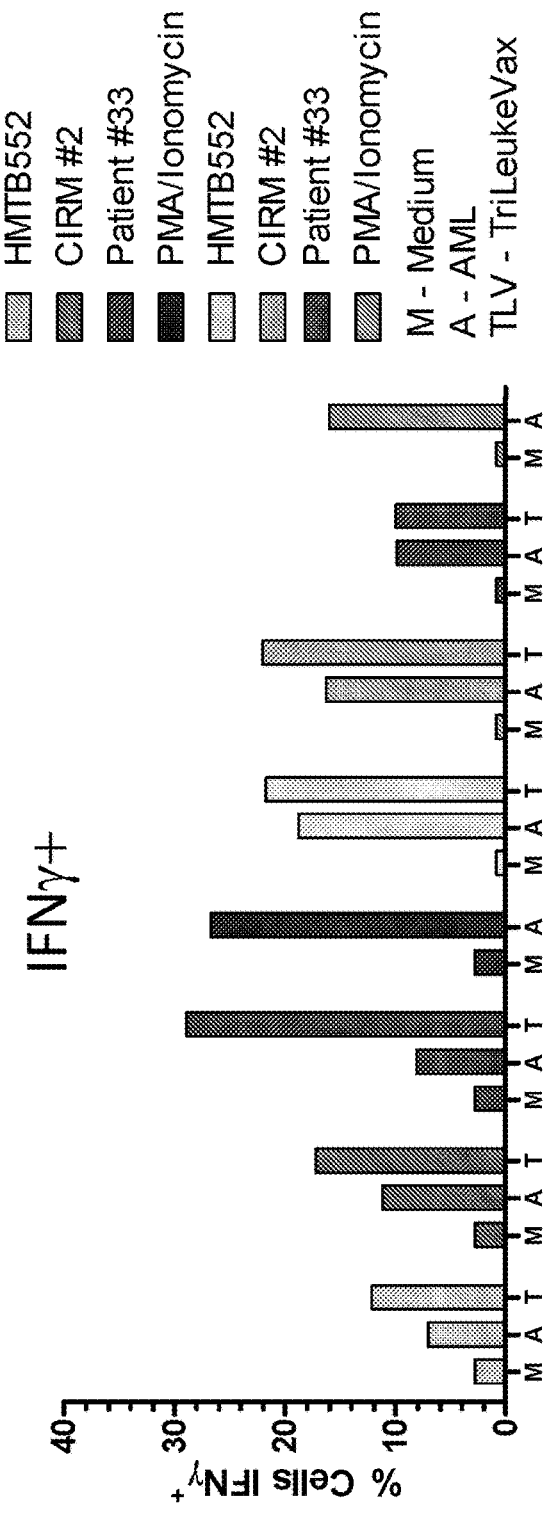
FIGS. 11A-11C graphically summarize the results of experiments performed to illustrate the primary stimulation of allogeneic CD3+CD4+ T cells by hTriLeukeVax. In these experiments, percent interferon gamma (IFNγ) expression and Granzyme B staining as markers of T cell activation and Ki67 expression as a marker of induced T cell proliferation are depicted above each histogram plot and on the Y axis. The different co-culture conditions shown below the X axis are M=medium alone; A=co-culture with unmodified AML; T=co-culture with AML lentivirally transduced to express CD80/IL-15/IL-15Rα (TriLeukeVax). The data from stimulation of two PBMC samples, R1254 (left) and R1256 (right) are indicated below the histogram plots for each group of samples. For each set of co-cultures the AML samples used as stimulators are, from left to right, HMTB552, CIRM #2, and Patient #33, as indicated in the key to the right of the upper plot.
Figures 11B, 11C:
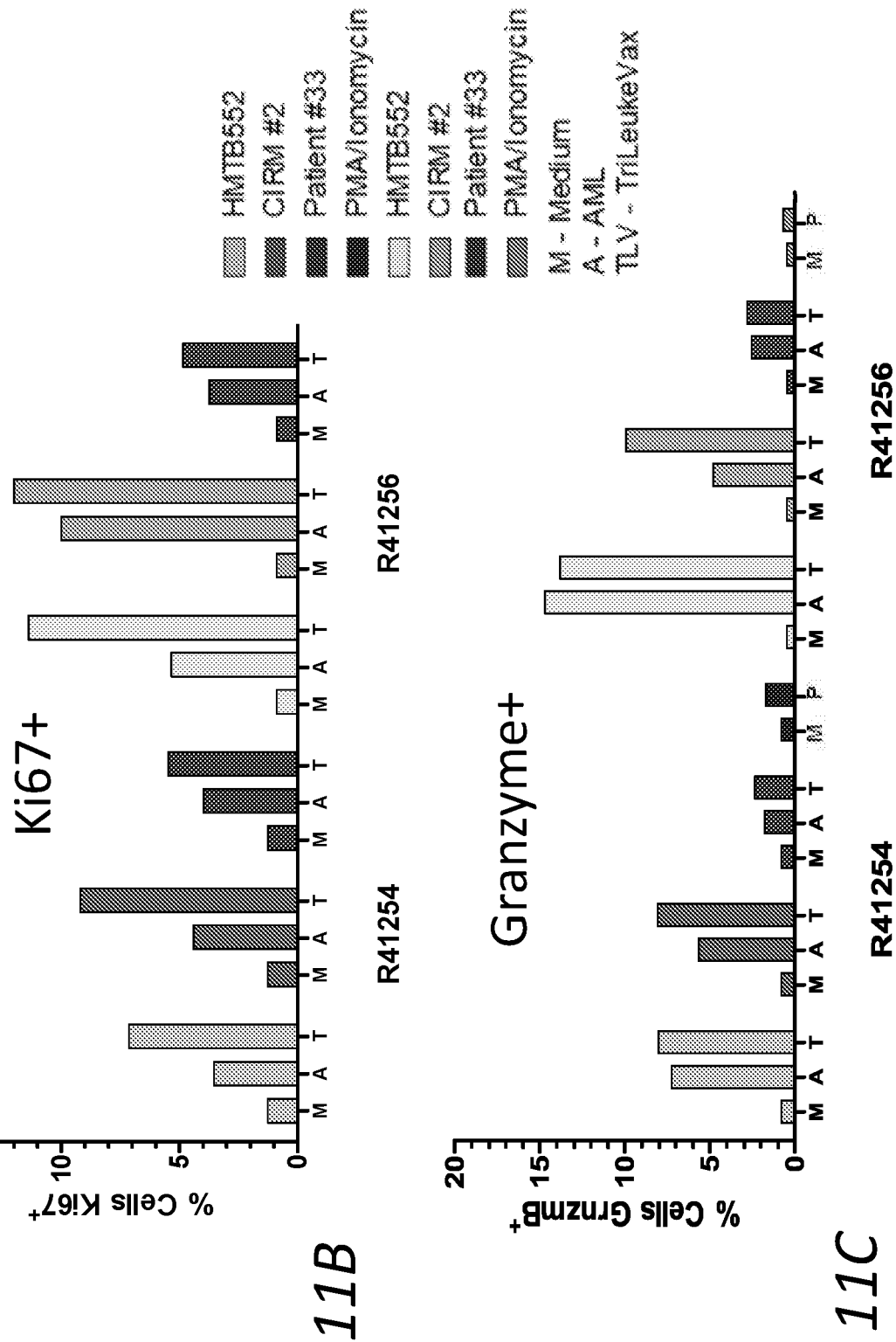

In some embodiments, pharmaceutical compositions including at least one recombinant cell and/or cell culture of the disclosure can be used in methods of increasing the population of one or more cell types selected from the group consisting of $CD3^+CD8^+$ T cells, $CD3^+CD4^+$ T cells, memory $CD8^+$ T cells, NK cells, and NKT cells in an individual in need thereof. In some embodiments, the method stimulates the proliferation of $CD3^+CD8^+$ T cells and/or $CD3^+CD4^+$ T cells up to two-fold relative to the proliferation of one or more of these cells in individuals who have not been administered with the vaccine. Techniques and materials that can suitably be used for measuring proliferation of $CD3^+CD8^+$ T cells and/or $CD3^+CD4^+$ T cells are known in the art. For example, T cells can be stained with anti-CD3, anti-CD8, and anti-CD4 antibodies, and quantified by flow cytometric analyses. In some embodiments, the method stimulates increased production of interferon gamma (IFNγ) relative to the production of IFNγ in individuals who have not been administered the vaccine (see, e.g., Example 5 and FIGS. 8 and 9). Without being bound to any particular theory, it is expected that the method of the disclosure can result in increased progression free survival of the individual relative to the rate of progression free survival in individuals with AML who have not been administered the vaccine.

In some cases, a cancer which has been treated can return or reappear after a period of improvement (e.g., cancer relapse, or tumor relapse). Generally, the period of improvement is after administration of a therapy that resulted in the decrease of or disappearance of signs and symptoms of cancer. The period of improvement can be the decrease or disappearance of all signs and symptoms of cancer. The period of improvement can also be the decrease or disappearance of some, but not all, signs and symptoms of cancer. In some embodiments, the relapsed cancer is a cancer that has become unresponsive or partially unresponsive to a drug or a therapy. For example and without limitation, relapsed cancer includes cancer in individuals whose first progression occurs in the absence of any treatment following successful treatment with a drug or a therapy; cancer in individuals who progress on a treatment, or within 60 days of the treatment; and cancer in individuals who progress while receiving treatment. In some embodiments, the methods of the disclosure prevent relapse of AML relative to the rate of relapse of AML in individuals who have not been administered the vaccine.

Non-limiting examples of leukemias that can be suitably treated with the pharmaceutical compositions of the disclosure include acute lymphoblastic leukemia (ALL), acute lymphoblastic B-cell leukemia, acute lymphoblastic T-cell leukemia, acute myeloblastic leukemia (AML), acute promyelocytic leukemia (APL), acute monoblastic leukemia, acute erythroleukemic leukemia, acute megakaryoblastic leukemia, acute myelomonocytic leukemia, acute nonlymphocytic leukemia, acute undifferentiated leukemia, chronic myelocytic leukemia (CML), chronic lymphocytic leukemia (CLL), and hairy cell leukemia. In some embodiments, the compositions of the disclosure (e.g., pharmaceutical compositions) can be used to treat myeloma. In some embodiments, the pharmaceutical compositions of the disclosure, including at least one recombinant cell and/or cell culture according as described herein, can be used to treat individuals who have, who are suspected of having, or who may be at high risk for developing one or more health conditions and/or clinical manifestations associated with AML. Exemplary clinical manifestations associated with leukemia include, but are not limited to, (1) clonal proliferation of myeloid precursors with a reduced capacity to differentiate into more mature cellular elements, (2) accumulation of leukemic blasts or immature forms in the bone marrow, peripheral blood, and occasionally in other tissues, with a variable reduction in the production of normal red blood cells, platelets, and mature granulocytes. The increased production of malignant cells, along with a reduction in these mature elements, often results in a variety of systemic consequences including anemia, bleeding, and an increased risk of infection. Exemplary health conditions associated with leukemia can include, without limitation, inherited diseases with excessive chromatin fragility or DNA repair (e.g., ataxia telangiectasia, Fanconi syndrome), prior treatment with chemotherapy for another cancer, rare environmental exposures, pre-existing myelodysplasia. Exemplary symptoms of leukemia can include, without limitation, fever, chills, persistent fatigue, weakness, frequent infections, severe infections, swollen lymph nodes, enlarged liver, enlarged spleen, easy bleeding or bruising, recurrent nosebleeds, petechiae, excessive sweating, bone pain or tenderness.

The terms "administration" and "administering", as used herein, refer to the delivery of a bioactive composition or formulation by an administration route comprising, but not limited to, oral, intravenous, intra-arterial, intramuscular, intraperitoneal, subcutaneous, intramuscular, and topical administration, or combinations thereof. The term includes, but is not limited to, administering by a medical professional and self-administering.

Administration of pharmaceutical compositions as described above, including whole-cell vaccines can be used in the stimulation of an immune response. In some embodiments, recombinant cells, cell cultures, and/or pharmaceutical compositions as described above are administered to an individual after induction of remission of AML with chemotherapy, or after autologous or allogeneic hematopoietic stem cell transplantation. In some embodiments, recombinant cells, cell cultures, and/or pharmaceutical compositions of the disclosure are administered to an individual in need of increasing a population of cells with anti-leukemic activity such as $CD3^+CD4^+$ T cells, $CD3^+CD8^+$ T cells, memory $CD8^+$ T cells, NK cells, or NKT cells with anti-leukemic activity. In embodiments, recombinant cells, cell cultures, and/or pharmaceutical compositions (e.g., whole-cell vaccines) are administered to an individual having or suspected of having leukemia. In some embodiments, the leukemia is AML.

In some embodiments, the present disclosure contemplates administration of recombinantly engineered cancer cells which have been transduced with one or more nucleic acid molecules expressing one or more therapeutic proteins (e.g., hCD80, hIL-15, and hIL-15Rα), to an individual for the treatment and/or prevention of cancer. An effective amount of the recombinant cells disclosed herein is determined based on the intended goal, for example tumor regression. For example, in some embodiments, where existing cancer is being treated, the number of cells to be administered may be greater than where administration of the recombinant cells disclosed herein is for prevention of cancer. One of ordinary skill in the art would be able to determine the number of cells to be administered and the frequency of administration in view of this disclosure. The quantity to be administered, both according to number of treatments and dose, also depends on the individual to be treated, the state of the individual, and the protection desired. Precise amounts of the therapeutic composition also depend on the judgment of the practitioner and are peculiar to each individual. Frequency of administration could range from 1-2 days, to 2-6 hours, to 6-10 hours, to 1-2 weeks or longer depending on the judgment of the practitioner.

Longer intervals between administration and lower numbers of cells may be employed where the goal is prevention. For instance, numbers of cells administered per dose may be 50% of the dose administered in treatment of active disease, and administration may be at weekly intervals. One of ordinary skill in the art, in light of this disclosure, would be able to determine an effective number of cells and frequency of administration. This determination would, in part, be dependent on the particular clinical circumstances that are present (e.g., type of cancer, severity of cancer).

In certain embodiments, it may be desirable to provide a continuous supply of the therapeutic compositions to the individual. The time period for perfusion would be selected by the clinician for the particular individual and situation, but times could range from about 1-2 hours, to 2-6 hours, to about 6-10 hours, to about 10-24 hours, to about 1-2 days, to about 1-2 weeks or longer. Generally, the dose of the therapeutic composition via continuous perfusion will be equivalent to that given by single or multiple injections, adjusted for the period of time over which the doses are administered In some embodiments, administration is by bolus injection. In some embodiments, administration is by intravenous infusion. In some embodiments, a whole-cell hCD80/hIL-15/hIL-15Rα vaccine is administered in a dosage of about $1×10^2$ cells, $1×10^3$ cells, $1×10^4$ cells, $1×10^5$ cells, $1×10^6$ cells, $1×10^7$ cells or more, or in a range of about $1×10^3$ to $1×10^4$ cells, $1×10^3$ to $1×10^5$ cells, $1×10^3$ to $1×10^6$ cells, $1×10^4$ to $1×10^5$ cells, or $1×10^5$ to $1×10^6$ cells, $1×10^6$ to $1×10^7$ cells, $1×10^7$ to $1×10^8$ cells. In some embodiments, the hCD80/hIL-15/hIL-15Rα cells are administered in a single administration. In some embodiments, cells are administered in multiple administrations, (e.g., once or more per week for one or more weeks). In some embodiments, doses are administered about every 1, 2, 3, 4, 5, 6, 7, 8, 9, 10, 11, 12, 13, 14, 15, 16, 17, 18, 19, 20, 21, 22, 23, 24, 25, 26, 27, 28, 29, 30 or more days. In some embodiments, there are 1, 2, 3, 4, 5, 6, 7, 8, 9, 10, or more total doses. In some embodiments, 4 doses are administered, with a 3 week span between doses.

In some embodiments, it can be desirable to inactivate a whole-cell vaccine or cancer cell-containing pharmaceutical composition disclosed herein prior to administering them to the individual. Those of skill in the art are familiar with methods for inactivating cells. Any method may be used as long as it allows the cells to express the therapeutic protein while preventing the cells from proliferating. A common approach to inactivating cancer cells is irradiation. For example, the cancer cells could be irradiated with between about 30 Gy and about 300 Gy using a cell irradiator. In some embodiments, the whole-cell vaccine or cancer cell-containing pharmaceutical composition is inactivated by a cytostatic agent or a cytotoxic agent. In another embodiment, the whole-cell vaccine or cancer cell-containing pharmaceutical composition is co-transfected with a suicide gene, such as HSV-TK. A cancer cell transfected with HSV-TK could then be killed after it was administered to the individual by giving the individual ganciclovir. A combination of cell inactivating methods may also be used.

In addition to being recombinantly engineered with nucleic acid molecules encoding hCD80/hIL-15/hIL-15Rα therapeutic proteins, the cancer cells may also be transfected with marker genes (such as a gene that produces a protein capable of generating a signal (such as a fluorescent signal). A marker gene encodes a protein that facilitates the detection of the cells in the whole cell vaccine or cell media compositions disclosed herein.

One of ordinary skill in the art would be familiar with techniques for administering cells and cell-containing compositions to an individual. Furthermore, one of ordinary skill in the art would be familiar with techniques and pharmaceutical reagents necessary for preparation of these cells and cell-containing compositions prior to administration to an individual.

In certain embodiments of the present disclosure, the whole-cell vaccine compositions will be an aqueous composition that includes the recombinantly engineered cancer cells that have been modified to express one or more of hCD80/hIL-15/hIL-15Rα therapeutic proteins. In certain embodiments, the recombinant cells are prepared using autologous cancer cells that have been obtained from the individual. However, cancer cells obtained from any source are also contemplated by the present disclosure. In some embodiments, the recombinant cell are allogeneic cells or syngeneic cells relative to the individual. The cancer cells may have been obtained as a result of previous cancer surgery performed on the individual as part of the overall cancer treatment protocol that is specific for the particular individual.

Aqueous compositions of the present disclosure contain an effective amount of a solution of the recombinant cells disclosed herein in a pharmaceutically acceptable carrier or aqueous medium. Thus, the "pharmaceutical preparation" or "pharmaceutical composition" of the disclosure can include any and all solvents, dispersion media, coatings, antibacterial and antifungal agents, isotonic and absorption delaying agents and the like. The use of such media and agents for pharmaceutical active substances is well known in the art. Except insofar as any conventional media or agent is incompatible with the recombinant cells disclosed herein, its use in the manufacture of the pharmaceutical compositions is contemplated. Supplementary active ingredients can also be incorporated into the compositions. For human administration, preparations should meet sterility, pyrogenicity, general safety, and purity standards as required by the FDA Center for Biologics.

The biological material should be extensively dialyzed to remove undesired small molecular weight molecules and/or lyophilized for more ready formulation into a desired vehicle, where appropriate. The recombinant cells will then generally be formulated for administration by any known route, such as parenteral administration. Determination of the number of cells to be administered will be made by one of skill in the art, and will in part be dependent on the extent and severity of cancer, and whether the recombinant cells are being administered for treatment of existing cancer or prevention of cancer. The preparation of the pharmaceutical composition containing the recombinant cells of the disclosure will be known to those of skill in the art in light of the present disclosure.

Upon formulation, solutions will be administered in a manner compatible with the dosage formulation and in such amount as is therapeutically effective. The formulations are easily administered in a variety of dosage forms, such as the type of injectable solutions described above. For parenteral administration, the solution including the recombinant cells disclosed herein should be suitably buffered. The recombinant cells may be administered with other agents that are part of the therapeutic regiment of the individual, such as other immunotherapy or chemotherapy.

The recombinant cells, cell cultures, and/or pharmaceutical compositions (e.g., whole-cell hCD80/hIL-15/hIL-15Rα vaccines) described herein can be used to stimulate the proliferation of one or more immune cells, for example, one or more of CD3$^+$CD8$^+$ T cells, CD3$^+$CD4$^+$ T cells, memory CD8$^+$ T cells, NK cells, and NKT cells relative to the proliferation of these cells in individuals who have not been administered one of the compositions disclosed herein. The immune cells can be stimulated to proliferate up to about 20 fold, such as any of about 2 fold, 3 fold, 4 fold, 5 fold, 6 fold, 7 fold, 8 fold, 9 fold, 10 fold, 11 fold, 12 fold, 13 fold, 14 fold, 15 fold 16 fold, 17 fold, 18 fold, 19 fold, or 20 fold or higher compared to the proliferation of comparable cells in individuals who have not been administered one of the vaccine or cell-containing compositions described herein.

As discussed supra, any one of recombinant cells, cell cultures, and/or pharmaceutical compositions (e.g., whole-cell hCD80/hIL-15/hIL-15Rα vaccines) described herein can be administered in combination with one or more chemotherapeutics or anti-cancer agents or therapies. Administration "in combination with" one or more therapeutic agents includes simultaneous (concurrent) and consecutive administration in any order. In some embodiments, the one or more anti-cancer agents or therapies is selected from the group consisting of chemotherapy, radiotherapy, immunotherapy, hormonal therapy, toxin therapy, and surgery. "Chemotherapy" and "anti-cancer agent" are used interchangeably herein. Various classes of anti-cancer agents can be used. Non-limiting examples include: alkylating agents, antimetabolites, anthracyclines, plant alkaloids, topoisomerase inhibitors, podophyllotoxin, antibodies (e.g., monoclonal or polyclonal), tyrosine kinase inhibitors (e.g., imatinib mesylate (Gleevec® or Glivec®)), hormone treatments, soluble receptors and other antineoplastics.

Topoisomerase inhibitors are also another class of anti-cancer agents that can be used herein. Topoisomerases are essential enzymes that maintain the topology of DNA. Inhibition of type I or type II topoisomerases interferes with both transcription and replication of DNA by upsetting proper DNA supercoiling. Some type I topoisomerase inhibitors include camptothecins: irinotecan and topotecan. Examples of type II inhibitors include amsacrine, etoposide, etoposide phosphate, and teniposide. These are semisynthetic derivatives of epipodophyllotoxins, alkaloids naturally occurring in the root of American Mayapple (*Podophyllum peltatum*).

Antineoplastics include the immunosuppressant dactinomycin, doxorubicin, epirubicin, bleomycin, mechlorethamine, cyclophosphamide, chlorambucil, ifosfamide. The antineoplastic compounds generally work by chemically modifying a cell's DNA.

Alkylating agents can alkylate many nucleophilic functional groups under conditions present in cells. Cisplatin and carboplatin, and oxaliplatin are alkylating agents. They impair cell function by forming covalent bonds with the amino, carboxyl, sulfhydryl, and phosphate groups in biologically important molecules.

Vinca alkaloids bind to specific sites on tubulin, inhibiting the assembly of tubulin into microtubules (M phase of the cell cycle). The vinca alkaloids include: vincristine, vinblastine, vinorelbine, and vindesine.

Anti-metabolites resemble purines (azathioprine, mercaptopurine) or pyrimidine and prevent these substances from becoming incorporated in to DNA during the "S" phase of the cell cycle, stopping normal development and division. Anti-metabolites also affect RNA synthesis.

Plant alkaloids and terpenoids are obtained from plants and block cell division by preventing microtubule function. Since microtubules are vital for cell division, without them, cell division cannot occur. The main examples are vinca alkaloids and taxanes.

Podophyllotoxin is a plant-derived compound which has been reported to help with digestion as well as used to produce two other cytostatic drugs, etoposide and teniposide. They prevent the cell from entering the G1 phase (the start of DNA replication) and the replication of DNA (the S phase).

Taxanes as a group includes paclitaxel and docetaxel. Paclitaxel is a natural product, originally known as Taxol and first derived from the bark of the Pacific Yew tree. Docetaxel is a semi-synthetic analogue of paclitaxel. Taxanes enhance stability of microtubules, preventing the separation of chromosomes during anaphase.

In some embodiments, the anti-cancer agents can be selected from remicade, docetaxel, celecoxib, melphalan, dexamethasone (Decadron®), steroids, gemcitabine, cis-platinum, temozolomide, etoposide, cyclophosphamide, temodar, carboplatin, procarbazine, gliadel, tamoxifen, topotecan, methotrexate, gefitinib (Iressa®), taxol, taxotere, fluorouracil, leucovorin, irinotecan, xeloda, CPT-11, interferon alpha, pegylated interferon alpha (e.g., PEG INTRON-A), capecitabine, cisplatin, thiotepa, fludarabine, carboplatin, liposomal daunorubicin, cytarabine, doxetaxol, pacilitaxel, vinblastine, IL-2, GM-CSF, dacarbazine, vinorelbine, zoledronic acid, palmitronate, biaxin, busulphan, prednisone, bortezomib (Velcade®), bisphosphonate, arsenic trioxide, vincristine, doxorubicin (Doxil®), paclitaxel, ganciclovir, adriamycin, estrainustine sodium phosphate (Emcyt®), sulindac, etoposide, and combinations of any thereof.

In other embodiments, the anti-cancer agent can be selected from bortezomib, cyclophosphamide, dexamethasone, doxorubicin, interferon-alpha, lenalidomide, melphalan, pegylated interferon-alpha, prednisone, thalidomide, or vincristine.

In some embodiments, the methods of treatment as described herein further include administration of a compound that inhibits one or more immune checkpoint molecules. In some embodiments, the one or more immune checkpoint molecules include one or more of CTLA4, PD-1, PD-L1, A2AR, B7-H3, B7-H4, TIM3, and combinations of any thereof. In some embodiments, the compound that inhibits the one or more immune checkpoint molecules includes an antagonistic antibody. In some embodiments, the antagonistic antibody is ipilimumab, nivolumab, pembrolizumab, durvalumab, atezolizumab, tremelimumab, or avelumab.

In some aspects, the one or more anti-cancer therapy is radiation therapy. As used herein, the term "radiation therapy" refers to the administration of radiation to kill cancerous cells. Radiation interacts with molecules in the cell such as DNA to induce cell death. Radiation can also damage the cellular and nuclear membranes and other organelles. Depending on the radiation type, the mechanism of DNA damage may vary as does the relative biologic effectiveness. For example, heavy particles (e.g. protons, neutrons) damage DNA directly and have a greater relative biologic effectiveness. Electromagnetic radiation results in indirect ionization acting through short-lived, hydroxyl free radicals produced primarily by the ionization of cellular water. Clinical applications of radiation consist of external beam radiation (from an outside source) and brachytherapy (using a source of radiation implanted or inserted into the individual). External beam radiation consists of X-rays and/or gamma rays, while brachytherapy employs radioactive nuclei that decay and emit alpha particles, or beta particles along with a gamma ray. Radiation also contemplated herein includes, for example, the directed delivery of radioisotopes to cancer cells. Other forms of DNA damaging factors are also contemplated herein such as microwaves and UV irradiation.

Radiation may be given in a single dose or in a series of small doses in a dose-fractionated schedule. The amount of radiation contemplated herein ranges from about 1 to about 100 Gy, including, for example, about 5 to about 80, about 10 to about 50 Gy, or about 10 Gy. The total dose may be applied in a fractioned regime. For example, the regime may comprise fractionated individual doses of 2 Gy. Dosage ranges for radioisotopes vary widely, and depends on the half-life of the isotope and the strength and type of radiation emitted. When the radiation comprises use of radioactive isotopes, the isotope may be conjugated to a targeting agent, such as a therapeutic antibody, which carries the radionucleotide to the target tissue (e.g., tumor tissue).

Surgery described herein includes resection in which all or part of a cancerous tissue is physically removed, exercised, and/or destroyed. Tumor resection refers to physical removal of at least part of a tumor. In addition to tumor resection, treatment by surgery includes laser surgery, cryosurgery, electrosurgery, and micropically controlled surgery (Mohs surgery). Removal of precancers or normal tissues is also contemplated herein.

In some embodiments, the methods of the disclosure further include administering to the individual a second anti-cancer agent or therapy. Suitable anti-cancer agents or therapies include, but are not limited to chemotherapies, radiotherapies, immunotherapies, hormonal therapies, toxin therapies, and surgery. Additional non-limiting anti-cancer agents or therapies suitable for the methods disclosed herein include anti-cancer antibodies, bi-specific T-cell engagers (BiTEs). Also suitable are various cytotherapies (or cellular therapies) known in the art, such as allogeneic cell therapy, autologous cell therapy, chimeric antigen receptor (CAR) T cell therapy, etc.

In some embodiments, the first agent and the second anti-cancer agent or therapy are administered concomitantly. In some embodiments, the first agent and the second anti-cancer agent or therapy are administered sequentially. In some embodiments, the first agent is administered before the second anti-cancer agent or therapy. In some embodiments, the first agent or therapy is administered before and/or after the second anti-cancer agent or therapy. In some embodiments, the first agent and the second anti-cancer agent or therapy are administered in rotation. In some embodiments, the first agent is administered at the same time as the second anti-cancer agent or therapy. In some embodiments, the first agent and the second anti-cancer agent or therapy are administered together in a single formulation.

Systems and Kits

Also provided herein are systems and kits including the nucleic acid molecules, recombinant cells, or pharmaceutical compositions provided and described herein as well as written instructions for making and using the same. For example, provided herein, in some embodiments, are systems and/or kits that include one or more of: a nucleic acid molecule of the disclosure, a recombinant cell of the disclosure, or a pharmaceutical composition of the disclosure. In some embodiments, the systems and/or kits of the disclosure further include one or more syringes (including pre-filled syringes) and/or catheters (including pre-filled syringes) used to administer one any of the provided nucleic acid molecules, recombinant cells, or pharmaceutical compositions to an individual. In some embodiments, a kit can have one or more additional therapeutic agents that can be administered simultaneously or sequentially with the other kit components for a desired purpose, e.g., for treating an individual having or suspected of having a condition associated with AML, stimulating an immune response in an individual with AML in remission with persistent MRD, or for increasing the population of one or more cell types.

Any of the above-described systems and kits can further include one or more additional reagents, where such additional reagents can be selected from: dilution buffers; reconstitution solutions, wash buffers, control reagents, control expression vectors, negative control polypeptides, positive control polypeptides, reagents for in vitro production of the hCD80, hIL-15, and/or hIL-15Rα polypeptides.

In some embodiments, a system or kit can further include instructions for using the components of the kit to practice the methods disclosed herein. The instructions for practicing the methods are generally recorded on a suitable recording medium. For example, the instructions can be printed on a substrate, such as paper or plastic, etc. The instructions can be present in the kits as a package insert, in the labeling of the container of the kit or components thereof (i.e., associated with the packaging or sub-packaging), etc. The instructions can be present as an electronic storage data file present on a suitable computer readable storage medium, e.g. CD-ROM, diskette, flash drive, etc. In some instances, the actual instructions are not present in the kit, but means for obtaining the instructions from a remote source (e.g., via the internet), can be provided. An example of this embodiment is a kit that includes a web address where the instructions can be viewed and/or from which the instructions can be downloaded. As with the instructions, this means for obtaining the instructions can be recorded on a suitable substrate.

All publications and patent applications mentioned in this disclosure are herein incorporated by reference to the same extent as if each individual publication or patent application was specifically and individually indicated to be incorporated by reference.

No admission is made that any reference cited herein constitutes prior art. The discussion of the references states what their authors assert, and the Applicant reserves the right to challenge the accuracy and pertinence of the cited documents. It will be clearly understood that, although a number of information sources, including scientific journal articles, patent documents, and textbooks, are referred to herein; this reference does not constitute an admission that any of these documents forms part of the common general knowledge in the art.

The discussion of the general methods given herein is intended for illustrative purposes only. Other alternative methods and alternatives will be apparent to those of skill in the art upon review of this disclosure, and are to be included within the spirit and purview of this application.

EXAMPLES

Figure 3:
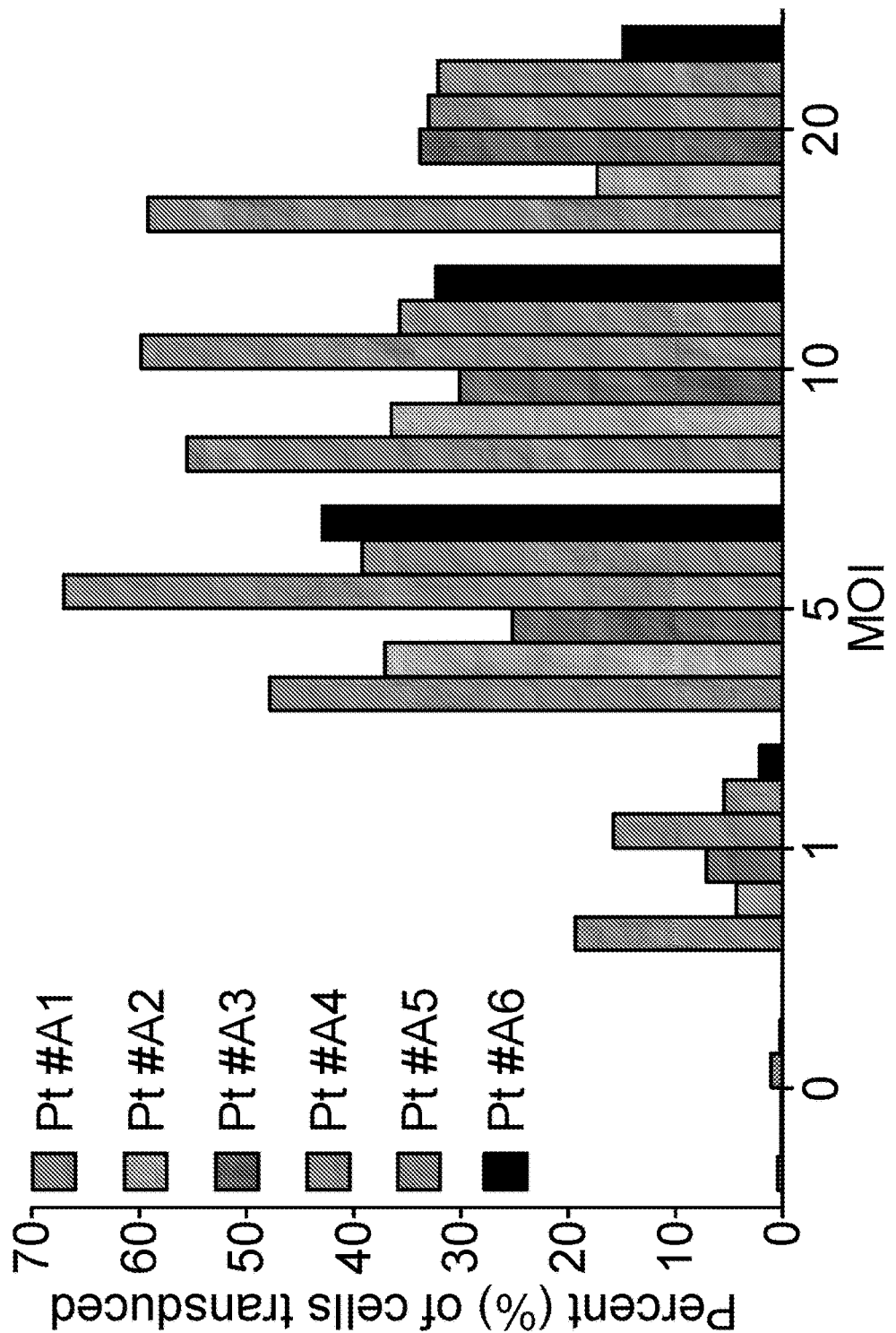
FIG. 3 graphically summarizes the results of experiments performed to illustrate IL-15 surface expression in primary AML cells that were transduced with exemplary nucleic acid molecules in accordance with some embodiments of the present disclosure. Primary leukaphoretic AML samples from 6 independent patient samples (#A1-#A6) were transduced with human CD80/IL-15/IL-15Rα lentivirus at increasing MOI as indicated on the X axis. At 48 hours after transduction, cells were stained with anti-IL-15 antibodies and subjected to flow cytometric analysis. At MOI of 5 and 10 all primary AML showed transduction levels>20%.

Experiments described Examples 1-12 below demonstrate that (1) primary AML vaccines can be reliably generated (see, e.g., FIG. 3); (2) whole-cell vaccines of the present disclosure can effectively activate autologous patient-derived PBMC (see, e.g., FIGS. 12A-12B); (3) Leukemia stem cells (LSC) are efficiently transduced (16-60%) and are therefore represented in whole-cell hCD80/hIL-15/hIL-15Rα vaccines of the disclosure (see, e.g., FIGS. 7A-7F); (4) whole-cell hCD80/hIL-15/hIL-15Rα vaccines of the disclosure can effectively stimulate cytotoxic T cells in vivo in a patient derived xenograft (PDX) model (see, e.g., FIGS. 8A-8B); and (5) the compositions and methods disclosed herein can be used for applications beyond treatment of AML, such as treatment of myeloma (see, e.g., Example 12 and FIG. 13).

Example 1

Generation and Evaluation of Lentiviral Vectors that Express all Three Proteins hCD80, hIL-15, and hIL-15Rα

This Example describes the design and generation of a series of lentiviral vectors each carrying coding sequences for human IL-15, human IL-15Rα, and human CD80 polypeptides, as well as the evaluation of these vectors in primary AML cells.

It has been shown previously that (1) the combined expression of murine mIL-15/mIL-15Rα/mCD80 polypeptides in murine 32Dp210 leukemia cells proved highly synergistic in stimulating proliferation of both primary murine CD3$^+$CD8$^+$ and CD3$^+$CD4$^+$ T cells, and that (2) vaccination with irradiated mIL-15/mIL-15Rα/mCD80-transduced 32Dp210 cells in leukemia bearing mice eradicated tumor in the majority of mice. Recent in vivo antibody-mediated cell depletion studies revealed that depletion of CD3$^+$CD8$^+$ T cells abrogated vaccine efficacy (Shi Y et al., 2018). In the published studies, serial vaccination with murine 32Dp210 leukemia-derived vaccines expressing CD80/IL-15 and IL-15Rα eradicated leukemia in more than 80% of leukemia mice. These studies also established that cytolytic and proliferative T cell responses were not significantly stimulated by expression of the human BCR-ABL with which the 32Dp210 cell line is transduced (FIG. 1).

In the experiments described in this Example, a number of lentiviral vectors carrying coding sequences for human IL-15, human IL-15Rα, and human CD80 were designed and generated. In these experiments, a number of replication-defective and self-inactivating lentiviral vector were constructed with the human CD80 gene (hCD80; Chan L. et al. *Mol Ther* 2005; 11:120-31); human IL-15 (hIL-15); and human IL-15Rα (hIL-15a) cassettes (Bergamaschi C et al., *J. Biol. Chem.* 2008; and Jalah R. et al., *DNA and Cell Biology* 2007) in the lentiviral vector backbone, RFUSIN2 (pSFFVU3-hIL2-Furin-CD80) (Chan L et al. 2005, supra). This lentiviral backbone has been selected as it has previously shown safety in humans (Cartier N et al., *Science* 2009).

In the first lentiviral vector, three gene expression cassettes for human IL-15, human IL-15Rα, and human CD80 were operably linked in an order paralleled that of the previously described mouse vector where the order of the gene expression cassettes was, in the 5' to 3' direction, mIL-15/mIL-15Rα/mCD80. Both 293T cells and human U937 lymphoma cells were efficiently transduced with this hIL-15/hIL-15Rα/hCD80 lentiviral vector.

Figure 2:
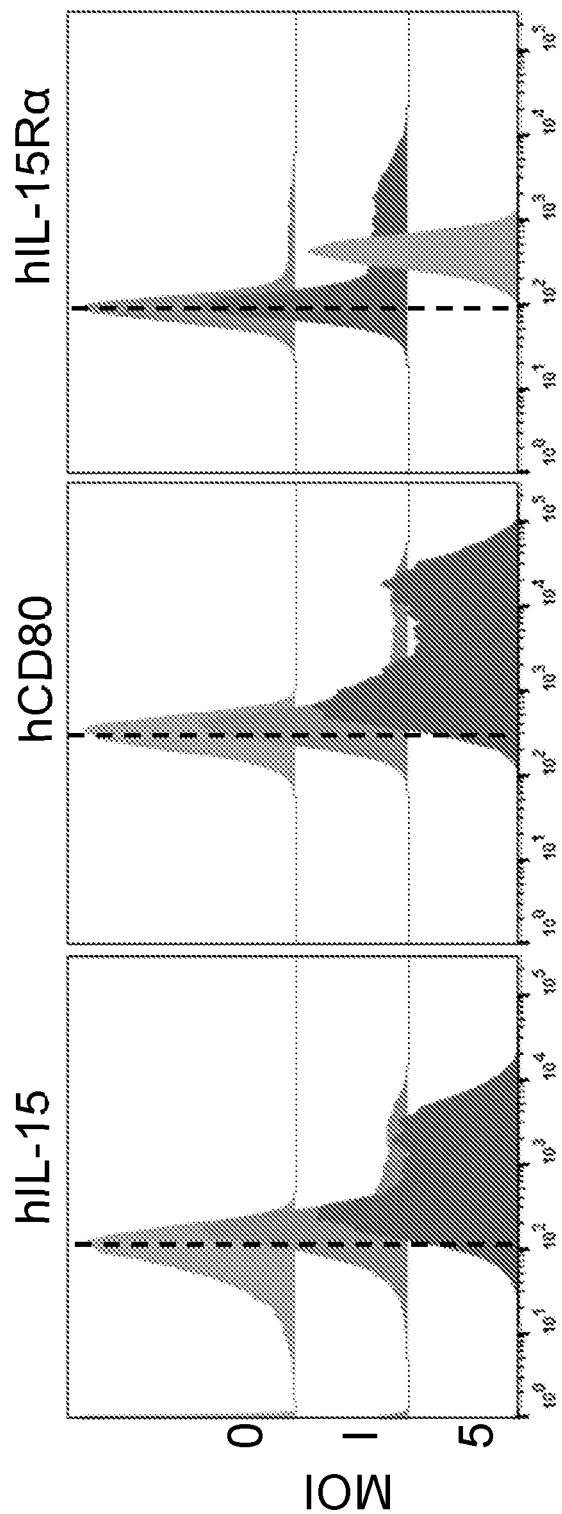
FIG. 2 graphically summarizes the results of experiments performed to demonstrate that human IL-15 (hIL-15), human IL-15Rα (hIL-15 Ra), and human CD80 (hCD80) are expressed in a dose related manner with respect to the viral multiplicity of infections (MOI), indicated on the Y axis, in human U937 lymphoma cells that were transduced with a lentiviral vector carrying expression cassettes for (hIL-15), hIL-15 Ra, and hCD80 polypeptides. Cells were transduced and stained with anti-CD80, anti-IL-15, or anti-IL-15Rα antibodies and analyzed by flow cytometry.

The vector was further optimized by placing CD80 at the 5' end of the lentiviral expression cassette. In this lentiviral vector, the CD80 polypeptide was operably linked to IL-15 polypeptide by a furin cleavage site. Increasing expression was observed of human proteins was observed with increasing MOI with this second vector in U937 cells (FIG. 2). This lentiviral vector was subsequently used to transduce multiple cryopreserved primary AML samples with increasing MOI. As shown in FIG. 3, comparable and efficient levels of transduction as measured by flow cytometric assays of IL-15 expression were achieved with MOI of 5-10 in multiple patient derived AML. In FIG. 3, individual patients are indicated by the cell bank number. Primary leukapheretic AML samples obtained from six patients (#A1-#A6) were transduced with hCD80-IL-15/IL-15Rα lentiviral vector at increasing MOI as indicated. At 48 hours after transduction, cells were stained with anti-IL-15 antibodies and subjected to flow cytometry analysis.

Figure 4:
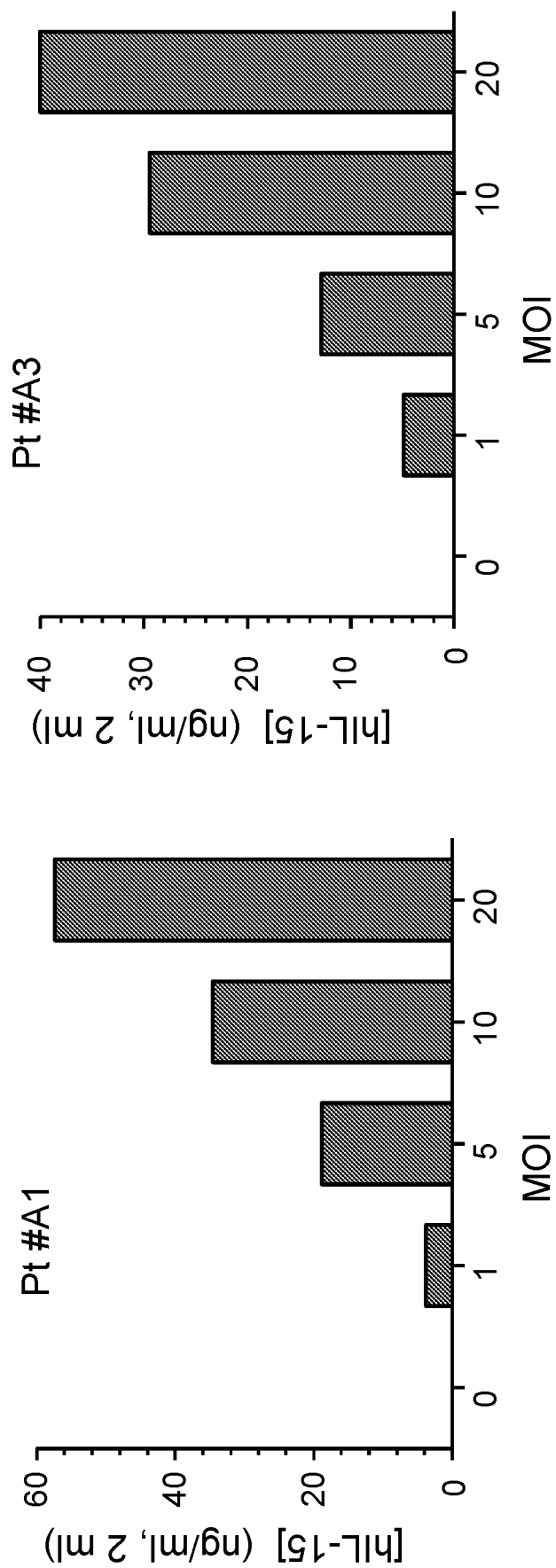
FIG. 4 graphically summarizes the results of experiments performed to illustrate viral dose-dependent IL-15 secretion levels in transduced AML cells obtained from two independent patients (#A6, #A7) at increasing MOI. Levels of IL-15 expression are indicated on the Y axis and MOI on the X axis.

It was observed that this second lentiviral vector could produce IL-15 at high levels. For example, as shown in FIG. 4, IL-15 secretion by the transduced AML samples from patients #A1 and #A3 was robust and MOI dose-dependent. However, in these experiments, CD80 was expressed at lower levels when assayed in primary AML cells compared with CD80 expression in transduced human leukemia cell lines K562 and U937.

Figure 5:
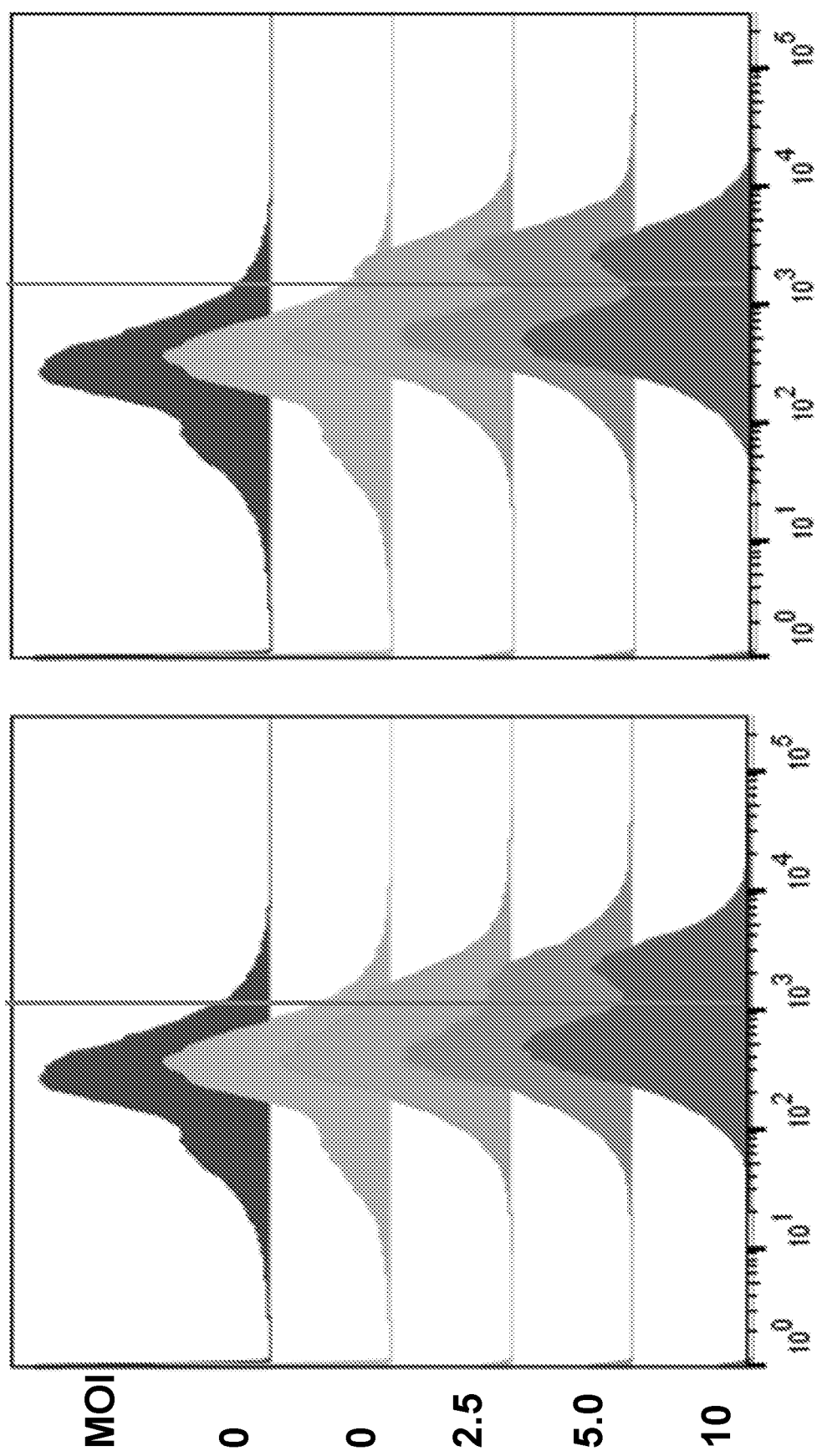
FIG. 5 graphically summarizes the results of experiments performed to illustrate high hCD80 expression levels in primary human AML cells that have been transduced with lentiviral vectors carrying coding sequences for hCD80-Furin-hIL15-P2A-hIL15Rα (left panel) versus hCD80-Furin-F2A-hIL15-P2A-hIL15Rα (right panel) at increasing MOI depicted on Y-axis. Higher levels of gene expression are achieved with the hCD80-Furin-F2A-hIL15-P2A-hIL15Rα vector.

While expression of CD80 was increased using this second lentiviral vector relative to a prior IL-15-IL15Rα-CD80 construct, CD80 expression in human leukemia cell lines still significantly exceeded that observed in transduced primary AML blasts at comparable MOI. Since optimal expression of all three cassettes is critical for vaccine production, a third lentiviral vector was constructed in which a foot-and-mouth disease virus (FMDV) 2A (F2A) self-cleaving peptide sequence was introduced 3' to the furin site to improve cleavage of the CD80 polypeptide from IL-15/IL-15Rα polypeptides. As shown in FIG. 5, transduction with this vector achieved significantly higher levels of CD80 expression in primary human AML samples. The h-IL-15/IL-15Rα/CD80 transduced human AML vaccine was designated "hTriLeukeVax."

Example 2

Primary Stimulation of Allo-PBMC by 5'-hIL-15/hIL-15Rα/hCD80-3' Stimulates CD3$^+$CD8$^+$ T Cell Proliferation This Example describes the results of experiments performed to illustrate that primary stimulation of allo-PBMC by 5'-hIL-15/hIL-15Rα/hCD80-3' results in stimulation of CD3+CD8+ T cell proliferation.

Figure 6:
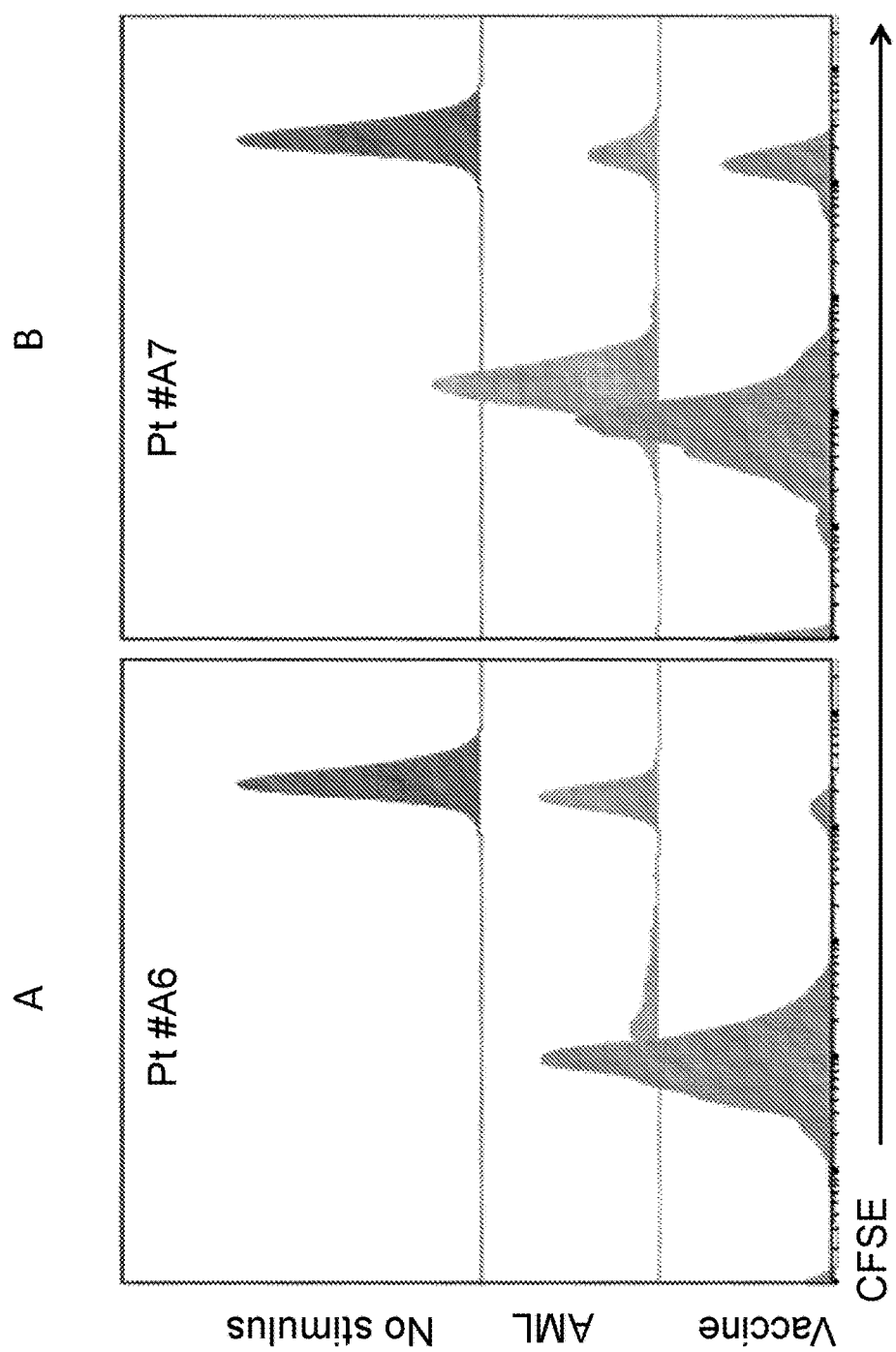
FIG. 6 shows that a whole-cell hCD80/hIL-15/hIL-15Rα vaccine prepared with primary patient AML cells stimulated more proliferation in allogeneic peripheral blood mononuclear cells (allo-PBMCs) than did a control sample containing unmodified AML from patients #A6 and #A7. In these experiments, CFSE labeled PBMC #1 were cultured 11 days with an exemplary whole-cell hCD80/hIL-15/hIL-15Rα vaccine of the disclosure (e.g., hTriLeukeVax) or untransduced AML (AML) from two patients (#A6 panel A, #A7 panel B) or no stimulus (PBMC media alone.) Prior to stimulation, the cells were labeled with the fluorescent dye Carboxyfluorescein succinimidyl ester (CFSE). CFSE is cell permeable and covalently couples, via its succinimidyl group, to intracellular molecules, such as lysine and other amine sources. As the cells proliferate, the concentration of intracellular dye decreases due to dilution as a result of cell division. Cells exhibit a shift to the left with lower immune fluorescence intensity in cells that have divided.
Figure 7:
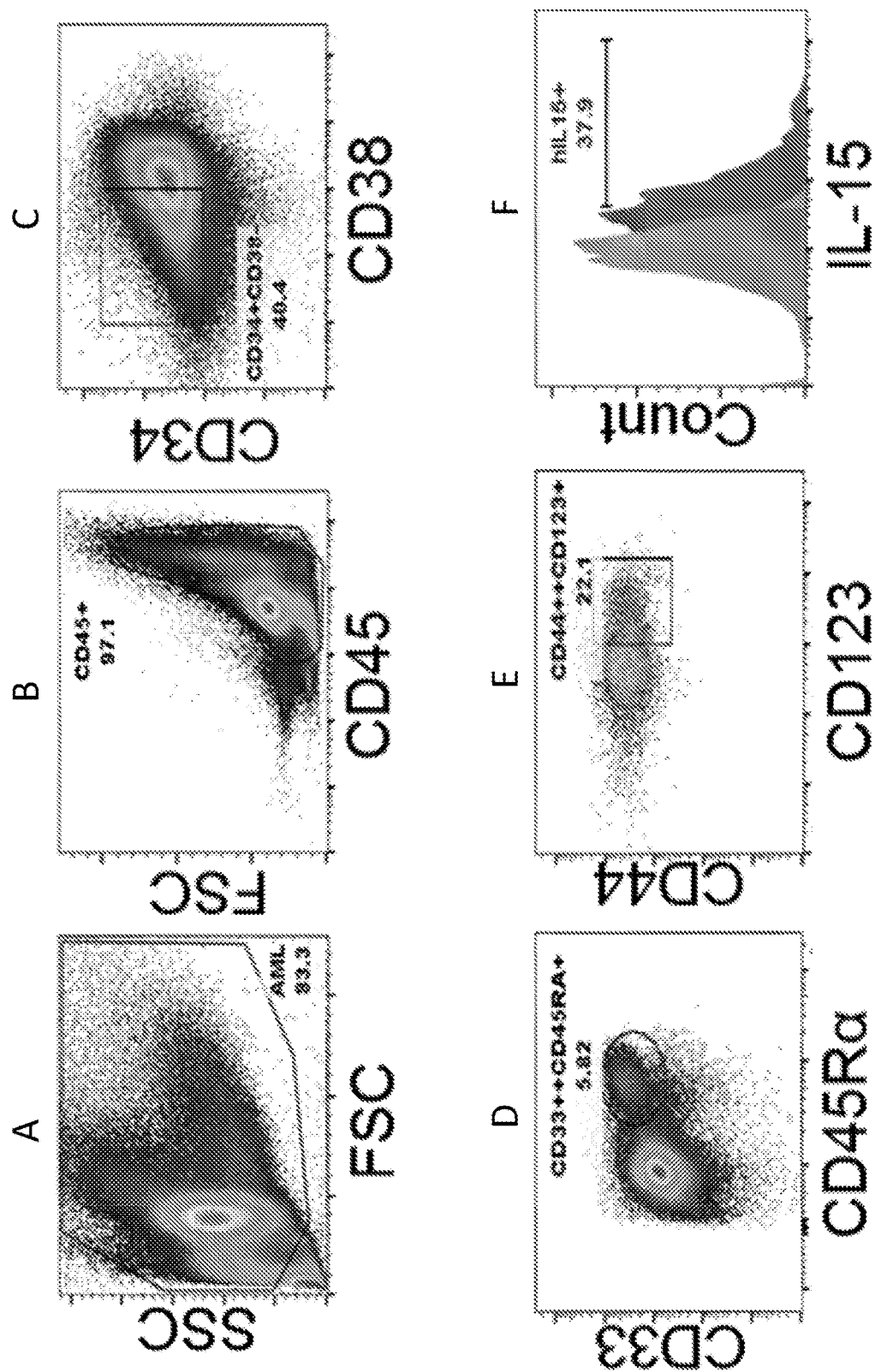
FIGS. 7A-7F pictorially summarizes the results of experiments performed to identify leukemia stem cell (LSC) in leukapheresed AML and demonstrate their transduction as demonstrated by expression of human IL-15. In these experiments, cryopreserved AML cells were thawed, transduced, and analyzed using a single 8-color detection tube including common markers CD45, CD34 and CD38, and specific markers CD45RA, CD123, CD33, CD44 and a marker cocktail (CLL-1/TIM-3/CD7/CD11b/CD22/CD56) in one fluorescence channel and anti-IL-15. Gating strategy is shown in five flow plots (FIGS. 7A-7E). The frequency of transduced (IL-15$^+$) LSC (37.9%) is shown in the far-right plot (untransduced=first peak from the left on X-axis), (transduced AML=second peak from the left on X-axis) (FIG. 7F). Thus transduced LSC are included in the vaccine and therefore have the potential to stimulate anti-LSC immune responses.

To optimize ex vivo stimulation assays, PBMCs from healthy donors (Blood Centers of the Pacific) was used to enable cryopreservation of many aliquots from a single donor. Background allo-responses of PBMC to AML patient samples were determined by assessing markers of activation or proliferation in PBMC co-cultured with unmodified AML. As shown in FIG. 6, whole-cell hTriLeukeVax vaccine prepared with AML cells obtained from two patients #A6 and #A7 (FIG. 6: bottom peaks on Y-axis of FACS plots) stimulated more proliferation than did unmodified AML (middle peaks on Y-axis of FACS plots). In the case of patient #A6, there was minimal background proliferative response by PBMC #1 to unmodified AML. Since insufficient numbers of autologous PBMC from this patient were available to engraft NSG mice, allo-PBMC #1 and patient #A7 AML were used in pilot experiments using the patient derived xenograft (PDX) model, which is described in greater detail in Examples 3-4 below.

Example 3

Leukemia Stem Cells (LSC) are Reliably Transduced with 5'-hIL-15/hIL-15Rα/hCD80-3' Vaccine This Example describes the results of experiments performed to illustrate that leukemia stem cells (LSC) can be reliably transduced with hTriLeukeVax vaccine (5'-hIL-15/hIL-15Rα/hCD80-3' vaccine).

In the past decades, while chemotherapy induced remission rates in AML have improved, overall survival remains poor due to relapse with chemotherapy-resistant disease (Dohner H. et al., 2010; 2015). In many patients, a population of leukemia stem cells (LSC), defined as cells with the capacity to engraft and initiate leukemia in immunodeficient mouse models, are detected. These LSC have the capacity to self-renew, survive serial passage in NOD/SCID/IL2rγ null (NSG) mice, and differentiate into non-LSC AML (Metcalf D. et al., 1969; Moore M A et al., 1973; Thomas D et al., 2017). LSC are less sensitive to chemotherapy, are relatively quiescent, show resistance to apoptosis, and their frequency is an independent predictor of prognosis (Clarke M F et al., 2006; Griessinger E et al., 2016). Thus, in order to eradicate leukemia, an important goal of future treatment strategies is to target LSC (Reya T. et al., 2001). The feasibility of targeting of cancer stem cells by NK cells has been demonstrated in PDX models using NK cells activated in vivo with IL-15 (Ames E et al., 2015).

In the experiments described in this Example, LSC populations in the patient-derived leukapheresis samples described herein were identified using the multiparameter flow analysis described by Zeijlemaker W. et al., 2016. In these experiments, LSC were defined as CD45$^+$CD34$^+$CD38$^-$CD44$^+$CD45RA$^+$ and CD123$^+$ with markers present in the "cocktail". In four independent AML samples, 16-60% of LSC were transduced, as detected by cell surface 11-15 expression, providing a strategy for stimulating immunity to LSC-specific antigens not shared with AML. Flow cytometric analysis of one of these samples is shown (see FIG. 7).

Example 4

Preliminary Studies for the Development of a Patient Derived Xenograft (PDX) Model of AML This Example describes experiments performed to assess activation of human PBMC by hTriLeukeVax in vivo in a PDX model, in order to further characterize specificity and efficacy of responses stimulated by hCD80/hIL-15/hIL-15Rα-expressing vaccines in PDX models in immunodeficient mice. Patient PBMC could be stimulated ex vivo with hCD80/hIL-15/hIL-15Rα-AML and then adoptively transferred in immune-deficient mice engrafted with non-transduced primary AML cells from the same patient to test the in vivo efficacy of anti-leukemic immune responses.

In preliminary studies, NSG mice (n=20) were engrafted with allogeneic PBMC and engraftment documented over ~4 weeks (see, FIG. 6A). On day 14, subgroups of mice (n=6/group) were vaccinated with irradiated, unmodified allogeneic human AML cells, or with the same AML sample transduced with the human tri-cistronic vector-(hTriLeukeVax), or not treated further. Analysis of PBMC one week after vaccination showed a significant increase in IFNγ+ cytotoxic T cells in hTriLeukeVax-treated PDX models relative to the other groups (see, FIG. 8B).

Taken together, the experimental data described above confirmed that (1) the AML vaccine hTriLeukeVax is readily produced with primary AML blasts at low MOI, (2) includes lentivirally engineered LSC, and (3) primes human allogeneic T cells to exhibit activation in vivo in a PDX model.

Example 5

Whole-Cell Vaccine hTriLeukeVax Stimulates Both Innate and Adaptive Immune Responses This Example describes experiments performed to demonstrate that activated NK cells and activated T cells were stimulated by hTriLeukeVax at higher frequencies than the corresponding frequencies activated by unmodified AML. In these experiments, activated CD3$^-$CD56$^+$ NK cells were stimulated by hTriLeukeVax at higher frequencies than the corresponding frequencies activated by unmodified AML as detected by IFNγ (FIG. 9A) and expression of the activation marker CD69 (FIG. 9B). Similarly, activated CD3$^+$CD4$^+$ T cells and CD3+CD8+ T cells were stimulated by hTriLeukeVax at higher frequencies than the corresponding frequencies activated by unmodified AML as detected by CD69 expression (FIGS. 9C and 9D). As described in greater detail

Example 6

Comparison of Ex Vivo Stimulation of Allogeneic Human PBMC by hTriLeukeVax and Unmodified Patient AML Cells This Example describes experiments performed to demonstrate that hTriLeukevax can stimulate allogeneic PBMCs compared to a control containing unmodified AML. In these experiments, allogeneic PBMC samples from production of leukocyte-depleted blood products were obtained from the Blood Centers of the Pacific, San Francisco. Two independent PBMC samples, R41254 and R41256, were used in these studies. PBMC were co-cultured with three independent patient-derived AML samples: CIRM #2, HMTB552, and #33. R41254 and R41256 PBMC were co-cultured for 6 days with either medium alone, irradiated un-modified AML (CIRM #2, HMTB552, or #33), or the same AML cells transduced and irradiated to generate hTriLeukeVax (TLV). PMA-Ionomycin stimulation was used as a positive control for maximal PBMC activation.

In FIGS. 10A-10C and 11A-11C, percent interferon gamma (IFNγ) expression and Granzyme B staining as markers of T cell activation and Ki67 expression as a marker of induced T cell proliferation are depicted above each histogram plot and on the Y axis. The different co-culture conditions shown below the X axis are M=medium alone; A=co-culture with unmodified AML; T=co-culture with AML lentivirally transduced to express CD80/IL-15/IL-15Rα (hTriLeukeVax). The responses of CD3+CD8+ T cells (FIGS. 10A-10C), and CD3$^+$CD4$^+$ T cells (11A-11C) are shown in parallel histograms. The data from stimulation of two PBMC samples, R1254 (left) and R1256 (right) are indicated below the histogram plots for each group of samples. For each set of co-cultures the AML samples used as stimulators are, from left to right, HMTB552, CIRM #2, and Patient #33, as indicated in the key to the right of the upper plot.

The height of the histogram in the co-cultures of PBMC with unmodified AML reflect background allogeneic stimulation of HLA unmatched PBMC by AML cells. Differences in alloreactivity reflect differences in the degree of HLA mismatch between the cells. It was observed that in almost all cases, co-culture with hTriLeukeVax stimulated significantly higher frequencies of IFNγ and Ki67$^+$ positive CD3$^+$ CD8$^+$ and CD3$^+$CD4$^+$ T cells than did co-culture with unmodified AML. It was also observed that frequencies of Granzyme B positive cells were more variable in PBMC co-cultured with allogeneic unmodified AML and hTriLeukeVax.

Example 7

Autologous Patient T Cells are Activated by hTriLeukeVax Stimulation

This Example describes experiments performed to demonstrate that autologous patient T cells can be activated by hTriLeukeVax stimulation.

Figure 12:
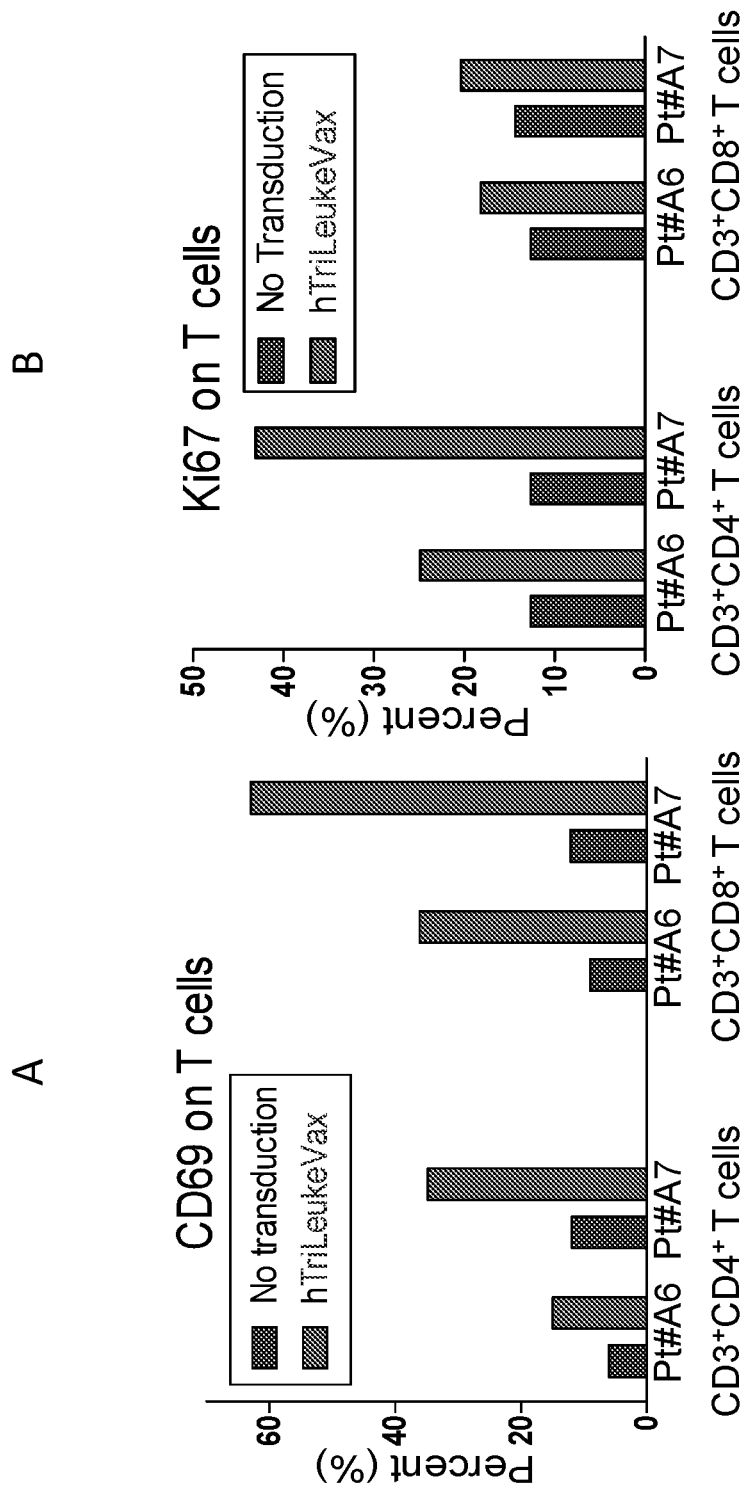
FIGS. 12A-12B illustrates that an exemplary nucleic acid molecule in accordance with some embodiments of the present disclosure stimulates activation of autologous patient T cells collected at diagnosis. In these experiments, PBMC from two patients (#A6 and #A7) were co-cultured with unmodified AML or with a whole-cell vaccine hTriLeukeVax generated from #A6 and #A7 AML of the disclosure for 7 days, and then stained with anti-CD3, anti-CD4, anti-CD8, and anti-CD69 or anti-Ki67 antibodies and analyzed by flow cytometry. CD69 expression is an indicator of T cell activation, and Ki67 is a measure of T cell proliferative index.

In these experiments, PBMC from patients were co-cultured in the presence of unmodified autologous AML or hTriLeukeVax. PBMC were then stained for flow cytometric analysis. Patient T cells showed greatest activation (CD69 expression) and proliferation (Ki67 expression) after stimulation by hTriLeukeVax (FIGS. 12A-12B).

Example 8

Confirmation of hTriLeukeVax Efficacy in Stimulating NK and T Cell Activation and Anti-AML/LSC Responses Ex Vivo This Example describes experiments performed to evaluate the efficacy of hTriLeukeVax efficacy in stimulating NK and T cell activation and anti-AML/LSC responses ex vivo.

As described above, multiple studies have shown that PBMC from AML patients in remission have clinically relevant immunological responses to autologous AML cell vaccines with prolongation of progression-free survival (PFS), despite tumor and chemotherapy-mediated immunosuppression. To demonstrate the efficacy of hTriLeukeVax in stimulating anti-leukemic immune responses, the activation, proliferation, and induction of cytotoxic responses of autologous patient T and NK cells are assessed after primary co-culture with hTriLeukeVax. Re-stimulation of hTriLeukeVax-primed T and NK cells with irradiated, unmodified autologous AML cells enable quantification of the nature and magnitude (efficacy) of responses targeting AML and LSC. In these experiments, controls include (1) a culture of primed PBMC alone, to assess background activity/viability, (2) co-culture of PBMC primed with irradiated unmodified AML, and (3) culture of unstimulated PBMC with autologous AML, as described previously.

The presence or absence of correlations in the expansion AND activation of NK cells, and T cells are assessed in the presence of hTrileukeVax mediated IL-15/IL-15Rα expression in primary cultures. Assays with hTriLeukeVax are based on stimulation of T and NK cell proliferation (e.g., numbers, Ki67+ subsets and CFSE labeling as above), cytokine secretion (Luminex for high throughput screening and ELISA for accurate quantification), enumeration of antigen-specific T cells (IFNγ), as well as cytokine capture and intracellular cytokine staining to enumerate the NK and T cell subsets expressing cytokines. Cytolytic activity of autologous PBMC are assessed by quantitative analysis of CD107a expression as a measure of degranulation, and by quantifying 1) target-specific cytolytic responses on unmodified autologous AML and LSC, and 2) off-target cytolytic activity on normal marrow CD34$^+$ populations (see below). Potential variability in maximal T cell responses are tested by stimulation with anti-CD3/CD28 cross-linking and PMA/Ionomycin stimulation.

Cytotoxic effects targeting AML blasts and LSC are assessed after co-culture with primed PBMC by staining for markers of apoptosis (Annexin V/Activated Caspase) as well as flow cytometric studies to quantify AML/LSC. In these experiments, controls for analysis of cytolytic effects on AML/LSC include co-culture of un-modified AML with medium alone, or with naïve autologous PBMC. Multi-parameter flow studies identifying activation of effector subsets and leukemia specific cytotoxicity are carried out in incorporating the LSC targeted antibody panel described above (see, e.g., FIG. 7A-7E). As shown previously, NK cells can preferentially target cancer stem cells in solid tumors. Thus the efficacy of IL-15/IL-15Rγ mediated NK cell activation in generating LSC-specific responses can be tested with purified autologous NK cells after stimulation by the whole-cell vaccine hTriLeukeVax.

Example 9

Assess Potential Toxicity or Off-Target Effects of hTriLeukeVax Primed Immune Effectors on CD34$^+$ Normal Bone Marrow and Hematopoietic Stem Cell (HSC)

This Example describes experiments performed to assess the potential toxicity or off-target effects of hTriLeukeVax primed immune effectors on CD34+ normal bone marrow and hematopoietic stem cell (HSC).

Given the extensive safety data from Phase 1 clinical trials with irradiated autologous AML vaccines, it is believed that there is a very low likelihood of inducing systemic toxicity, auto-immunity or cytokine release symptoms with hTriLeukeVax-AML vaccines. In terms of potential IL-15 toxicity, recent Phase 1 studies are informative. Dose limiting systemic toxicities (DLT) were observed with daily IV injection 3 µg/kg/day (~200 µg dose) of recombinant IL-15 protein in the first-in-human trial however at 0.3 µg/kg/day (~20 µg dose) no DLT was observed. As reported previously, purified transduced irradiated mouse vaccine mTriLeukeVax (~$10^6$ cells) secreted ~400 ng/ml of IL-15/24 hours. Thus, a standard murine vaccination with 5×$10^6$ mTriLeukeVax could produce a theoretical maximum dose of 8 µg per 30 g mouse over 4 days, or ~264 µg/kg. At this dose, no toxicity was observed in serially vaccinated mice. Yet in mice, vaccination with mTriLeukeVax was sufficient to cure leukemia. This is consistent with recent Phase 1 post-HSCT data in relapsed AML showing stimulation of systemic immune responses and lower toxicity with SC versus IV injection of the IL-15 superagonist ALT803 (Romee et al. 2018).

In this Example, experiments are performed to assay of potential off target effects directed against CD34+ normal bone marrow cells, which are based both on primary cultures of PBMC, T and NK cells isolated from patients in remission and co-cultured with hTriLeukeVax (primary stimulation), and in secondary cultures using previously stimulated lymphocytes that are subsequently co-cultured with autologous AML (target), CD34+ bone marrow cells, or CD14 monocytes (off-target) as described above. After co-culture, cells are plated in CFU assays. The feasibility of these studies is supported by the preliminary data described above (FIGS. 12A-12B) and prior preclinical studies for the UK AML vaccine trial showing that AML patient PBMC primed with autologous CD80/IL-2 engineered vaccines had higher frequencies of IFNγ expression in response to AML versus normal bone marrow blasts.

Example 10

Pilot Safety and Toxicological Assays

This Example describes the results of pilot toxicological assays performed to assess the safety of the hTriLeukeVax vaccine described herein.

As described above, blood counts remained normal and no local or systemic toxicity was observed after administration of 3-4 weekly doses of up to 3×$10^7$ irradiated mouse mTriLeukeVax; however, in other studies, hydrodynamic injections of human IL-15 and IL-15Rα plasmid DNA in mice producing high systemic levels of IL-15/IL-15Rα that resulted in transient changes in circulating immune subsets similar to those described in the human IL-15 trial. It is important to note that in previous in vivo studies in immunocompetent mice, administration of 4 weekly doses of up to 1×$10^7$ mTriLeukeVax has shown no evidence of local or systemic toxicity despite unprecedented efficacy (Shi, Y., et al (2018)).

An initial screen for evidence of systemic or BM toxicity is performed by testing 4 weekly doses (3 groups of 1×$10^6$, 1×$10^7$, or 1×$10^8$ cells/dose) of mTriLeukeVax as an in vivo assay in the immunocompetent 32Dp210 model. In these experiments, the following parameters are monitored: creatinine, liver function, blood counts, and circulating immune populations, and bone marrow by flow cytometry. Bone marrow is also examined for histopathological changes and evidence of immune cell infiltration as are other organs including liver, spleen, kidneys and lung. Blood is tested at 48 hours, 1 week, 1 month and 6 months after the course of vaccine administration is complete. Analyses also include assessment of the duration of IL-15 expression in vivo by immunohistochemistry of subcutaneous tissue at the local injection site, and ELISA for circulating IL-15.

The following pilot safety and/or toxicity studies are also performed: 1) 32Dp210 leukemia vaccines expressing human CD80/IL-15/IL-15Rα are administered and blood counts, assays of inflammatory cytokines (IFNγ, TNFα, IL-6) using multiplexed Luminex assays of plasma, and examination of organ toxicity is performed in samples collected at 48 hours and every other day for one week, 2) Parallel experiments in NSG mice engrafted with human immune cells and/or leukemia are performed to determine effects on human cytokines and possible off-target toxicities arising from the vaccine. Human peripheral blood lymphocytes and/or CD34+ hematopoietic stem cells are engrafted into NSG mice. Thereafter, mice are treated with the hTriLeukeVax and similar assessments are performed.

Example 11

In Vivo Assays of hTriLeukeVax-Primed Immune Responses Targeting AML and LSC, and Potential Off Target Effects on Normal HSC This Example describes experiments performed to establish patient AML engraftment efficiency in NSG mice. These experiments enable development of an in vivo assay to assess the efficacy of LSC targeting by hTriLeukeVax-primed immune effectors. In PDX models, approximately 40% of favorable risk primary AML cells fail to engraft. In contrast, AML from patients with high blast counts undergoing leukapheresis procedures and from patients in high risk subgroups, show higher engraftment rates. Thus, leukapheresis samples are screened for their ability to engraft in NSG mice as they become available. Patient AML cells are tested for in cohorts of 5 NSG mice per sample.

A) Quantify LSC Repopulating Efficiency in PDX Model after Ex Vivo Co-Culture with hTriLeukeVax Primed Autologous T and NK Cells These experiments are designed to test the ability of autologous immune effectors to target AML and specifically LSC in ex vivo cytolytic assays using flow cytometric analysis for Annexin V or caspase 3 staining of AML/LSC and subsequent engraftment of LSC in NSG mice as the readout. The advantage of this experimental design is that 1) conditions for assay can be optimized in the absence of the xenogeneic activation of human PBMC in NSG, and 2) patient PBMC samples are limited in volume and may be insufficient to do studies requiring engraftment of multiple NSG mice. Study endpoint is a comparison of LSC frequency/repopulating ability in spleen and bone marrow populations in NSG mice after culture with hTriLeukeVax-primed PBMC, PBMC stimulated with irradiated unmodified AML, or unstimulated PBMC.

B) Assess Targeting of AML/LSC by Autologous PBMC Primed Ex Vivo with hTriLeukeVax and Transplanted with Autologous AML in PDX Model Patient T and NK cells are stimulated with irradiated autologous AML, hTriLeukeVax, or cultured alone under optimized conditions, and then introduced into NSG mice engrafted with autologous patient AML. Flow cytometric analysis of AML/LSC in spleen and bone marrow, and secondary transplantation assays of these cells are then used to determine the efficacy of anti-leukemic immune responses stimulated by hTriLeukeVax.

C) Engraft PBMC in NSG Mice Followed by IV Inoculation of hTriLeukeVax and AML

In this model, PBMC ($10 \times 10^6$ cells) are inoculated and allowed to engraft. At day 14, hTriLeukeVax (or unmodified AML, or vehicle) is administered IV followed by inoculation with AML. A strength of this model is that immune responses are stimulated in vivo and the frequency of LSC and progression of leukemia is compared between experimental groups. However, large numbers of PBMC are required (150 ml blood required for $10 \times 10^6$ cells/mouse) so this may be more feasible in a matched allogeneic setting. The large number of PBMC are needed to establish immune function early, before xenogeneic GVHD responses develop at 4-7 weeks.

D) Engraftment of Normal Marrow CD34$^+$ Cells in NSG after Co-Culture

Pilot studies are performed in parallel to examine engraftment of normal marrow CD34$^+$ cells in NSG after co-culture 1) in media alone, or 2) with autologous naïve PBMC, or 3) with hTriLeukeVax primed autologous PBMC. In these experiments, potential off-target effects of the vaccine on the number and repopulating ability of normal HSCs in vivo are evaluated.

Also contemplated herein are studies to define the nature and specificity of allogeneic and autologous responses stimulated by hTriLeukeVax vaccines, and enable development of validation/release criteria for clinical applications.

Example 12

Applications of hTriLeukeVax Beyond AML as Exemplified by Studies Performed with Human Myeloma Cells This Example describes experiments performed to illustrate that the compositions and methods disclosed herein can be used for applications beyond treatment of AML.

Figure 13:
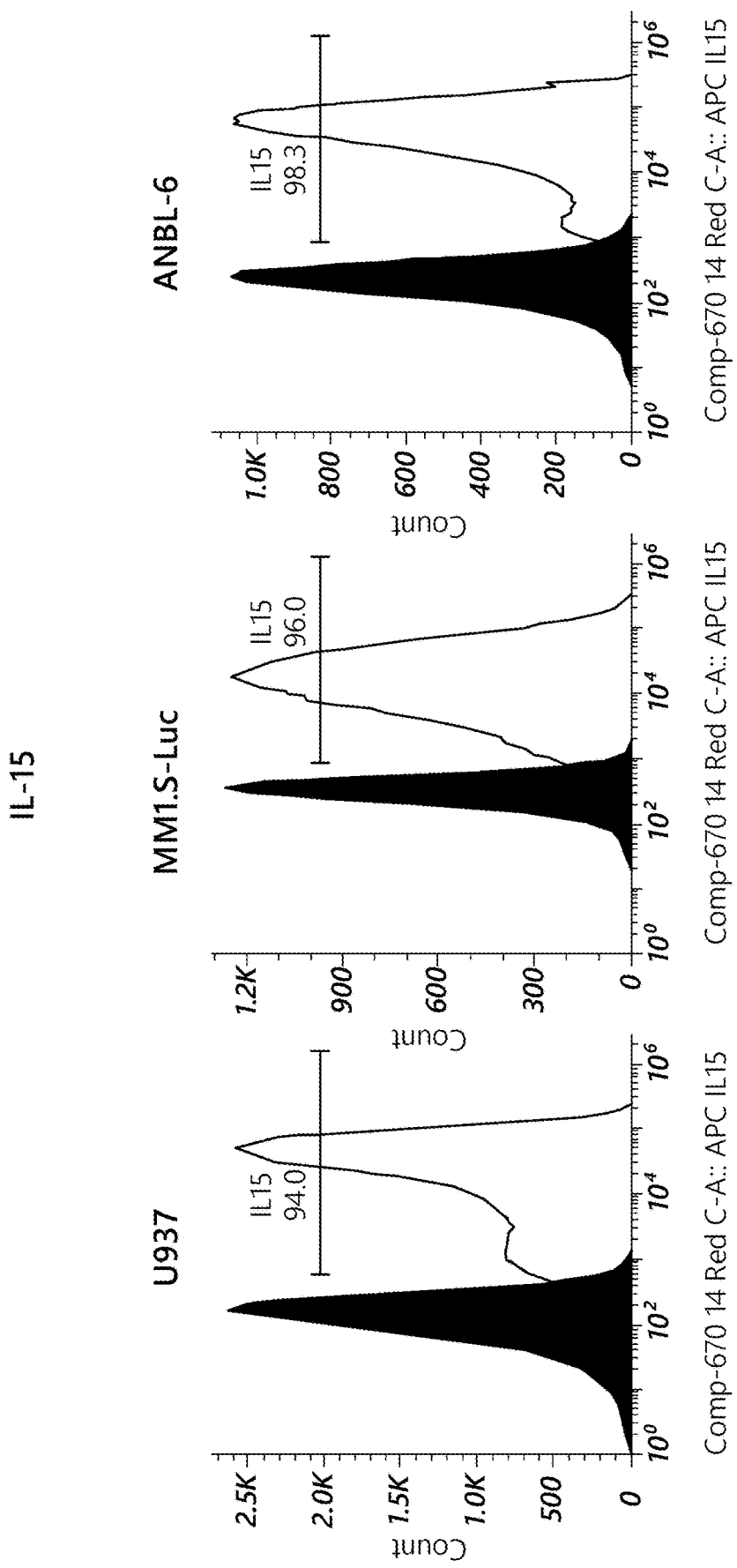
FIG. 13 graphically summarizes the results of experiments performed to illustrate IL-15, IL-15Rα, and CD80 cell surface expression in primary human myeloma cell lines that were transduced with exemplary nucleic acid molecules in accordance with some embodiments of the present disclosure. As shown in these experiments, human myeloma cell lines were efficiently transduced. CD80, IL-15, and IL-15Rα were found to be expressed at high and stable levels, which is a demonstration for applications of hTriLeukeVax beyond AML.
Figure 13:
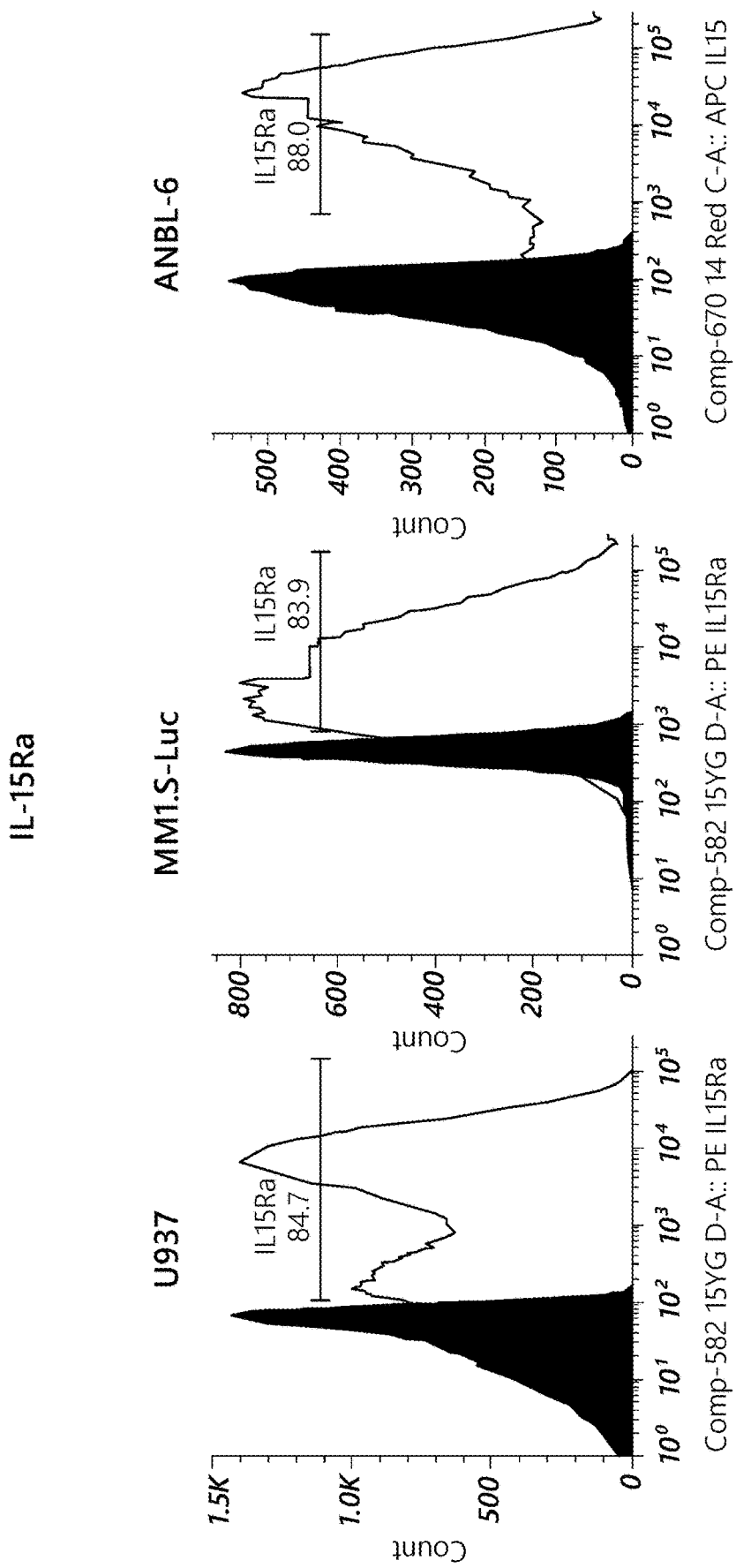
Figure 13:
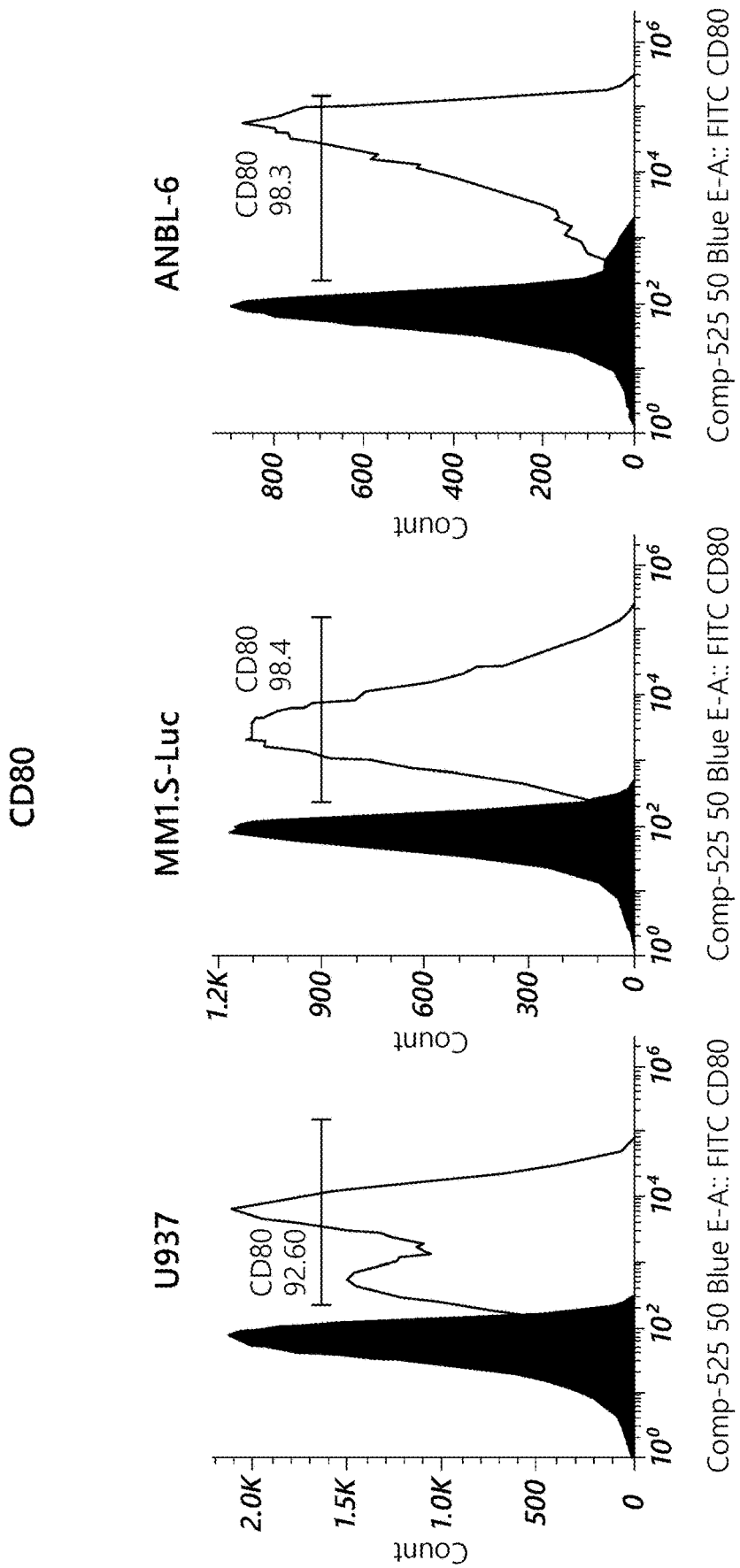

It is contemplated that myeloma may be a promising additional target for autologous vaccine administration and, therefore, use of hTriLeukeVax may also provide a novel strategy for improving relapse free survival in this disease. To test the efficiency of lentiviral transduction, two different human myeloma cell lines MM1.S and ANBL-6 were transduced at an MOI of 10 using protocols similar to those used to transduce primary AML cells discussed above (see, e.g., FIG. 13). Transduction of the human leukemia line U937 served as a positive control. Cells were harvested 48 hours after transduction and subjected to flow cytometric analysis of lentivirally mediated gene expression. In FIG. 13, the cells that were transduced are indicated at the top of the flow plots and staining for CD80, IL-15 and IL-15 receptor alpha are indicated to the left of each row of flow plots. Untransduced cells are shown in the left peak on X-axis in each graph and the transduced cells in the right hand peak on X-axis.

As shown in FIG. 13, human myeloma cell lines were efficiently transduced. In both human myeloma cell lines, transduction efficiency was 84-98% and comparable to that achieved with the highly transduction permissive U937 cell line. In addition, CD80, IL-15, and IL-15Rα were found to be expressed at high and stable levels. These high levels of gene expression were stable for at least 4 weeks and also were demonstrated after cells were cryopreserved, thawed, and re-cultured ex vivo. Additional studies are also contemplated to assess the efficacy of immune stimulation by myeloma-derived TriLeukeVax of allogeneic PBMC in co-culture experiments that parallel those described above for patient AML samples. In these experiments, the frequency of activation and proliferation of CD3+CD4+ and CD3+CD8+ T cells and other immune cell subsets can be analyzed using these myeloma cell lines by using the techniques and reagents discussed above as well as those known in the art.

Administration of autologous tumor vaccines generated by fusion of patient dendritic cells with autologous AML or myeloma cells have shown promise in recent Phase 1 clinical trials. In these studies, to achieve expression of the co-stimulatory protein CD80 on the tumor cell vaccine, the protocol required that dendritic cells be harvest by placement of a central intravenous access line and harvest of patient dendritic cells by leukapheresis. Dendritic cells were expanded in ex vivo tissue culture cells and then mixed with patient myeloma or AML cells and polyethylene glycol (PEG) resulting in fusion of CD80+ dendritic cells and tumor cells. Additional stimulation of immune cells was achieved by co-injection of GM-CSF with the irradiated fusion cell vaccine.

The major advantage of the approaches disclosed herein as compared with the cell fusion vaccine described above is that cells are directly transduced for TriLeukeVax production and then cryopreserved. This eliminates the step of placing a central intravenous line to collect dendritic cells in patients in remission, a procedure that is not without risk. The approaches disclosed herein also eliminate the need for large scale culture of patient dendritic cells with the attendant costs and risks of contamination of extended cell culture.

While particular alternatives of the present disclosure have been disclosed, it is to be understood that various modifications and combinations are possible and are contemplated within the true spirit and scope of the appended claims. There is no intention, therefore, of limitations to the exact abstract and disclosure herein presented.

REFERENCES

1. Rosenblatt J, Stone R M, Uhl L, et al. Individualized vaccination of AML patients in remission is associated with induction of antileukemia immunity and prolonged remissions. Sci Transl Med 2016; 8:368ra171.
2. Ho V T, Kim H T, Bavli N, et al. Vaccination with autologous myeloblasts admixed with GM-K562 cells in patients with advanced MDS or AML after allogeneic HSCT. Blood advances 2017; 1:2269-79.
3. Waldmann T A. The biology of interleukin-2 and interleukin-15: implications for cancer therapy and vaccine design. Nat Rev Immunol 2006; 6:595-601.
4. Waldmann T, Tagaya Y, Bamford R. Interleukin-2, interleukin-15, and their receptors. Int Rev Immunol 1998; 16:205-26.
5. Ingram W, Chan L, Guven H, et al. Human CD80/IL2 lentivirus-transduced acute myeloid leukaemia (AML) cells promote natural killer (NK) cell activation and cytolytic activity: implications for a phase I clinical study. Br J Haematol 2009; 145:749-60.
6. Ames E, Canter R J, Grossenbacher S K, et al. Enhanced targeting of stem-like solid tumor cells with radiation and natural killer cells. Oncoimmunology 2015; 4:e1036212.
7. Ames E, Canter R J, Grossenbacher S K, et al. N K Cells Preferentially Target Tumor Cells with a Cancer Stem Cell Phenotype. J Immunol 2015; 195:4010-9.

8. Sanjabi S, Mosaheb M M, Flavell R A. Opposing effects of TGF-beta and IL-15 cytokines control the number of short-lived effector CD8+ T cells. Immunity 2009; 31:131-44.
9. Chertova E, Bergamaschi C, Chertov O, et al. Characterization and favorable in vivo properties of heterodimeric soluble IL-15.IL-15Ralpha cytokine compared to IL-15 monomer. The Journal of biological chemistry 2013; 288:18093-103.
10. Bergamaschi C, Rosati M, Jalah R, et al. Intracellular interaction of interleukin-15 with its receptor alpha during production leads to mutual stabilization and increased bioactivity. The Journal of biological chemistry 2008; 283:4189-99.
11. Dombret H, Gardin C. An update of current treatments for adult acute myeloid leukemia. Blood 2016; 127:53-61.
12. Ossenkoppele G J, Janssen J J, van de Loosdrecht A A. Risk factors for relapse after allogeneic transplantation in acute myeloid leukemia. Haematologica 2016; 101:20-5.
13. Hardwick N, Chan L, Ingram W, Mufti G, Farzaneh F. Lytic activity against primary AML cells is stimulated in vitro by an autologous whole-cell vaccine expressing IL-2 and CD80. Cancer Immunol Immunother 2010; 59:379-88.
14. Di Stasi A, Jimenez A M, Minagawa K, Al-Obaidi M, Rezvani K. Review of the Results of WT1 Peptide Vaccination Strategies for Myelodysplastic Syndromes and Acute Myeloid Leukemia from Nine Different Studies. Front Immunol 2015; 6:36.
15. Lichtenegger F S, Krupka C, Haubner S, Kohnke T, Subklewe M. Recent developments in immunotherapy of acute myeloid leukemia. Journal of hematology & oncology 2017; 10:142.
16. Smith C C, Paguirigan A, Jeschke G R, et al. Heterogeneous resistance to quizartinib in acute myeloid leukemia revealed by single-cell analysis. Blood 2017; 130: 48-58.
17. Buggins A G, Lea N, Gaken J, et al. Effect of costimulation and the microenvironment on antigen presentation by leukemic cells. Blood 1999; 94:3479-90.
18. Rosenblatt J, Avivi I, Vasir B, et al. Vaccination with dendritic cell/tumor fusions following autologous stem cell transplant induces immunologic and clinical responses in multiple myeloma patients. Clin Cancer Res 2013; 19:3640-8.
19. Ingram W, Kordasti S, Chan L, et al. Human CD80/IL2 lentivirus transduced acute myeloid leukaemia cells enhance cytolytic activity in vitro in spite of an increase in regulatory CD4+ T cells in a subset of cultures. Cancer Immunol Immunother 2009; 58:1679-90.
20. Buccisano F, Maurillo L, Del Principe M I, et al. Minimal residual disease as a biomarker for outcome prediction and therapy optimization in acute myeloid leukemia. Expert review of hematology 2018; 11:307-13.
21. Norkin M, Katragadda L, Zou F, et al. Minimal residual disease by either flow cytometry or cytogenetics prior to an allogeneic hematopoietic stem cell transplant is associated with poor outcome in acute myeloid leukemia. Blood Cancer Journal 2017; 7:634.
22. Boyiadzis M, Agha M, Redner R L, et al. Phase 1 clinical trial of adoptive immunotherapy using "off-the-shelf" activated natural killer cells in patients with refractory and relapsed acute myeloid leukemia. Cytotherapy 2017; 19:1225-32.
23. Borrello I M, Levitsky H I, Stock W, et al. Granulocyte-macrophage colony-stimulating factor (GM-CSF)-secreting cellular immunotherapy in combination with autologous stem cell transplantation (ASCT) as postremission therapy for acute myeloid leukemia (AML). Blood 2009; 114:1736-45.
24. Rashidi A, Ebadi M, Colditz G A, DiPersio J F. Outcomes of Allogeneic Stem Cell Transplantation in Elderly Patients with Acute Myeloid Leukemia: A Systematic Review and Meta-analysis. Biol Blood Marrow Transplant 2016; 22:651-7.
25. Lipof J J, Loh K P, O'Dwyer K, Liesveld J L. Allogeneic Hematopoietic Cell Transplantation for Older Adults with Acute Myeloid Leukemia. Cancers 2018; 10.
26. Gaken J, Darling D, Hollingsworth S, et al. Synergy between B7.1 and IL-2 gene modification in the induction of tumour rejection. Cancer Gene Ther 1994; 1:212.
27. Koya R C, Kasahara N, Pullarkat V, Levine A M, Stripecke R. Transduction of acute myeloid leukemia cells with third generation self-inactivating lentiviral vectors expressing CD80 and GM-CSF: effects on proliferation, differentiation, and stimulation of allogeneic and autologous anti-leukemia immune responses. Leukemia 2002; 16:1645-54.
28. Dubois S, Patel H J, Zhang M, Waldmann T A, Muller J R. Preassociation of IL-15 with IL-15R alpha-IgG1-Fc enhances its activity on proliferation of NK and CD8+/CD44$^{high}$ T cells and its antitumor action. J Immunol 2008; 180:2099-106.
29. Kanegane H, Tosato G. Activation of naive and memory T cells by interleukin-15. Blood 1996; 88:230-5.
30. Alves N L, Hooibrink B, Arosa F A, van Lier R A. IL-15 induces antigen-independent expansion and differentiation of human naive CD8+ T cells in vitro. Blood 2003; 102:2541-6.
31. Hinrichs C S, Spolski R, Paulos C M, et al. IL-2 and IL-21 confer opposing differentiation programs to CD8+ T cells for adoptive immunotherapy. Blood 2008; 111: 5326-33.
32. Berard M, Brandt K, Bulfone-Paus S, Tough D F. IL-15 promotes the survival of naive and memory phenotype CD8+ T cells. J Immunol 2003; 170:5018-26.
33. Sandau M M, Kohlmeier J E, Woodland D L, Jameson S C. IL-15 regulates both quantitative and qualitative features of the memory CD8 T cell pool. J Immunol 2010; 184:35-44.
34. Huarte E, Fisher J, Turk M J, et al. Ex vivo expansion of tumor specific lymphocytes with IL-15 and IL-21 for adoptive immunotherapy in melanoma. Cancer letters 2009; 285:80-8.
35. Markley J C, Sadelain M. IL-7 and IL-21 are superior to IL-2 and IL-15 in promoting human T cell-mediated rejection of systemic lymphoma in immunodeficient mice. Blood 2010; 115:3508-19.
36. Brentjens R J, Latouche J B, Santos E, et al. Eradication of systemic B-cell tumors by genetically targeted human T lymphocytes co-stimulated by CD80 and interleukin-15. Nat Med 2003; 9:279-86.
37. Hirst W J, Buggins A, Darling D, Gaken J, Farzaneh F, Mufti G J. Enhanced immune costimulatory activity of primary acute myeloid leukaemia blasts after retrovirus-mediated gene transfer of B7.1. Gene Ther 1997; 4:691-9.
38. Steel J C, Waldmann T A, Morris J C. Interleukin-15 biology and its therapeutic implications in cancer. Trends in pharmacological sciences 2012; 33:35-41.
39. Bergamaschi C, Bear J, Rosati M, et al. Circulating IL-15 exists as heterodimeric complex with soluble IL-15Ralpha in human and mouse serum. Blood 2012; 120:e1-8.

40. Hong E, Usiskin I M, Bergamaschi C, et al. Configuration-dependent Presentation of Multivalent IL-15:IL-15Ralpha Enhances the Antigen-specific T Cell Response and Anti-tumor Immunity. The Journal of Biological Chemistry 2016; 291:8931-50.
41. Ng S S, Nagy B A, Jensen S M, et al. Heterodimeric IL-15 treatment enhances tumor infiltration, persistence and effector functions of adoptively transferred tumor-specific T cells in the absence of lymphodepletion. Clin Cancer Res 2016.
42. Romee R, Cooley S, Berrien-Elliott M M, et al. First-in-human phase 1 clinical study of the IL-15 superagonist complex ALT-803 to treat relapse after transplantation. Blood 2018; 131:2515-27.
43. Dohner H, Weisdorf D J, Bloomfield C D. Acute Myeloid Leukemia. N Engl J Med 2015; 373:1136-52.
44. Dohner H, Estey E H, Amadori S, et al. Diagnosis and management of acute myeloid leukemia in adults: recommendations from an international expert panel, on behalf of the European Leukemia Net. Blood 2010; 115:453-74.
45. Metcalf D, Moore M A, Warner N L. Colony formation in vitro by myelomonocytic leukemic cells. Journal of the National Cancer Institute 1969; 43:983-1001.
46. Moore M A, Williams N, Metcalf D. In vitro colony formation by normal and leukemic human hematopoietic cells: characterization of the colony-forming cells. Journal of the National Cancer Institute 1973; 50:603-23.
47. Thomas D, Majeti R. Biology and relevance of human acute myeloid leukemia stem cells. Blood 2017; 129: 1577-85.
48. Clarke M F, Dick J E, Dirks P B, et al. Cancer stem cells—perspectives on current status and future directions: AACR Workshop on cancer stem cells. Cancer Res 2006; 66:9339-44.
49. Griessinger E, Anjos-Afonso F, Vargaftig J, et al. Frequency and Dynamics of Leukemia-Initiating Cells during Short-term Ex Vivo Culture Informs Outcomes in Acute Myeloid Leukemia Patients. Cancer Res 2016; 76:2082-6.
50. Reya T, Morrison S J, Clarke M F, Weissman I L. Stem cells, cancer, and cancer stem cells. Nature 2001; 414: 105-11.
51. Goyama S, Wunderlich M, Mulloy J C. Xenograft models for normal and malignant stem cells. Blood 2015; 125:2630-40.
52. Wiekmeijer A S, Pike-Overzet K, Brugman M H, et al. Sustained Engraftment of Cryopreserved Human Bone Marrow CD34(+) Cells in Young Adult NSG Mice. BioResearch open access 2014; 3:110-6.
53. Bergamaschi C, Jalah R, Kulkarni V, et al. Secretion and biological activity of short signal peptide IL-15 is chaperoned by IL-15 receptor alpha in vivo. J Immunol 2009; 183:3064-72.
54. Ciernik I F, Romero P, Berzofsky J A, Carbone D P. Ionizing radiation enhances immunogenicity of cells expressing a tumor-specific T-cell epitope. International journal of radiation oncology, biology, physics 1999; 45:735-41.
55. Dranoff G, Jaffee E, Lazenby A, et al. Vaccination with irradiated tumor cells engineered to secrete murine granulocyte-macrophage colony-stimulating factor stimulates potent, specific, and long-lasting anti-tumor immunity. Proc Natl Acad Sci USA 1993; 90:3539-43.
56. Chan L, Hardwick N, Darling D, et al. IL-2/B7.1 (CD80) fusagene transduction of AML blasts by a self-inactivating lentiviral vector stimulates T cell responses in vitro: a strategy to generate whole-cell vaccines for AML. Mol Ther 2005; 11:120-31.
57. Jalah R, Rosati M, Kulkarni V, et al. Efficient systemic expression of bioactive IL-15 in mice upon delivery of optimized DNA expression plasmids. DNA and cell biology 2007; 26:827-40.
58. Cartier N, Hacein-Bey-Abina S, Bartholomae C C, et al. Hematopoietic stem cell gene therapy with a lentiviral vector in X-linked adrenoleukodystrophy. Science 2009; 326:818-23.
59. Zeijlemaker W, Kelder A, Oussoren-Brockhoff Y J, et al. A simple one-tube assay for immunophenotypical quantification of leukemic stem cells in acute myeloid leukemia. Leukemia 2016; 30:439-46.
60. Acute Myeloid Leukemia (AML) Therapeutics Market—Global Industry Size, Share, Trends, Analysis And Forecasts 2012-2018. 2011. (Accessed 23 Feb. 2017, at http://www.transparencymarketresearch.com/acute-myeloid-leukemia-therapeutics-market.html.)
61. Mutis T, Schrama E, Melief C J, Goulmy E. CD80-Transfected acute myeloid leukemia cells induce primary allogeneic T-cell responses directed at patient specific minor histocompatibility antigens and leukemia-associated antigens. Blood 1998; 92:1677-84.
62. Khoury H J, Collins R H, Jr., Blum W, et al. Immune responses and long-term disease recurrence status after telomerase-based dendritic cell immunotherapy in patients with acute myeloid leukemia. Cancer 2017; 123: 3061-72.
63. Hsu J L, Bryant C E, Papadimitrious M S, et al. A blood dendritic cell vaccine for acute myeloid leukemia expands anti-tumor T cell responses at remission. Oncoimmunology 2018; 7:e1419114.
64. Daud A I, Loo K, Pauli M L, et al. Tumor immune profiling predicts response to anti-PD-1 therapy in human melanoma. J Clin Invest 2016; 126:3447-52.
65. Conlon K C, Lugli E, Welles H C, et al. Redistribution, hyperproliferation, activation of natural killer cells and CD8 T cells, and cytokine production during first-in-human clinical trial of recombinant human interleukin-15 in patients with cancer. J Clin Oncol 2015; 33:74-82.

What is claimed is:

1. A nucleic acid molecule comprising a polycistronic expression cassette comprising:
   a first coding sequence for a human co-stimulatory molecule CD80 (hCD80);
   a second coding sequence for a human interleukin-15 (hIL-15); and
   a third coding sequence for a human IL-15 receptor alpha (hIL-15Rα);
   wherein the first coding sequence for hCD80 is operably positioned upstream to the second and the third coding sequences, and
   wherein the first, second, and third coding sequences are linked to one another via a coding sequence for one or more autoproteolytic cleavage peptides.

2. The nucleic acid molecule of claim 1, comprising, in the 5' to 3' direction:
   a first coding sequence for a human co-stimulatory molecule CD80 (hCD80);
   a second coding sequence for a human interleukin-15 (hIL-15); and
   a third coding sequence for a human IL-15 receptor alpha (hIL-15Rα).

3. The nucleic acid molecule of claim 1, wherein the polycistronic expression cassette is a tri-cistronic expression cassette.

4. The nucleic acid molecule of claim 1, wherein the nucleic acid molecule is incorporated into a vector.

5. The nucleic acid molecule of claim 4, wherein the vector is a lentiviral vector, an adenovirus vector, an adeno-associated virus vector, or a retroviral vector.

6. The nucleic acid molecule of claim 1, wherein the nucleic acid molecule further comprises, in the 5' to 3' direction:
   (i) the first coding sequence for hCD80;
   (ii) a coding sequence for a furin autoproteolytic cleavage peptide;
   (iii) the second coding sequence for a hIL-15;
   (iv) a coding sequence for a P2A autoproteolytic cleavage peptide; and
   (v) the third coding sequence for a hIL-15Rα.

7. The nucleic acid molecule of claim 1, wherein the nucleic acid molecule comprises, in the 5' to 3' direction:
   (i) the first coding sequence for a human co-stimulatory molecule CD80 (hCD80);
   (ii) a coding sequence for a furin autoproteolytic cleavage peptide;
   (iii) a coding sequence for an F2A autoproteolytic cleavage peptide;
   (iv) the second coding sequence for a human interleukin-15 (hIL-15);
   (v) a coding sequence for a P2A autoproteolytic cleavage peptide; and
   (vi) the third coding sequence for a human IL-15 receptor alpha (hIL-15Rα).

8. An isolated recombinant cell comprising the nucleic acid molecule according to claim 1.

9. The recombinant cell of claim 8, wherein the recombinant cell is obtained from an individual having or suspected of having cancer.

10. The recombinant cell of claim 9, wherein the cancer is a leukemia.

11. The recombinant cell of claim 10, wherein the leukemia is acute myelogenous leukemia (AML).

12. A method of making a recombinant cell, comprising:
   a) providing a cell capable of protein expression;
   b) transducing the provided cell with a nucleic acid molecule according to claim 1.

13. A pharmaceutical composition comprising at least one recombinant cell according to claim 8 or a cell culture comprising the at least one recombinant cell, and a pharmaceutically acceptable carrier.

14. The pharmaceutical composition of claim 13, wherein the pharmaceutical composition is formulated into a whole-cell vaccine.

15. A method comprising administering an amount of a therapeutic agent or a whole-cell vaccine comprising at least one recombinant cell according to claim 8 and/or a pharmaceutical composition comprising the at least one recombinant cell, wherein the method is for:
   (a) treating an individual having or suspected of having a condition associated with AML;
   (b) stimulating an immune response in an individual with AML in remission with persistent minimal residual disease (MRD); and/or
   (c) increasing the population of one or more cell types selected from the group consisting of $CD3^+CD8^+$ T cells, $CD3^+CD4^+$ T cells, memory $CD8^+$ T cells, NK cells, and NKT cells in an individual in need thereof.

16. The method of claim 15, wherein the recombinant cell are allogeneic cells or syngeneic cells.

17. The method of claim 15, wherein the method (a) stimulates the proliferation of $CD3^+CD8^+$ T cells and/or $CD3^+CD4^+$ T cells up to two-fold relative to the proliferation of one or more of these cells in individuals who have not been administered with the therapeutic agent or vaccine; (b) stimulates increased production of interferon gamma (IFNγ) relative to the production of IFNγ in individuals who have not been administered the therapeutic agent or vaccine; and/or (c) results in increased progression free survival of the individual relative to the rate of progression free survival in individuals with AML who have not been administered the therapeutic agent or vaccine.

18. The method of claim 15, wherein the individual is a human.

19. The method of claim 15, further comprising administering to the individual a second anti-cancer agent or therapy.

20. A system for treating an individual having or suspected of having a condition associated with AML, stimulating an immune response in an individual with AML in remission with persistent MRD, or for increasing the population of one or more cell types, the system comprising:
   a nucleic acid according to claim 1;
   b) a recombinant cell comprising the nucleic acid molecule of (a) or a cell culture comprising the recombinant cell; and/or
   c) a pharmaceutical composition comprising at least one recombinant cell or cell culture of (b).

* * * * *